United States Patent
Kato

[19]

[11] Patent Number: 6,025,550
[45] Date of Patent: Feb. 15, 2000

[54] MUSICAL PERFORMANCE TRAINING DATA TRANSMITTERS AND RECEIVERS, AND STORAGE MEDIUMS WHICH CONTAIN A MUSICAL PERFORMANCE TRAINING PROGRAM

[75] Inventor: Hitoshi Kato, Fussa, Japan

[73] Assignee: Casio Computer Co., Ltd., Tokyo, Japan

[21] Appl. No.: 09/243,309

[22] Filed: Feb. 2, 1999

[30] Foreign Application Priority Data

Feb. 5, 1998 [JP] Japan .................................. 10-037931

[51] Int. Cl.[7] ..................................................... A63J 17/00
[52] U.S. Cl. ......................................... 84/464 A; 84/470 R
[58] Field of Search .............................. 84/464 A, 464 R, 84/470 R, 645

[56] References Cited

U.S. PATENT DOCUMENTS

| 3,817,144 | 6/1974 | Okamoto . | |
|---|---|---|---|
| 5,247,864 | 9/1993 | Konishi | 84/477 R |
| 5,252,775 | 10/1993 | Urano . | |
| 5,266,735 | 11/1993 | Shaffer et al. | 84/464 A X |
| 5,394,784 | 3/1995 | Pierce et al. | 84/464 A |
| 5,589,947 | 12/1996 | Sato et al. . | |
| 5,728,960 | 3/1998 | Sitrick | 84/477 R |
| 5,760,323 | 6/1998 | Romero et al. | 84/470 R |

*Primary Examiner*—Jeffrey Donels
*Attorney, Agent, or Firm*—Frishauf, Holtz, Goodman, Langer & Chick, P.C.

[57] ABSTRACT

A musical performance training system includes a transmitter which transmits training musical note data for training musical performance, and a receiver which receives the training musical note data from the transmitter and instructs a trainee to practice a musical performance based on the received training musical note data. The transmitter produces musical note data based on a musical performance, for example, at a keyboard. The musical note data is converted to training musical note data by reducing velocity data contained in the produced musical note data, shifting pitch data in units of an octave, and changing the timbre and pitch data to respective particular values. If the musical note data is produced by a special key operation, control data which instructs the trainee to perform a pedal operation is added to the converted musical note data. The receiver displays or audibly outputs a performance instruction based on the received training musical note data. And the training musical note data may be transmitted/received via a predetermined storage device on a network.

13 Claims, 45 Drawing Sheets

MUSICAL PERFORMANCE TRAINING DATA TRANSMITTERS AND RECEIVERS, AND STORAGE MEDIUMS WHICH CONTAIN A MUSICAL PERFORMANCE TRAINING PROGRAM

TECHNICAL FIELD

The present invention relates to musical performance training data transmitters and receivers with a musical performance teaching function, and storage mediums which contain a musical performance training program.

BACKGROUND ART

For example, in an electronic keyboard instrument with a key depression teaching function as a kind of a musical performance training device, a performer himself or herself can change musical note data fed externally to training musical note data to realize various training methods. In addition, light emitting means such as LEDs are provided in the vicinity of respective keys so that a light emitting means corresponding to a key to be depressed is turned on or light emitting means such as LEDs are provided below the respective keys to illuminate, from below, a key to be depressed to thereby teach a musical performance.

However, in the conventional performance training apparatus, the performer himself or herself is required to change the fed musical note data to training musical note data and to store them, which is troublesome for the performer if he or she is a beginner. Such an operation also requires high skill from the beginner, so that it is not easy for the beginner to realize various training methods.

Almost all instructors and training facilities such as musical schools which feed training musical note data to trainees are concentrated in a cities. The trainee's training time is limited. Thus, trainees who live in a remote place or are limited in training time due to their working hours cannot receive sufficient training musical note data.

In addition, it is difficult for a child or a beginner to play a keyboard instrument. Thus, even when they are fed with training musical note data, they cannot smoothly play the keyboard instrument.

DISCLOSURE OF THE INVENTION

It is therefore a first object of the present invention to allow even a beginner to easily realize various training methods based on note control data fed externally.

In order to achieve the above object, according to one aspect of the present invention, there is provided a performance training data transmitter comprising:

musical note data producing means for producing musical note data;

data converting means for converting the musical note data produced by the musical note data producing means to training musical note data; and transmitting means for transmitting the training musical note data produced by the musical note data converting means.

According to another aspect of the present invention, there is provided a performance training data receiver comprising:

receiving means for receiving musical note data sent by an external device;

data detecting means for detecting training musical note data from among the musical note data received from said musical note data receiving means; and training instructing means for instructing a trainee to train musical performance on the basis of the training musical note data detected by said data detecting means.

According to this arrangement, the transmitter is capable of freely transmitting musical note data produced by the performance as training musical note data to the receiver. The receiver can obtain training musical note data necessary for practicing even when no training musical note data is contained therein.

In the present invention, the musical note data may be transmitted/received via a storage device on a network. Thus, even a trainee who lives at a remote place or even a trainee who is limited in training time due to his or her working hours can easily receive sufficient note control data.

In addition, in the present invention, the above arrangement may be replaced with a program which realizes the arrangement in computer processing.

To this end, according to one aspect of the present invention, there is provided a storage medium which contains a computer readable program which causes a computer to realize:

a data producing process for producing musical note data:

a data converting process for converting the musical note data produced by the musical note data producing process to training musical note data; and a transmitting process for transmitting the training musical note data converted by the data converting process.

According to another aspect of the present invention, there is provided a storage medium which contains a computer readable program which causes a computer to realize:

a receiving process for receiving musical note data sent by an external device;

a data detecting process for detecting training musical note data from among the musical note data received by the musical note data receiving process; and a training instructing process for instructing a trainee to train musical performance on the basis of the training musical note data detected by the data detecting process.

According to this arrangement, the transmitter side is capable of freely transmitting to the receiver the musical note data produced by the performance as the training musical note data. The receiver can obtain training musical note data necessary for performance practicing even though the receiver has no training musical note data therein. In addition, the receiver is capable of receiving data for training the performance even though the receiver has no hardware dedicated to training the performance.

BEST MODE FOR CARRYING OUT THE INVENTION

Three embodiments of the present invention and a modification directed to an electronic keyboard instrument will be described with reference to FIGS. 1–48.

Figure 1:
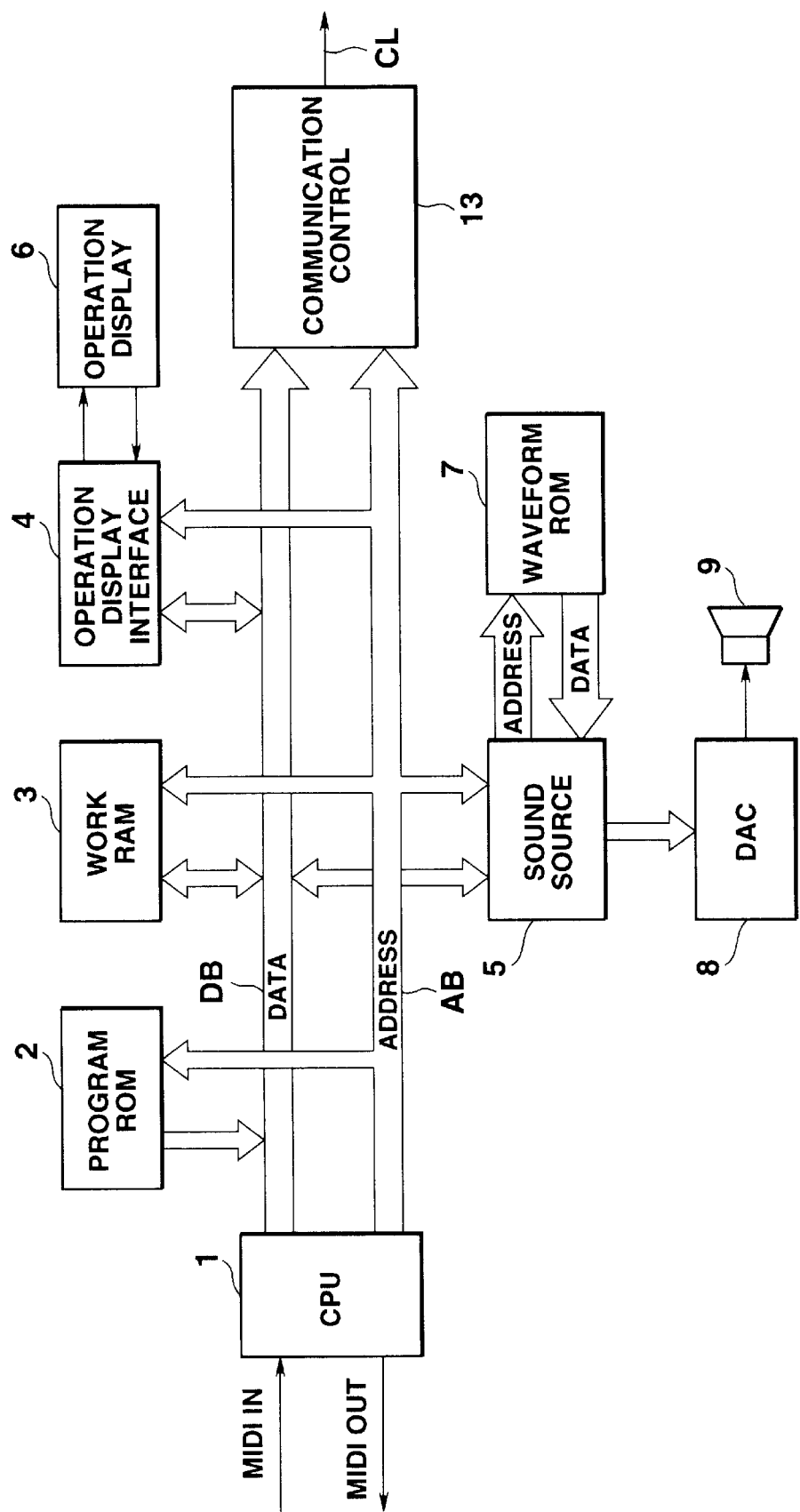
FIG. 1 is a block diagram of a system for each embodiment of the present invention.

In FIG. 1, a CPU 1 controls an electronic musical instrument via system buses including an address bus AB, a data bus DB, and a control bus (not shown). Connected to the system buses are a program ROM 2, a work RAM 3, an operation display interface 4, a sound source 5, and a communication control unit 13. The CPU 1 receives MIDI data from an external MIDI device, and sends MIDI data to the external MIDI device. The program ROM 2 contains programs executed by the CPU 1 and data used in an initializing process, and outputs a program/data in accordance with an address specified by the CPU 1. The work RAM 3 stores MIDI data and other data at addresses specified in accordance with a write instruction from the CPU 1, and outputs MIDI data, etc., in accordance with a read or send command from the CPU 1.

The operation display interface 4 relays various information between an operation display panel 6 and the CPU 1. The sound source 5 performs a musical note producing/muting process based on musical note data and a sound producing/muting instruction from the CPU 1. A waveform ROM 7 contains waveform data and delivers to the sound source waveform data in accordance with a read instruction/address from the sound source 5. A DAC 8 converts a digital musical note signal output from the sound source 5 to an analog musical note signal, which is then fed to a speaker 9 which produces a corresponding musical note audibly.

The communication controller 13 accesses a host computer and a server which is a predetermined storage device on a network such as the Internet at any time (on a non-real time basis) to establish a connection to it to thereby to transmit note control data to the server and receives note control data stored externally in the server.

Figure 2A:
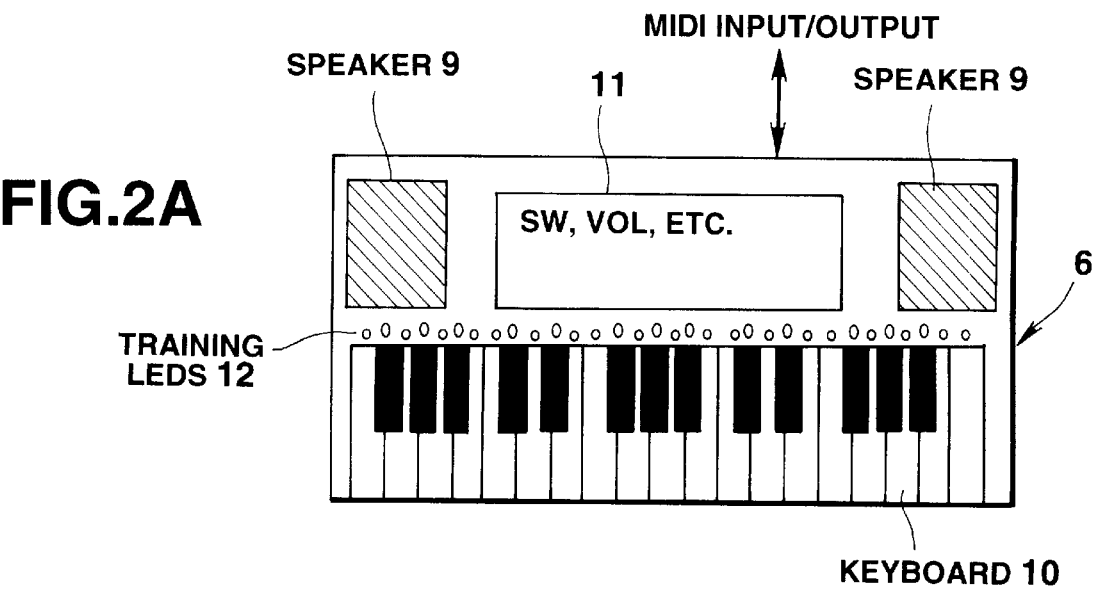
FIGS. 2A and 2B are plan views of an operation display panel of FIG. 1.
Figure 2B:
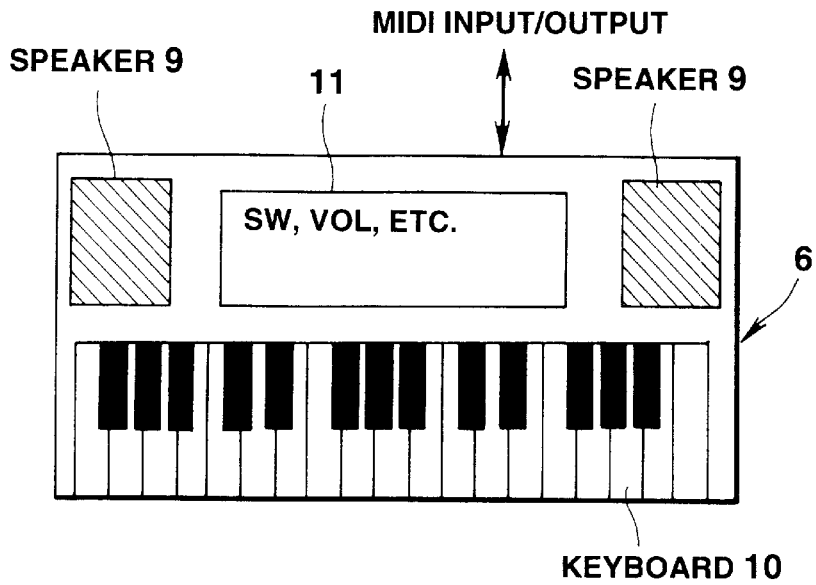

The appearance of the operation display panel 6 is shown in FIGS. 2A and 2B. There are two types of such operation display panels. One of them is provided with operating means which includes a keyboard 10 and a switch unit 11 as well as teaching light emitters of LEDs 12 provided at positions above the corresponding keys so that a light emitter corresponding to a depressed key is turned on. The other type of the operation display panel 6, as shown in FIG. 2B, is provided with training light emitters on the respective backs of the translucent keys so that a depressed key is illumined from below. Thus, the operation display interface 4 composes signal generating means which generates a drive signal to drive a corresponding light emitter.

The first embodiment of the present invention will be described next, in which at least two electronic keyboard instruments are used so that practicing note control data created by a skilled hand at one instrument is sent to the other instrument, and at least one beginner at the other instrument who has received the control data plays other musical instrument based on the data.

Figure 3:
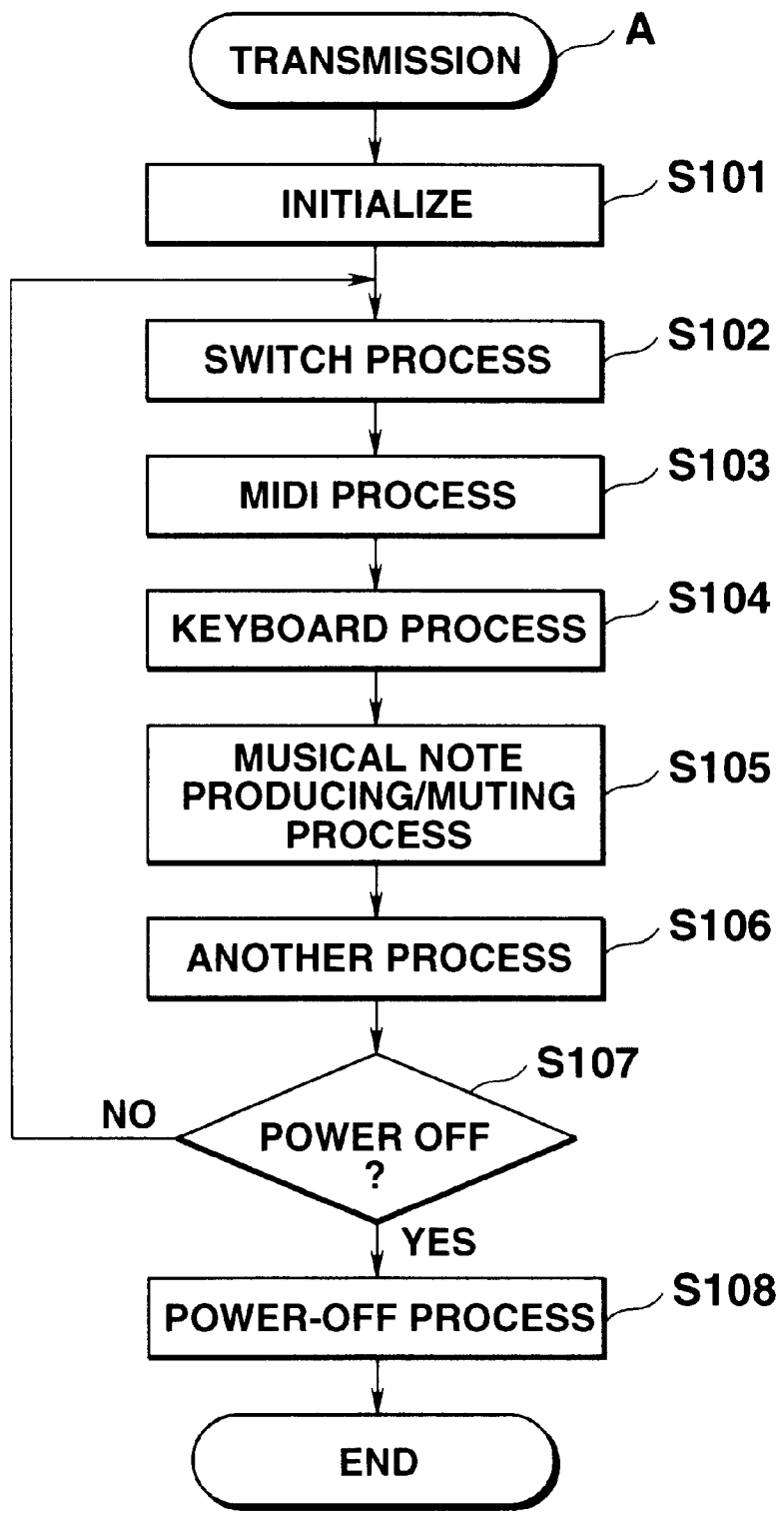
FIG. 3 is a main flow chart of operation of a transmitter of the first embodiment.

FIGS. 3–7 is a flow chart of operation of the CPU 1 of the electronic keyboarded instrument at the transmitter end of the first embodiment. FIG. 3 is a main flow chart of the operation of the CPU 1. When the electronic instrument is powered up, the CPU 1 performs a predetermined initializing process (step S101), a switch process (step S102), an MIDI process (step S103), a keyboard process (step S104), a musical note producing/muting process (step S105) and another process (step S106) in this order. The CPU 1 determines whether the power-off operation is manually performed (step S107). If not, the CPU 1 iterates a looping operation of steps S102–S107. When the CPU 1 determines in step S107 that the power-off operation is performed, it performs a predetermined power-off process (step S108). In the switch process, data on a set state of each switch is saved in the work RAM 3.

Figure 4:
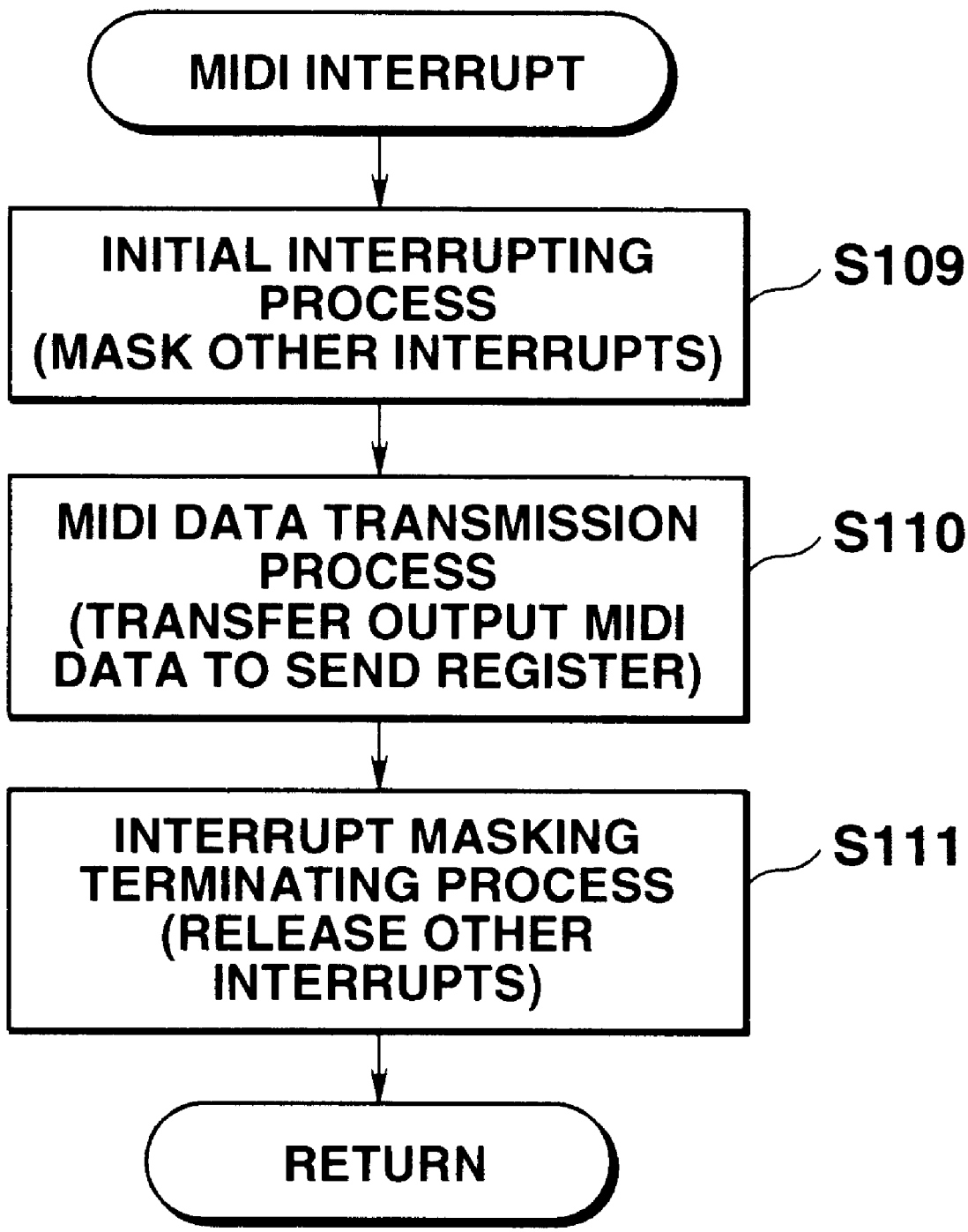
FIG. 4 is a flow chart of an interrupt in the main flow chart of FIG. 3.

FIG. 4 shows an interrupt process for fetching the MIDI data. When the CPU receives MIDI data, it performs an initial interrupt process which includes masking or inhibiting another interrupt (step S109) and performs an MIDI data transmitting process which includes transfer of output MIDI data to a transmission register (step S110), performs an interrupt terminating process which includes an interrupt release (step S111), and then returns to the main flow thereof.

Figure 5:
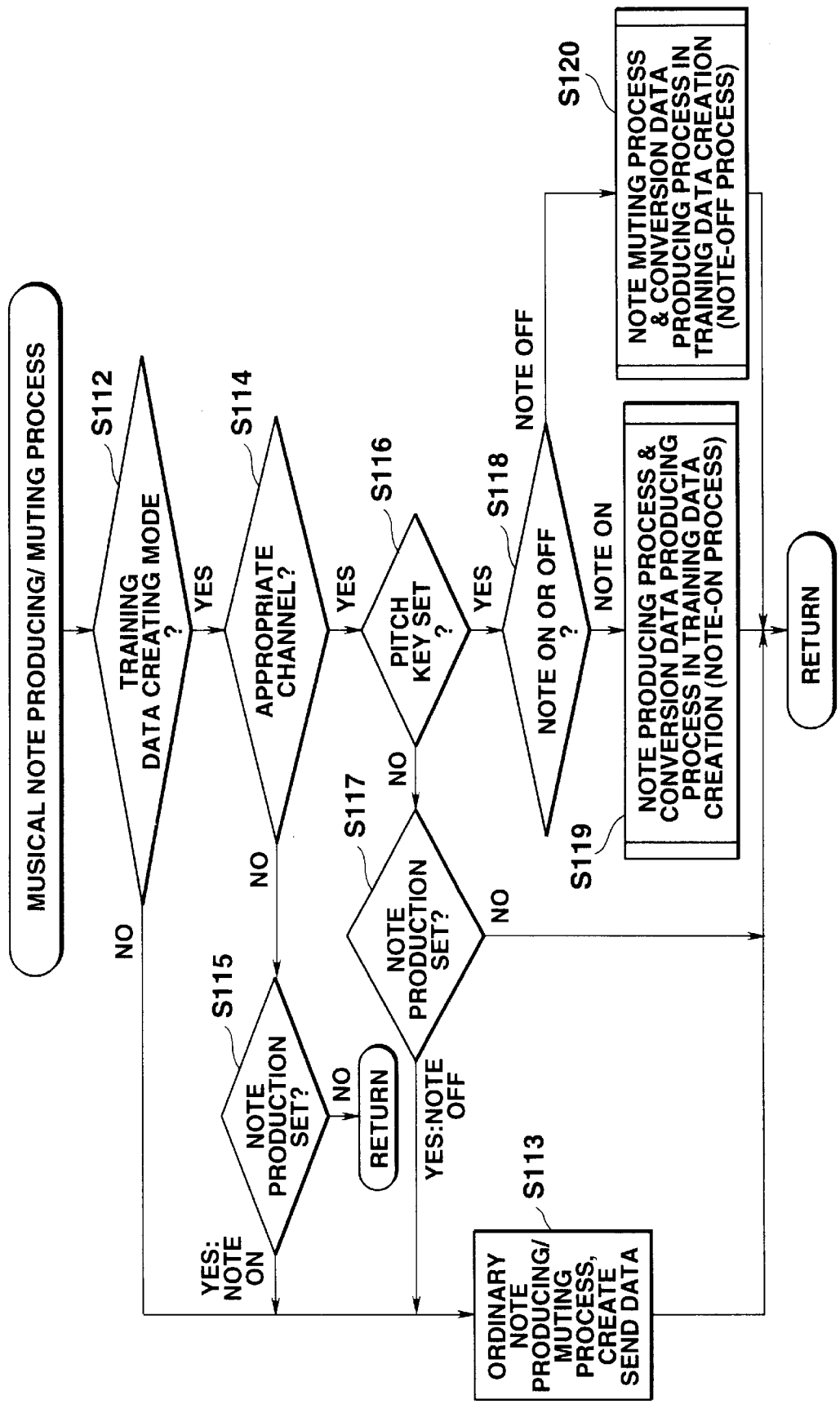
FIG. 5 is a flow chart of a musical note producing/muting process of FIG. 3.

FIG. 5 shows the musical note producing/muting process in step S105 of the main flow. In this process, the CPU refers to the contents of the work RAM 3 in which the switch state set in the switch process of the main flow is saved, and performs the following respective processes. The CPU determines whether a practicing data creation mode is set or not (step S112). If not, it performs an ordinary musical note producing/muting process (step S113), and then terminates this flow. If the practicing data creating mode is set, the CPU determines whether a channel corresponding to creation of the practicing data is used (step S114). If not, the CPU determines whether a musical note in that channel is set so as to be produced (step S115). If so, the CPU 1 shifts its control to step S113, where it performs an ordinary musical note producing/muting process, and then terminates the FIG. 5 process. If not, the CPU immediately terminates the FIG. 5 process.

If a channel corresponding to creation of the practicing data is used in step S114, the CPU determines whether its pitch is set as a key for a pitch corresponding to the creation of the practicing data (step S116). If not, the CPU determines whether musical note production at that pitch is set (step S117). If so, the CPU shifts its control to step S113 to perform an ordinary musical note producing/muting process, and then terminates the FIG. 5 process. If not in step S117, the CPU immediately terminates the FIG. 5 process.

When the pitch is set as a key for a pitch corresponding to the creation of the practicing data in step S116, the CPU 1 determines whether an instruction included in the MIDI data is to produce or mute a musical note (step S118). If so, the CPU 1 performs a note-on process or a musical note producing process and a conversion data producing process when the production of the practicing data is on (step S119). If the instruction included in the MIDI data is to mute a musical note, the CPU 1 performs a note-off process or a musical note muting process and a conversion data producing process when the production of the practicing data is on (step S120). After the note-on or-off process, the CPU 1 terminates the FIG. 5 process.

Figure 6:
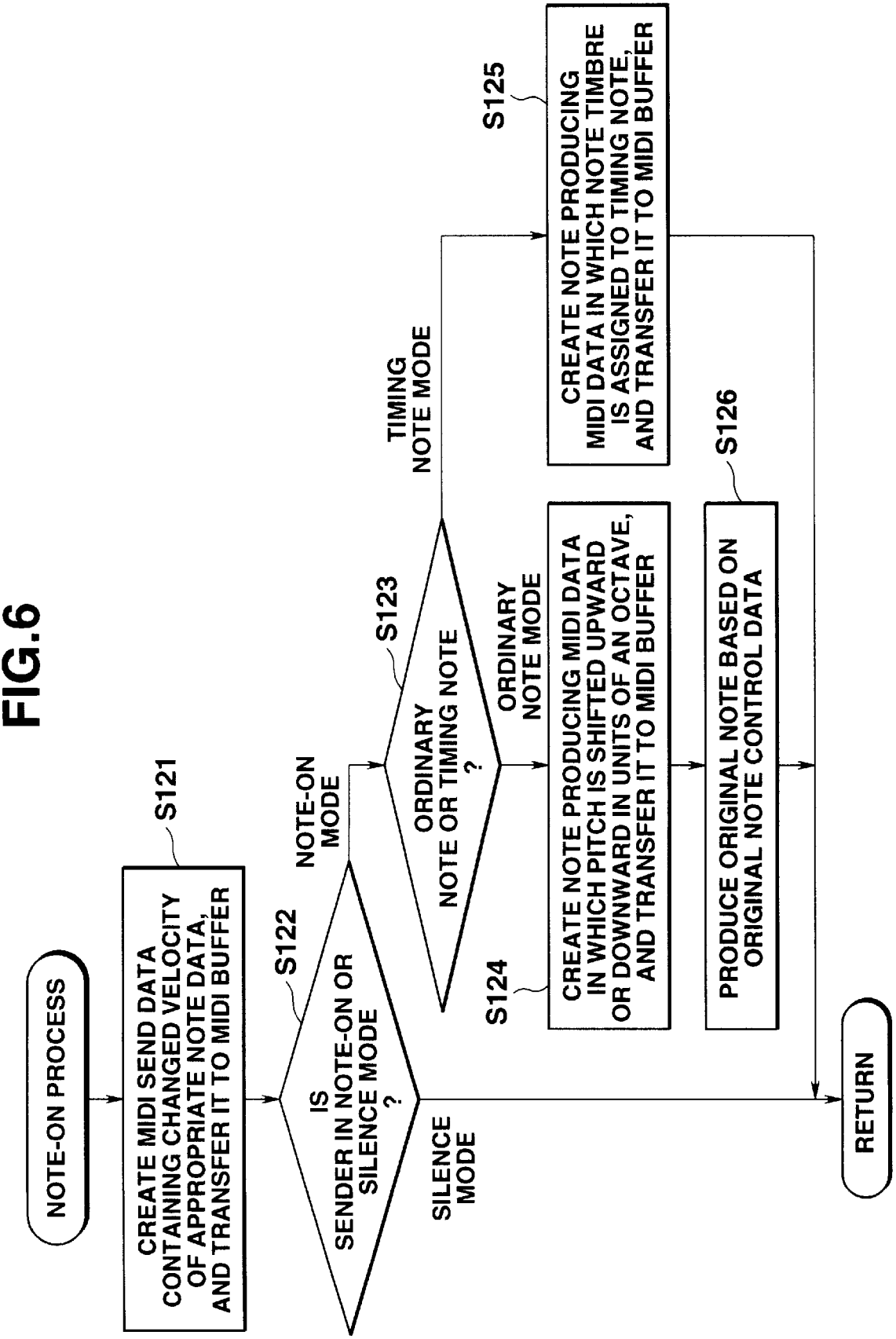
FIG. 6 is a flow chart of a musical note producing process performed in a note-on time period of FIG. 5.

FIG. 6 shows a flow of the note-on process in step S119 of the musical note producing/muting process of FIG. 5. In this process, the CPU produces MIDI send data which includes a changed velocity of the appropriate musical note data, and transfers it to a MIDI buffer (step S121). The CPU then determines whether the transmission system (sender) is in a silence mode in which no musical note is produced or a note-on mode (step S122). If the transmission system is in the silence mode, the CPU terminates the FIG. 6 process immediately. If the transmission system is in the note-on mode, the CPU determines whether the transmission system is in an ordinary note mode in which an ordinary musical note is produced or a timing note mode in which a timing note such as a click or castanets musical note is produced (step S123).

If the transmission system is in the ordinary note mode, the CPU then creates musical note producing MIDI data in which the pitch is shifted upward (toward a higher pitch) or downward (to a lower pitch) in units of an octave and transfers this data to the MIDI buffer (step S124). If the transmission system is in the timing note mode, the CPU produces musical note producing MIDI data in which a timbre of the produced musical note is assigned to the timing note, and transfers it to the MIDI buffer (step S125). After transfer of the musical note producing MIDI data in step S124 or S125, the CPU performs an original musical note producing process based on original or unchanged note control data (step S126), and then terminates the FIG. 6 process.

Figure 7:
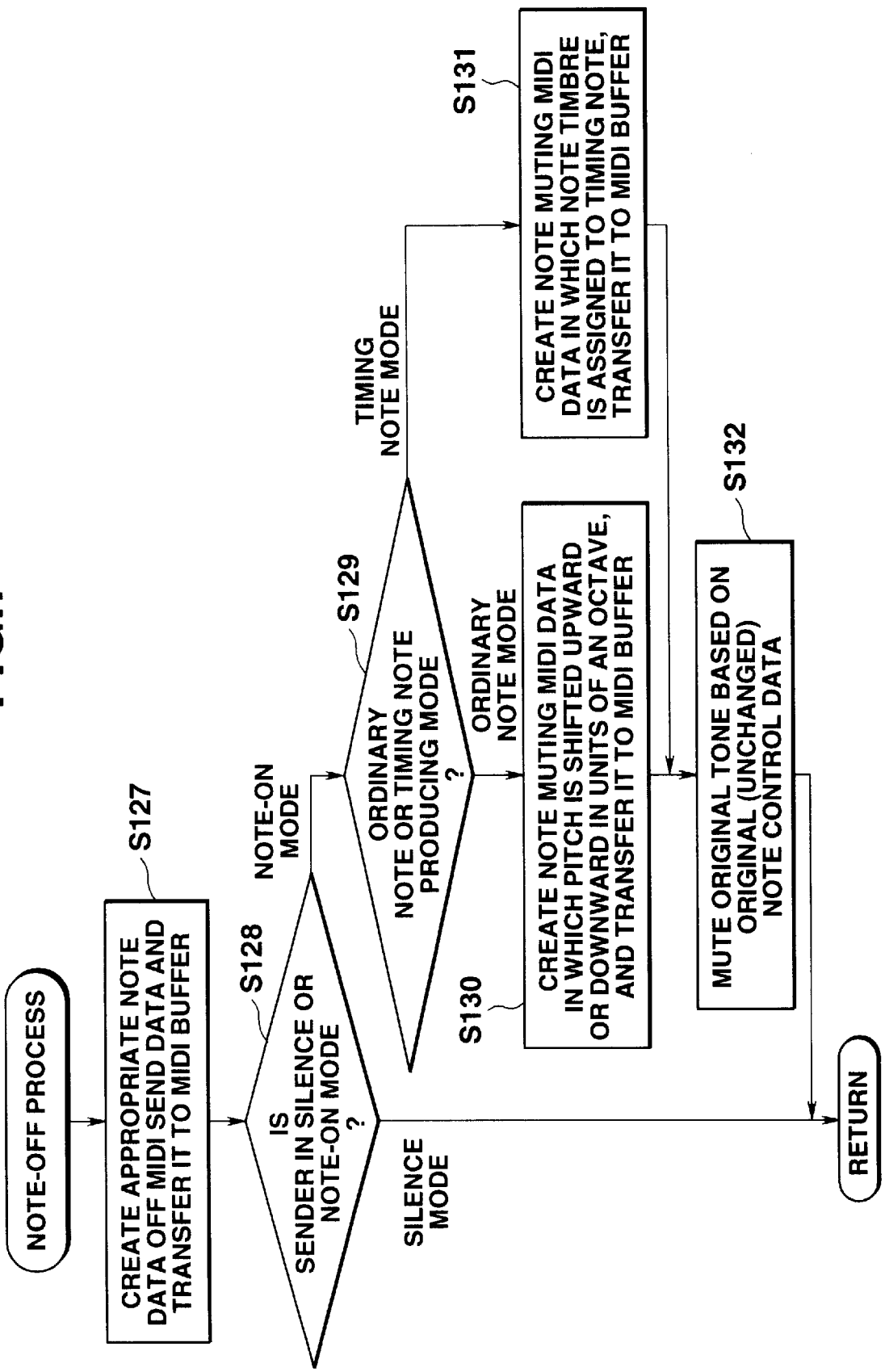
FIG. 7 is a flow chart of a musical note muting process performed in a note-off time period of FIG. 5.

FIG. 7 shows the note-off process in step S120 of the FIG. 5 musical note producing/muting process. In this process, the CPU produces MIDI send data to mute a musical note involved in the appropriate musical note data and transfers it to the MIDI buffer (step S127). The CPU then determines whether the transmission system is in the silence mode or in the note-on mode (step S128). If the transmission system is in the silence mode, the CPU terminates the FIG. 7 process immediately. If the transmission system is in the note-on mode, the CPU determines whether the transmission system is in the ordinary note mode in which the ordinary musical note is produced or in the timing note mode where a timing note such as a click or castanets note is produced (step S129).

When the transmission system is in the ordinary note mode, the CPU produces musical note muting MIDI data where the pitch is shifted upward (to a higher pitch) or downward (to a lower pitch) in units of an octave, and transfers this data to the MIDI buffer (step S130). If the transmission system is in the timing note mode, the CPU produces musical note muting MIDI data where a timbre of the produced musical note is assigned to a timing note, and transfers this data to the MIDI buffer (step S131). After transfer of the musical note muting MIDI data in step S130 or S131, the CPU performs the original musical note muting process based on the original or unchanged note control data (step S132), and then terminates the FIG. 7 process.

Figure 8:
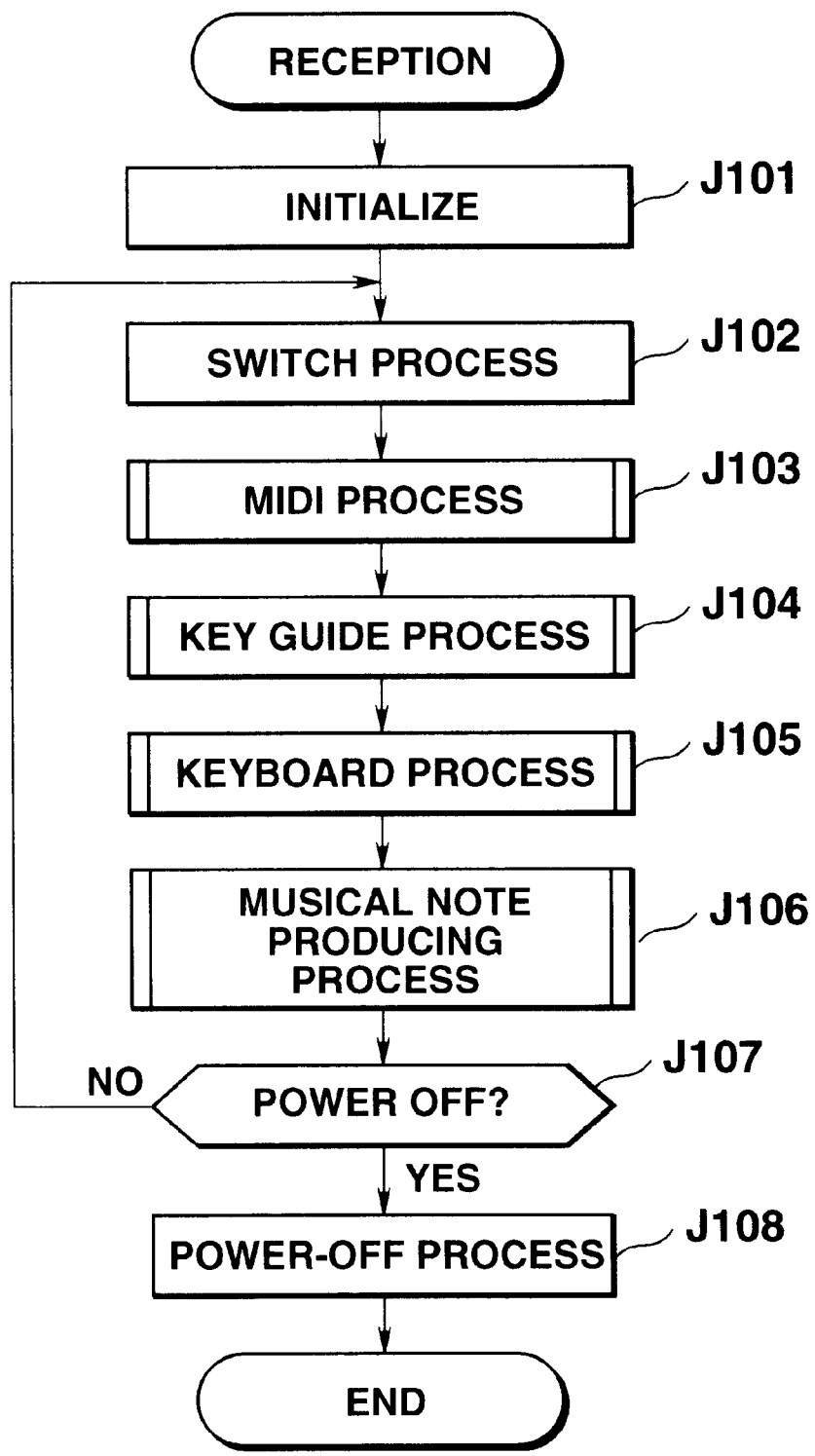
FIG. 8 is a main flow chart of reception of a reception end of the first embodiment.

The receiver receives the MIDI data from the transmitter and produces note control data. FIG. 8 shows a main flow of operation of the performance training apparatus at the reception end. After the predetermined initialization (step J101), the CPU performs a switch process (step J102), a MIDI process (step J103), a key guiding process (step J104), a keyboard process (step J105), and a musical note producing process (step J106). The CPU then determines whether a manual power-off operation is performed (step J107). If not, the CPU performs processes in step J102–J106. If so in step J107, the CPU performs a power-off process (step J108) and then terminates the FIG. 8 process.

Figure 9:
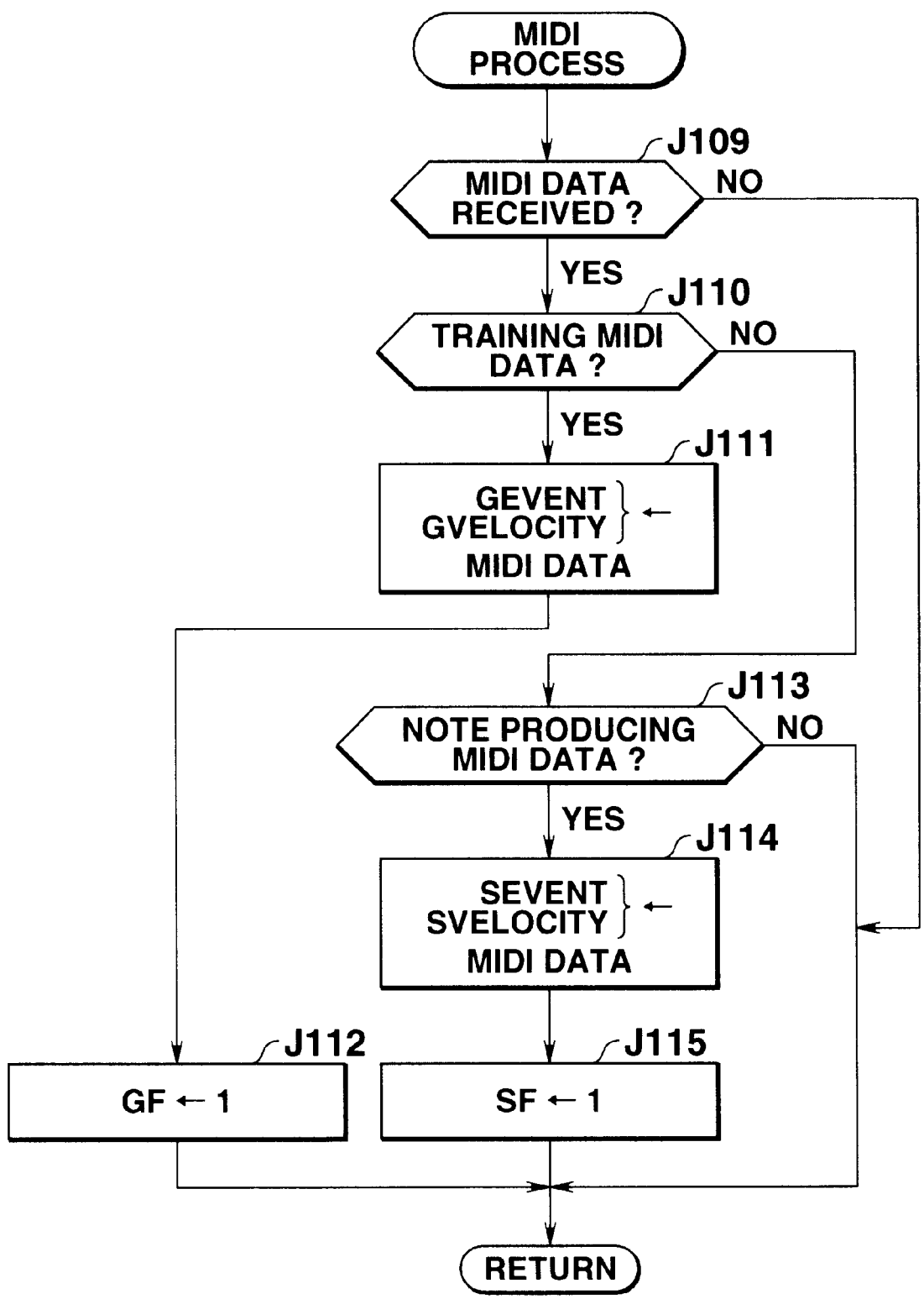
FIG. 9 is a flow chart of a MIDI process of FIG. 8.

FIG. 9 shows a MIDI process in step J103 of the main flow of FIG. 8. In this process, the CPU determines whether MIDI data is received from an external device on a real time basis (step J109). If not, the CPU returns its control to the main flow. If so in step J109, the CPU determines whether the MIDI data is for guiding the performance training (step J110). When the MIDI data is received, the CPU stores the MIDI data in the registers GEVELT and GVELOCITY (step J111). Then, the CPU sets a guide flag GF at 1 (step J112), and then returns its control to the main flow.

When the CPU determines in step J111 that the received data is not the guiding MIDI data, the CPU determines whether the received data is musical note producing MIDI data (step J113). If so, the CPU stores the MIDI data in the registers SEVENT and SVELOCITY (step J114). The CPU then sets a musical note producing flag at 1 (step J115), and then returns to its control to the main flow. If the received data is neither the guiding MIDI data nor the musical note producing MIDI data, the CPU returns its control to the main flow.

Figure 10:
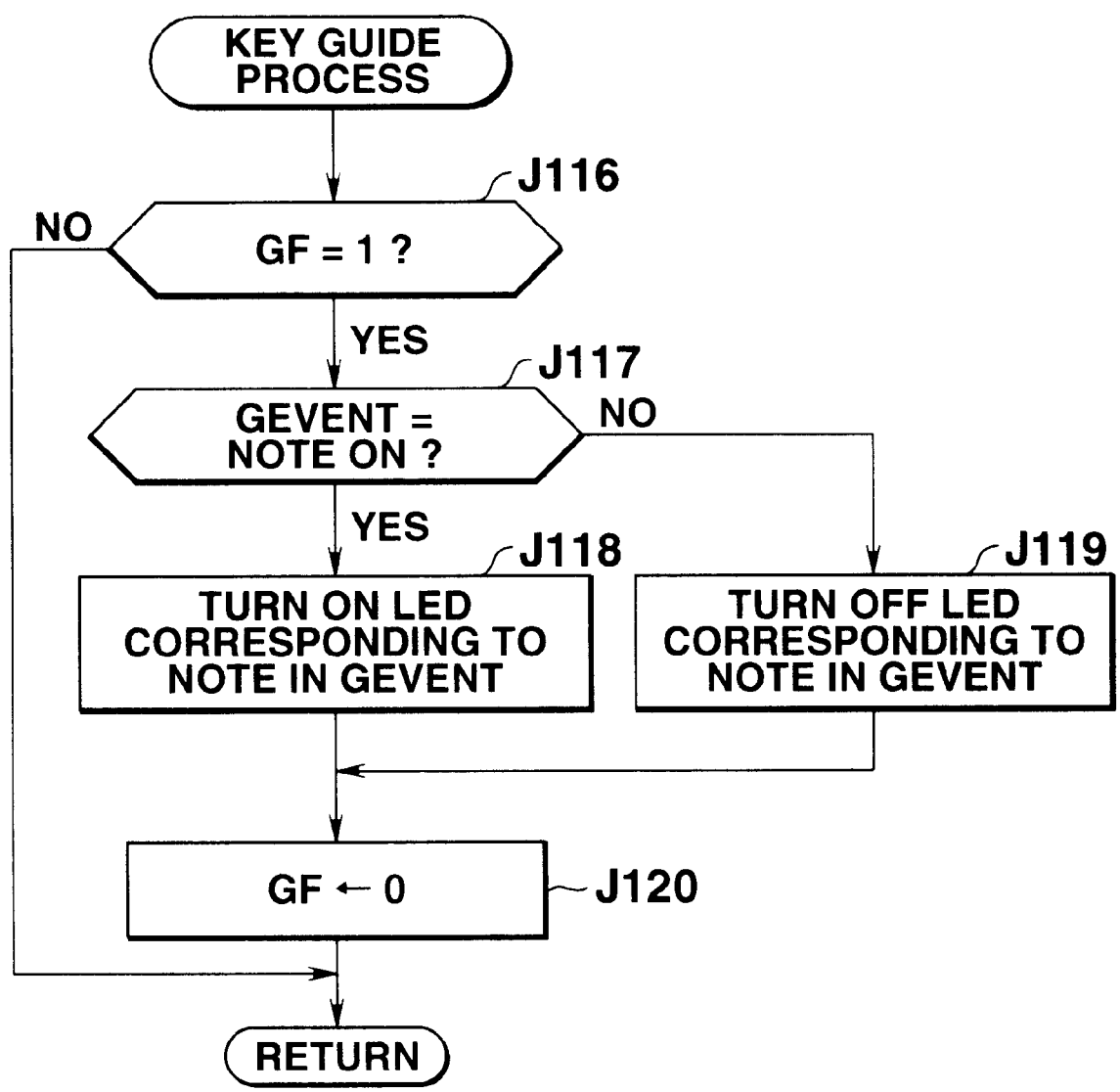
FIG. 10 is a flow chart of a key guide process of FIG. 8.

FIG. 10 shows the key guide process in step J104 of the main flow of FIG. 8. In this process, the CPU determines whether a guide flag GF is at 1 (step J116). If not, the CPU returns its control to the main flow. If the GF is at 1, the CPU determines whether the MIDI data in GEVELT is note-on data (step J117). If so, the CPU turns on an LED of a key corresponding to musical note data in a register GEVENT (step J118). If the MIDI data is note-off data, the CPU turns off an LED for the key to the musical note data in the GEVENT (step J119). After turning on or off the LED, the CPU resets the GF at 0 (step J129), and then returns its control to the main flow.

Figure 11:
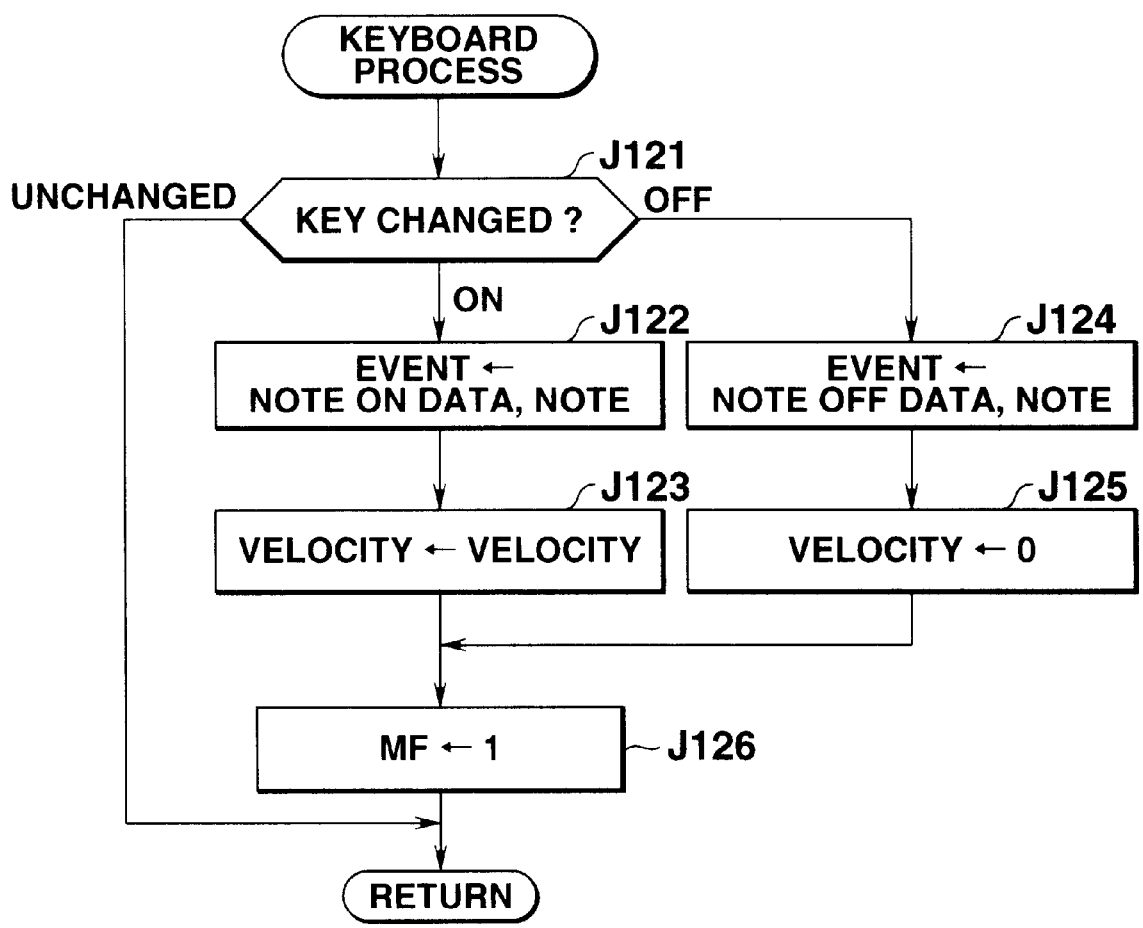
FIG. 11 is a flow chart of a keyboard process of FIG. 8.

FIG. 11 shows the keyboard process in step E105 of the main flow of FIG. 8. In this process, the CPU determines whether there is a key change (step J121). If not, the CPU returns its control to the main flow. If there is a key change from off to on, the CPU stores note-on data and musical note data in a register EVENT (step J122), and stores velocity data in a register VELOCITY (step J123). Conversely, if there is a key change from on to off, the CPU stores note-off data and musical note data in the register EVENT (step J124), and stores 0 in the register VELOCITY (step J125). After steps J123 on J125, the CPU then sets the musical note production flag HF at 1 (step J126) and then returns to its control to the main flow.

Figure 12:
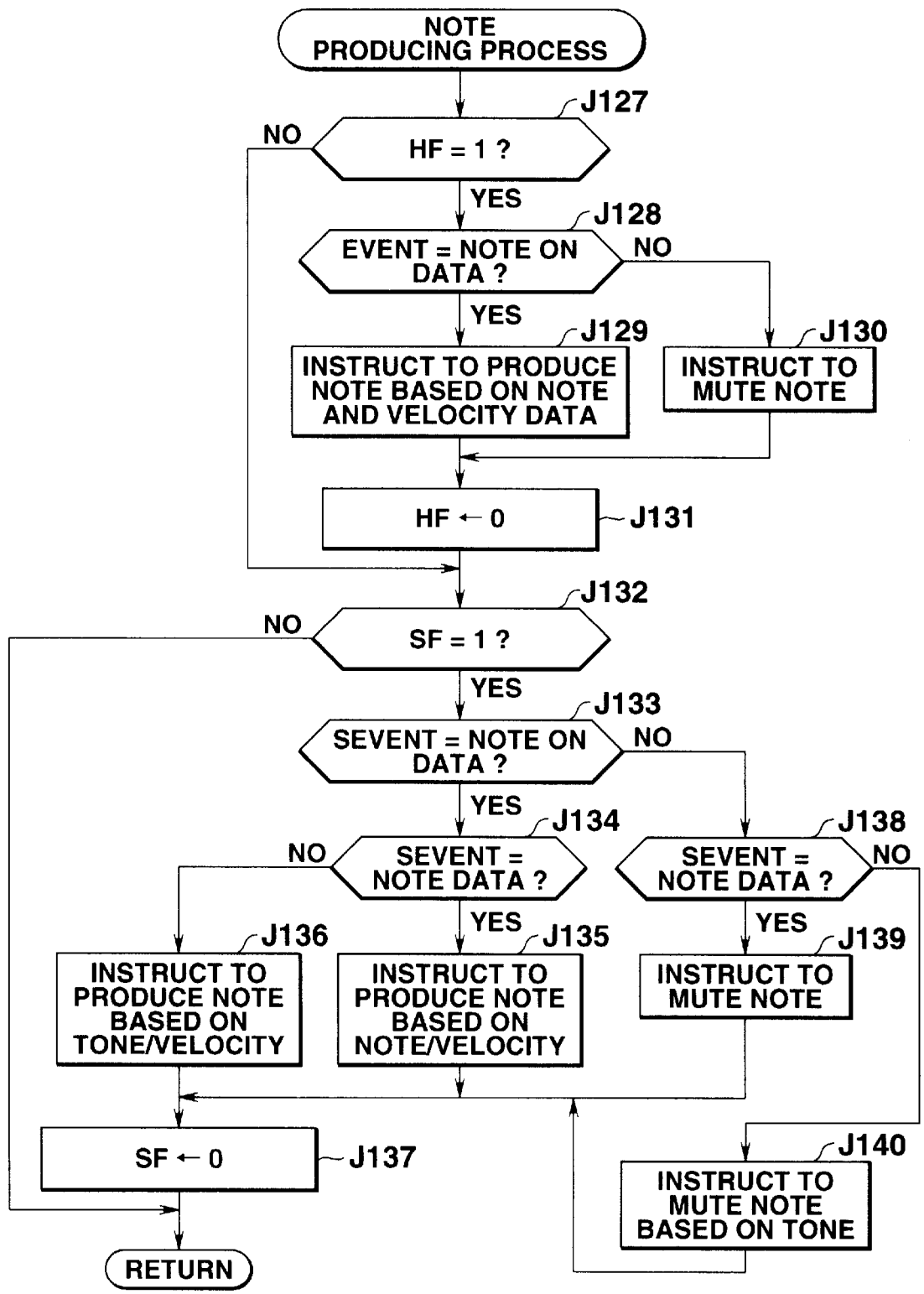
FIG. 12 is a flow chart of a musical note producing process of FIG. 8.

FIG. 12 shows the musical note producing process in step J106 of the FIG. 8 main flow. In this process, the CPU determines whether the HF is at 1 (step J127). If so, the CPU determines whether the data in the EVENT is note-on data (step J128). If so, the CPU instructs the sound source to produce a musical note based on the musical note data and velocity data (step J129). If the data in the EVENT is note-off data, the CPU instructs the sound source to mute the musical note based on the musical note data (step J130). Then, the CPU resets the HF at 0 (step J131).

After resetting the HF at 0 in step J131, or when the HF is at 0 in step J127, the CPU determines whether the SF is at 1 (step J132). If the SF is at 0, the CPU returns its control to the main flow. If the SF is at 1, the CPU determines whether the data in the SEVENT is note-on data (step J133). If so, the CPU determines whether the data in the SEVENT is musical note data or tone data (step J134).

If the data in the SEVENT is musical note data, the CPU instructs the sound source to produce a musical note based on the musical note data in the SEVENT and velocity data in the SVELOCITY (step J135). In this case, the CPU instructs the sound source to produce a musical note at a pitch shifted upward or downward in units of an octave. If the data in the SEVENT is tone data, the CPU instructs the sound source to produce a musical note based on the tone data in the SEVENT and velocity data in the SVELOCITY (step J136). In this case, the CPU instructs the sound source to produce a musical note at a timing note having a timbre of the tone data. After step J135 or 136, the CPU resets the SF at 0 (step J137) and then returns its control to the main flow.

If the data in the SEVENT is note-off data in step J133, the CPU then determines whether the data in the SEVENT is musical note data or tone data (step J138). If it is musical note data, the CPU instructs the sound source to mute the musical note (step J139). If it is the tone data, the CPU instructs the sound source to mute the tone (step J140). After step J139 or J140, the CPU resets the SF at 0 (step J137) and then returns its control to the main flow.

As described above, in the first embodiment, the performance training apparatus at the transmission end includes data setting means for setting the practicing contents of note control data, data conversion means for converting input note control data to training note control data based on the training contents set by the data setting means, and data transmitting means for transmitting the training note control data.

The performance training apparatus at the reception end includes data receiving means for receiving the note control data, data detecting means for detecting the training note control data included in the note control data received by the data receiving means, and data setting means for setting the contents of performance training data based on the training note control data detected by the data detecting means.

According to the performance training apparatus of the first embodiment, the sender as a skilled hand converts the input note control data to the training note control data and transmits it to the receiver. Thus, a beginner receiver can train a musical performance based on the received training musical note data. Thus, even the beginner can easily realize various training methods based on the received note control data.

In this case, if the set training note control data reduces the velocity data of the note control data, a musical note in the training channel is produced in a small volume. Thus, the trainee can easily discriminate the pitch of his or her produced musical note from a correct pitch of a small-volume musical note to thereby achieve effective training.

If the contents of a musical note produced based on the set training note control data involves a shift of the pitch of a musical note in units of an octave, or if they involve a change of the note produced based on the practicing note control data to a timing note such as a click or castanets a note having a predetermined pitch unrelated to the pitch of the musical note and having a timbre different from that of any of the note control data and if the note producing timing is the same as the original note control data, the trainee can easily recognize his or her performance timing to thereby achieve effective training.

Figure 13:
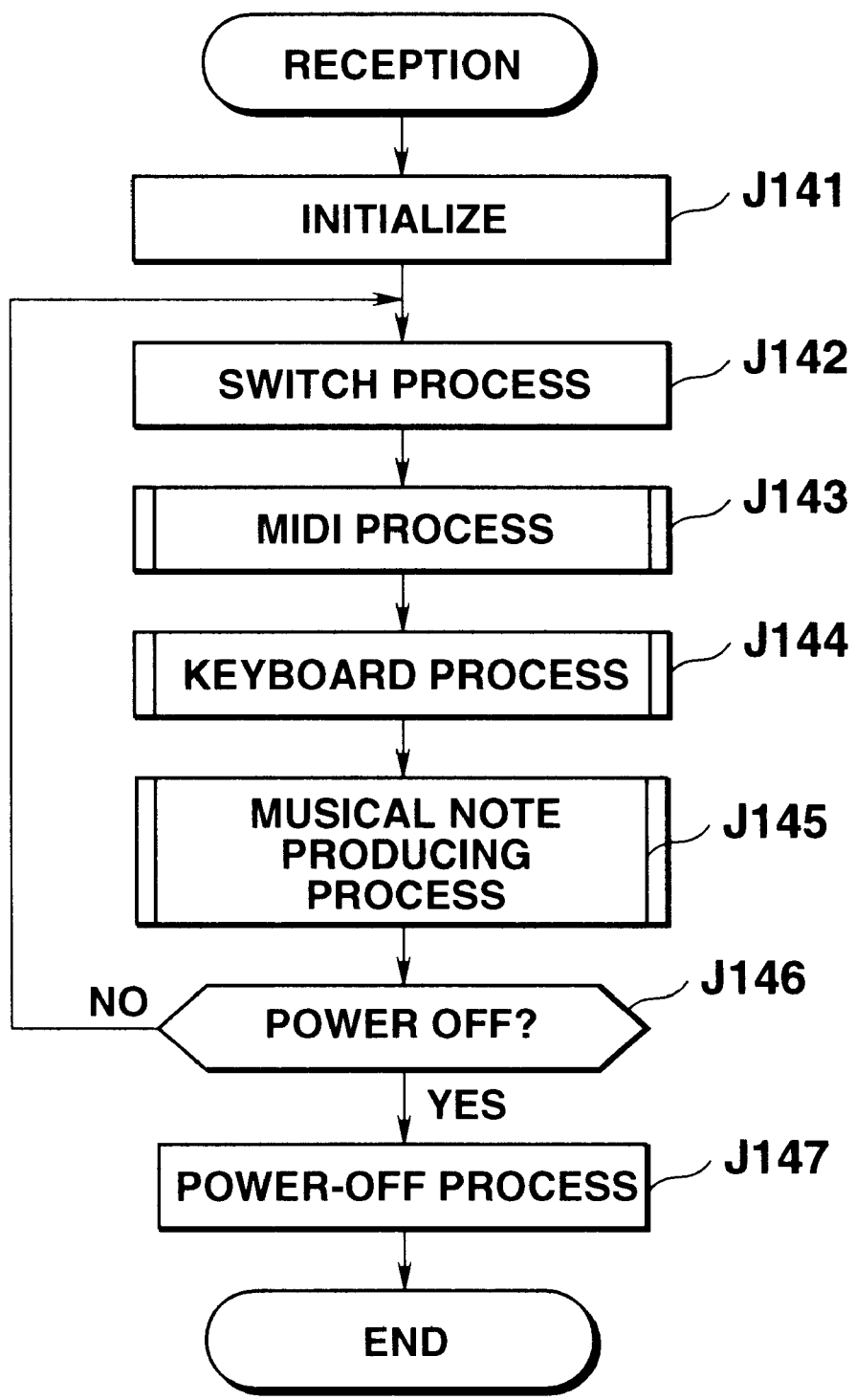
FIG. 13 is a main flow chart of reception of a reception end of a modification of the first embodiment.

A modification of the first embodiment will be described next. FIG. 13 is a main flow chart of a training process performed at the reception end in the modification. After the predetermined initialization (step J141), the CPU 1 performs a switch process (step J142), a MIDI process (step J143), a keyboard process (step J144), and a musical note producing process (step J145). The CPU 1 then determines whether a power-off operation has been performed manually (step J146). If not, the CPU performs the processing in steps J142–J145. If so in step J146, the CPU performs a power-off process (step J147) and then terminates the FIG. 13 process. In this modification, the CPU performs no key guide process.

Figure 14:
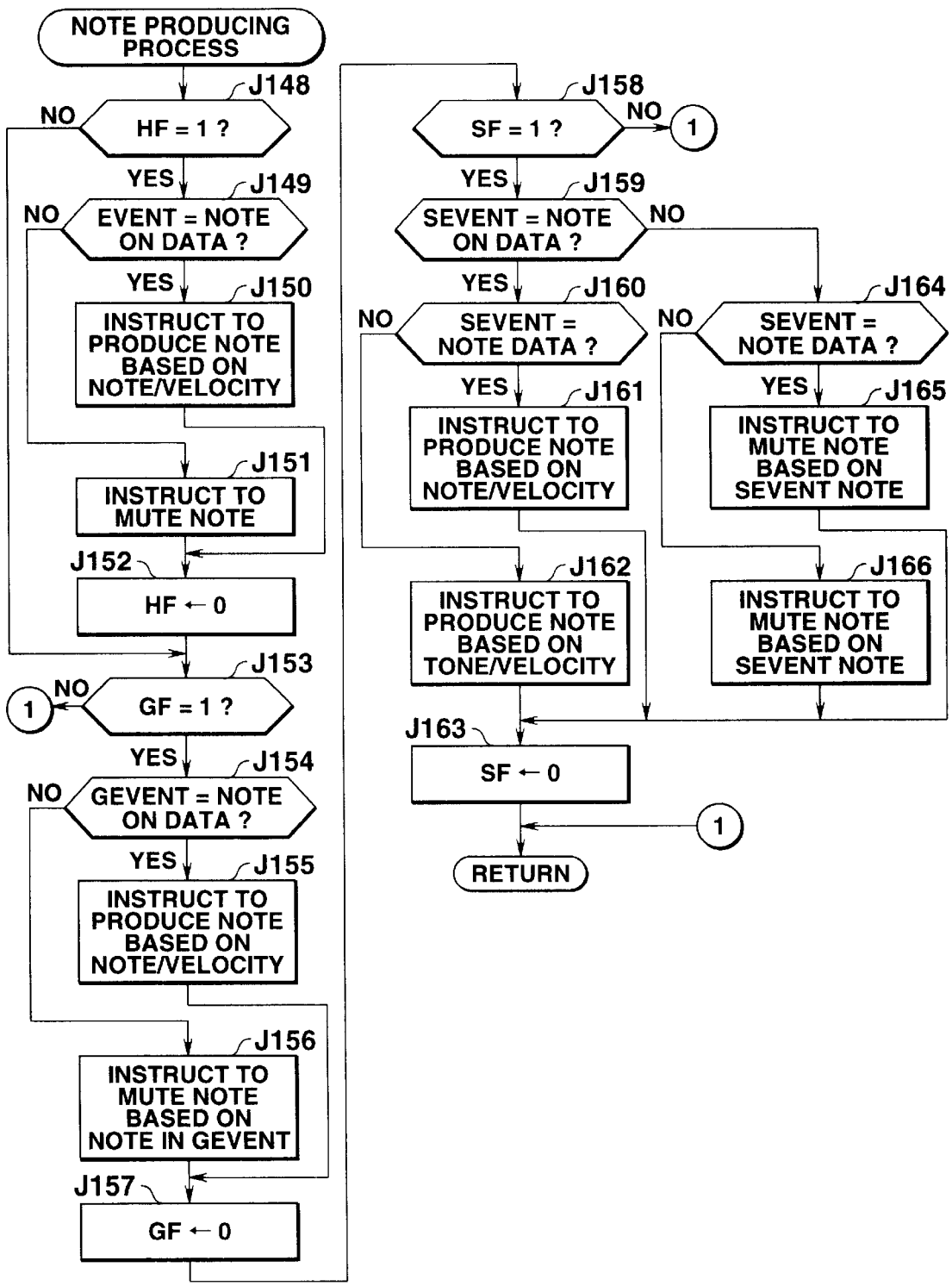
FIG. 14 is a flow chart of a musical note producing process of FIG. 13.

FIG. 14 is a flow chart of the musical note producing process in step J145 of the main flow of FIG. 13. In this process, the CPU 1 determines whether the HF is at 1 (step J148). If so, the CPU determines whether the data in the EVENT is note-on data (step J149). If so, the CPU instructs the sound source to produce a musical note based on the musical note and velocity data (step J150). If the data in the EVENT is note-off data, the CPU instructs the sound source to mute the musical note based on the musical note data (step J151). Then, the CPU resets the HF at 0 (step J152).

Then, or if the HF is at 0 in step J148, the CPU 1 determines whether the GF is at 1 (step J153). If so, the CPU determines whether the data in the GEVENT is note-on data (step J154). If so, the CPU instructs the sound source to produce a musical note based on the musical note data in the GEVENT and velocity data in the GVELOCITY (step J155). If the data in the GEVENT is note-off data, the CPU instructs the sound source to mute the musical note based on the note-off data (step J156). After step J155 or J156, the CPU resets the GF at 0 (step J157).

The CPU 1 then determines whether the SF is at 1 (step J158). If so, the CPU 1 determines whether the data in the SEVENT is note-on data (step J159). If so, the CPU determines whether the data in the SEVENT is musical note data or tone data (step J160). If it is musical note data, the CPU instructs the sound source to produce a musical note based on the musical note data in the SEVENT and velocity data in the SVELOCITY (step J161). If it is tone data, the CPU instructs the sound source to produce a musical note based on the tone data in the SEVENT and velocity data in the SVELOCITY (step J162). After step J161 or J162, the CPU resets the SF at 0 (step J163) and then returns its control to the main flow.

If the data in the SEVENT is note-off data in step J159, the CPU determines whether the data in the SEVENT is musical note data or tone data (step J164). If it is musical note data, the CPU instructs the sound source to mute the musical note (step J165). If it is tone data, the CPU instructs the sound source to mute the tone (step J166). After step J165 or J166, the CPU resets the SF at 0 (step J163), and then returns its control to the main flow. If the GF is 0 in step J153 or if the SF is 0 in step J158, the CPU returns its control to the main flow.

Since the MIDI process in step J143 of the FIG. 13 main flow is the same as the MIDI process performed by the transmission end of FIG. 9, further description thereof will be omitted. Since the keyboard process in step J144 in the FIG. 13 main flow is the same as that performed by the transmission end of FIG. 11, further description thereof will be omitted.

Figure 15:
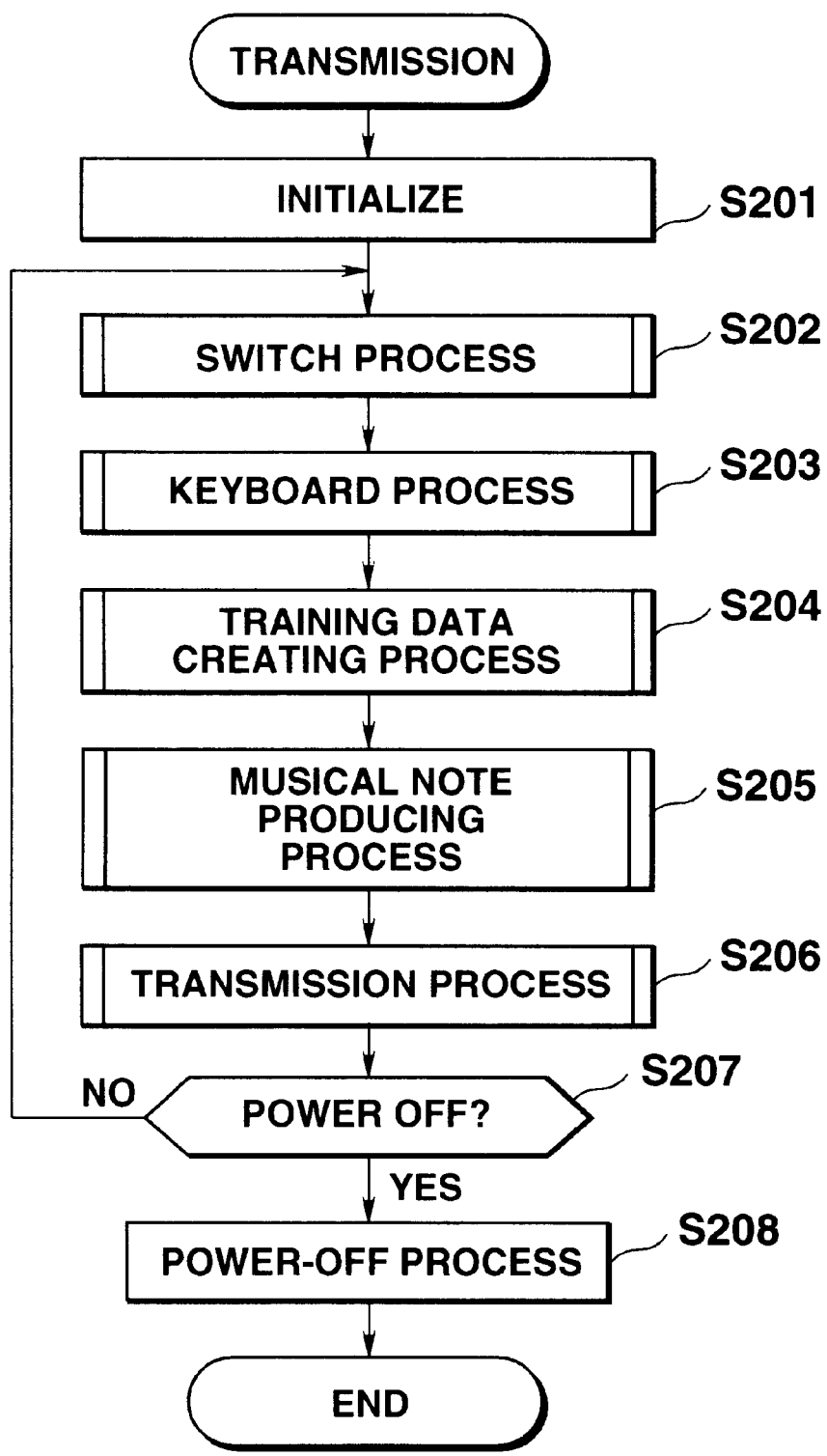
FIG. 15 is a main flow chart of transmission of a transmission end of a second embodiment.

A second embodiment will be described next. FIG. 15 shows a main flow operation of the transmission end in the second embodiment. After the predetermined initialization (step S201), the CPU performs a switch process (step S202), a keyboard process (step S203), a training data creating process (step S204), a musical note producing process (step S205), and a transmitting process (step S206). The CPU then determines whether a power-off process has been performed manually (step S207). If not, the CPU performs processing in steps S202–S206. If so in step S207, the CPU performs a power-off process (step S208), and then terminates the FIG. 15 flow.

Figure 16:
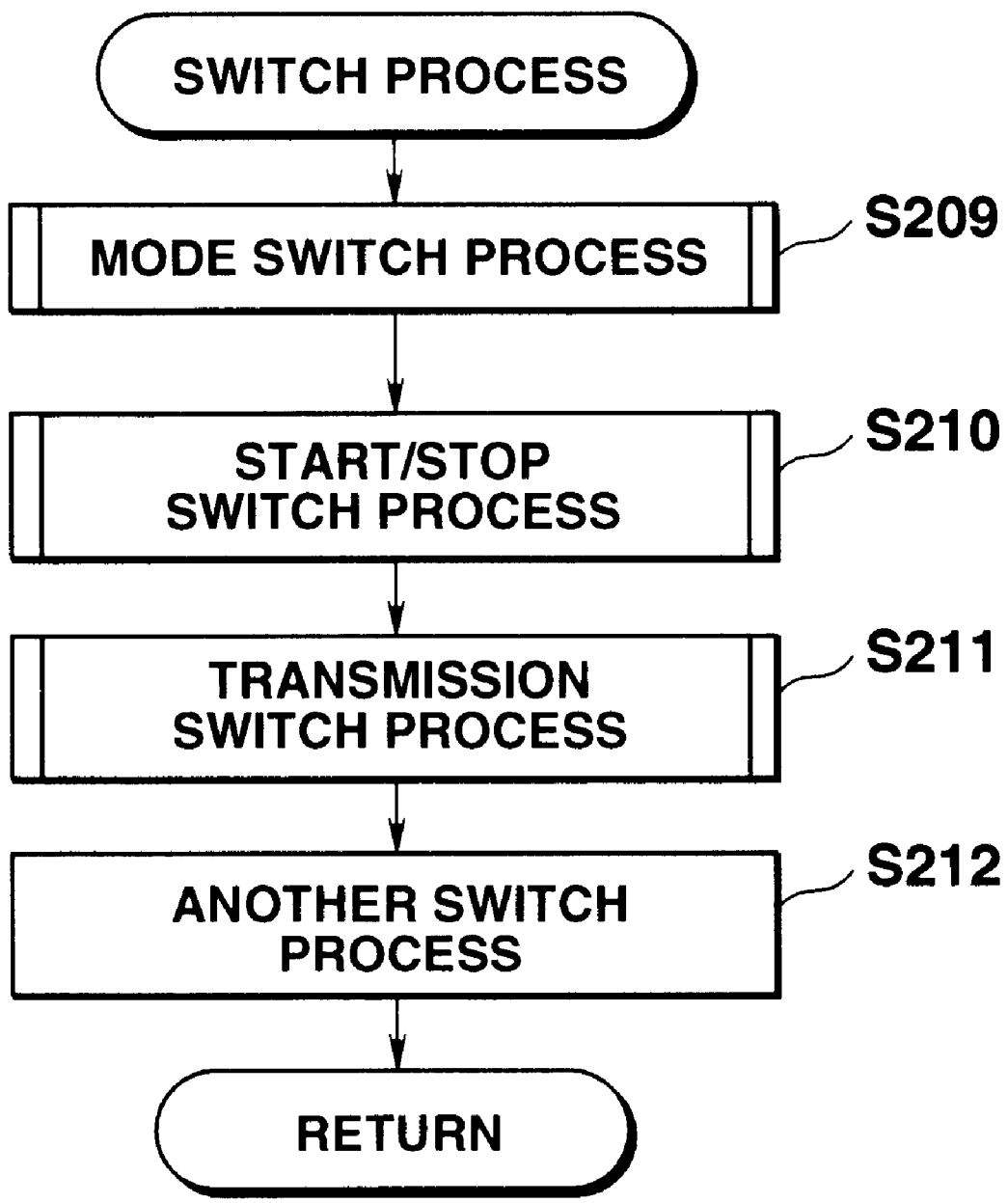
FIG. 16 is a flow chart of a switch process of FIG. 15.

FIG. 16 is a flow chart of the switch process in step S202 of the FIG. 15 main flow. In this process, the CPU performs a mode switch process (step S209), a start/stop process (step S210), a transmission switch process (step S211), and another switch process (step S212), and then returns its control to the main flow.

Figure 17:
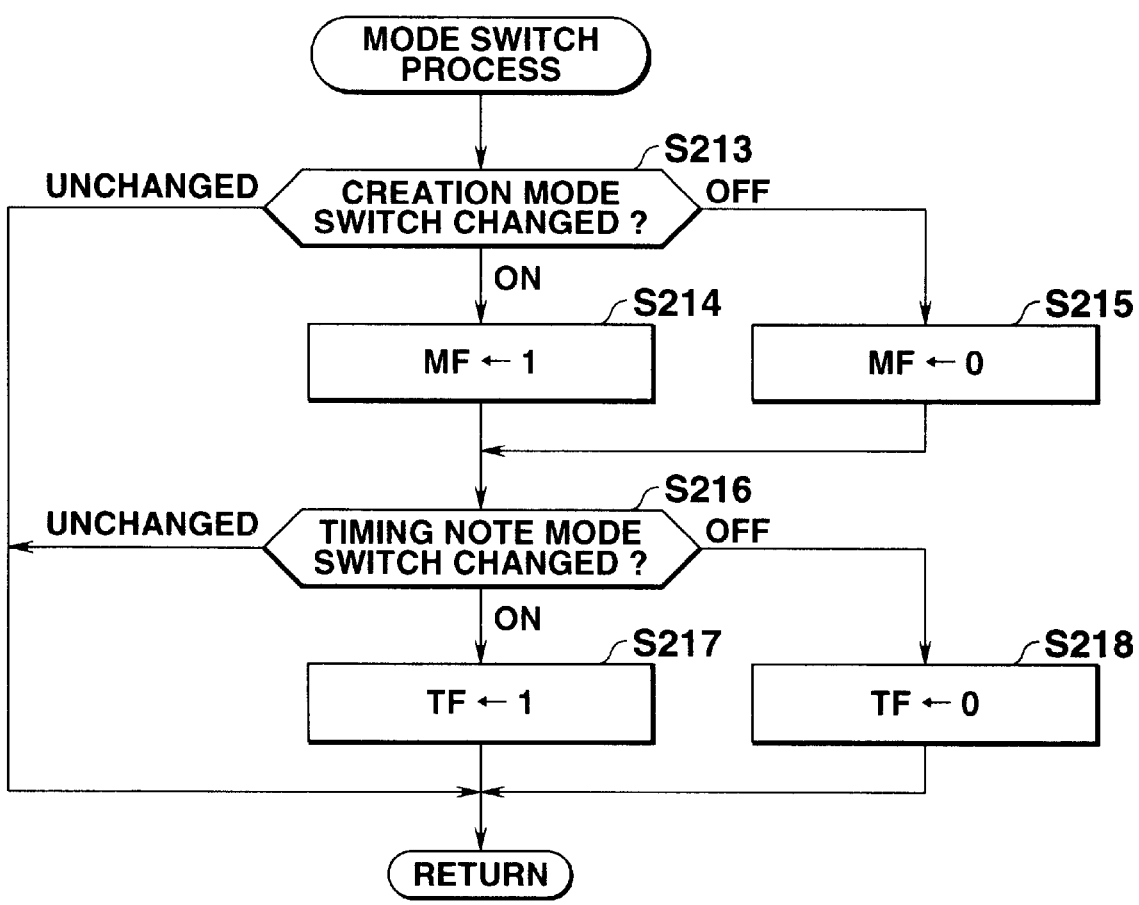
FIG. 17 is a flow chart of a mode switch process of FIG. 16.

FIG. 17 is a flow chart of the mode process in step S209 of the FIG. 16 switch process. In this process, the CPU determines whether a creation mode switch has changed (step S213). If not, the CPU returns its control to the FIG. 16 flow. When the production mode switch changes from off to on, the CPU sets a mode flag MF at 1 (step S214). When the creation mode switch changes from on to off, the CPU resets the MF at 0 (step S215).

After step S214 or S215, the CPU determines whether the timing sound mode switch has changed (step S216). If not, the CPU returns its control to the FIG. 16 flow. If so in step S216, the CPU sets the timing flag TF at 1 (step S217). When the switch has changed from on to off, the CPU resets the TF at 0 (step S218). After step S217 or S218, the CPU returns its control to the FIG. 16 flow.

Figure 18:
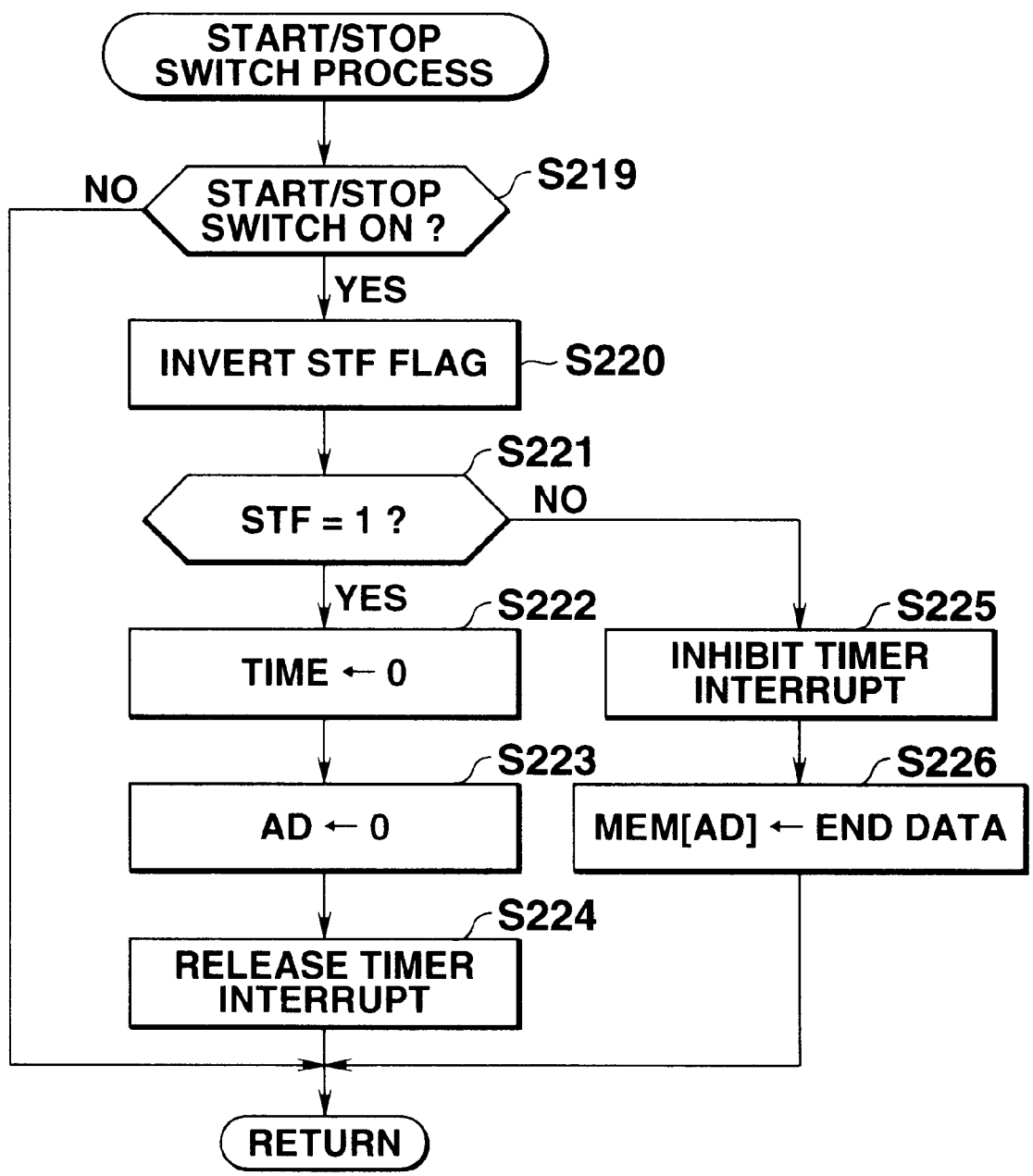
FIG. 18 is a flow chart of a start/stop switch process of FIG. 16.
Figure 19:
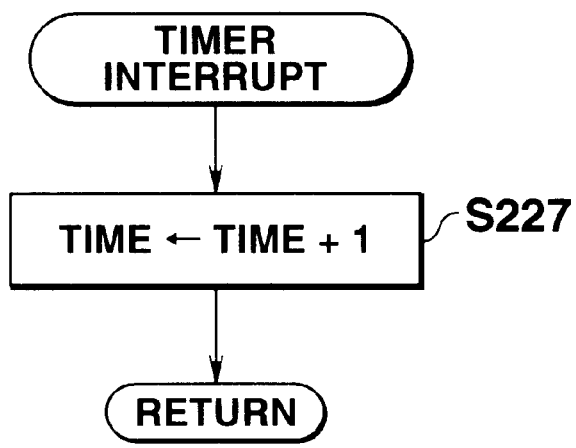
FIG. 19 is a flow chart of a time interrupt process of FIG. 16.

FIG. 18 is a flow chart of the start/stop process in step S219 in the FIG. 16 switch process. In this process, the CPU determines whether the start/stop switch is on (step S219). If not, the CPU returns its control to the FIG. 16 flow. If the switch is on, the CPU inverts a start flag STF (step S220). The CPU then determines whether the STF is at 1 (step S221). If so, the CPU then sets an address register AD at 0 (step S223), and then releases timer interrupt (step S224). If the STF at 0 in step S221, the CPU inhibits timer interrupt (step S225), and stores END data at a location MEM [AD] of the work RAM 3 which is specified by an address in the address register AD (step S226).

After the timer interrupt is released from its inhibition in step S224, or after the END data is stored in step S226, the CPU returns its control to the FIG. 16 flow. When the timer interrupt is released, the CPU increments the value of the register TIME each time a predetermined time elapses (step S227), and then returns its control to the FIG. 16 flow.

Figure 20:
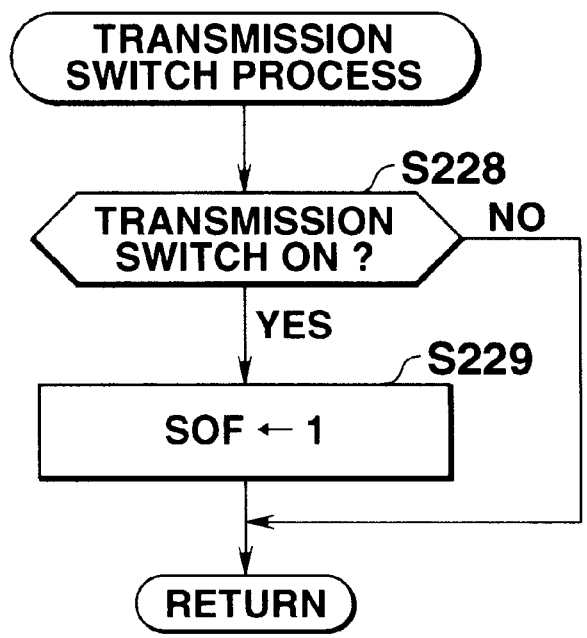
FIG. 20 is a flow chart of a transmission switch process of FIG. 15.

FIG. 20 is a flow chart of the transmission switch process in step S211 of the FIG. 16 switch process. In this process, the CPU determines whether the transmission switch has been turned on (step S228). If so, the CPU sets a transmission flag SOF at 1 (step S229). Thereafter or if the transmission switch is not turned on in step S228, the CPU returns its control to the FIG. 16 flow.

Figure 21:
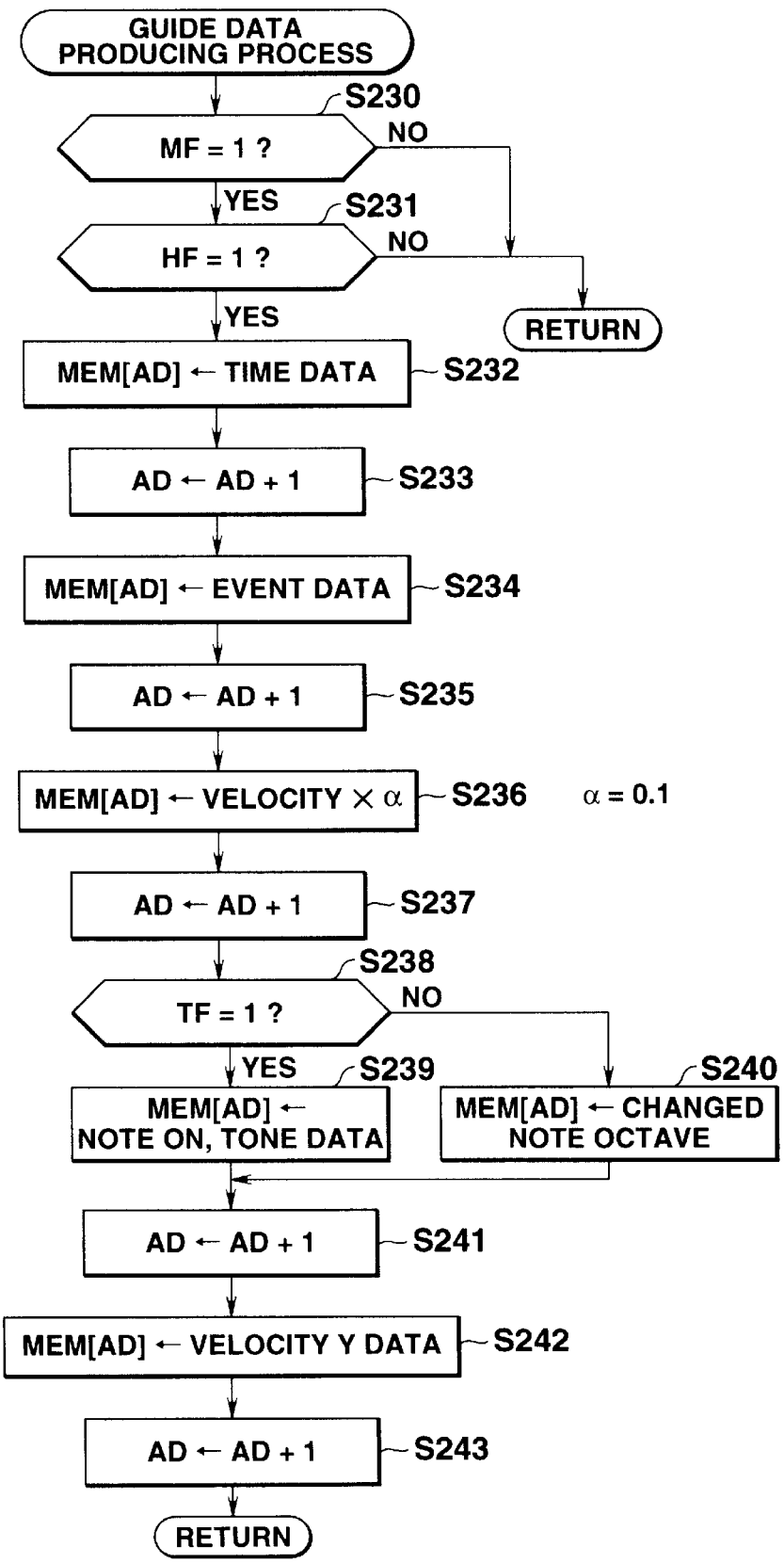
FIG. 21 is a flow chart of a training data creating process of FIG. 13.

FIG. 21 is a flow chart of the training data producing process in step S204 of the FIG. 15 main flow chart. In this process, the CPU determines whether a mode flag MF is at 1 (step S231). If any one of MF and HF is at 0, the CPU returns its control to the FIG. 15 main flow. If both MF and HF are at 1, the CPU stores time data in the TIME at a location MEM [AD] of the RAM specified by an address in the AD (step S232).

The CPU then increments the AD (step S233) and then stores the data in the EVENT at the appropriate location MEM [AD] (step S234). The CPU then increments the AD (step S235), stores the product of the velocity data in the VELOCITY and a predetermined value α smaller than 1 (for example, α=0.1) or a reduced velocity data at the appropriate location MEM [AD] (step S236), and then increments the AD (step S237).

Next, the CPU determines whether the TF is at 1 (step S238). If so, the CPU stores note-on data and tone data at the appropriate location MEM [AD] (step S239). If the TF is at 0, the CPU stores at the appropriate location MEM [AD] musical note data including a changed octave of the musical note data in the EVENT (step S240). After processing in step S239 or S240, the CPU increments the AD (step S241). Then, the CPU stores velocity data in the VELOCITY at the appropriate location MEM [AD] (step S242), increments the AD (step S243), and then returns its control to the FIG. 15 main flow.

Figure 22:
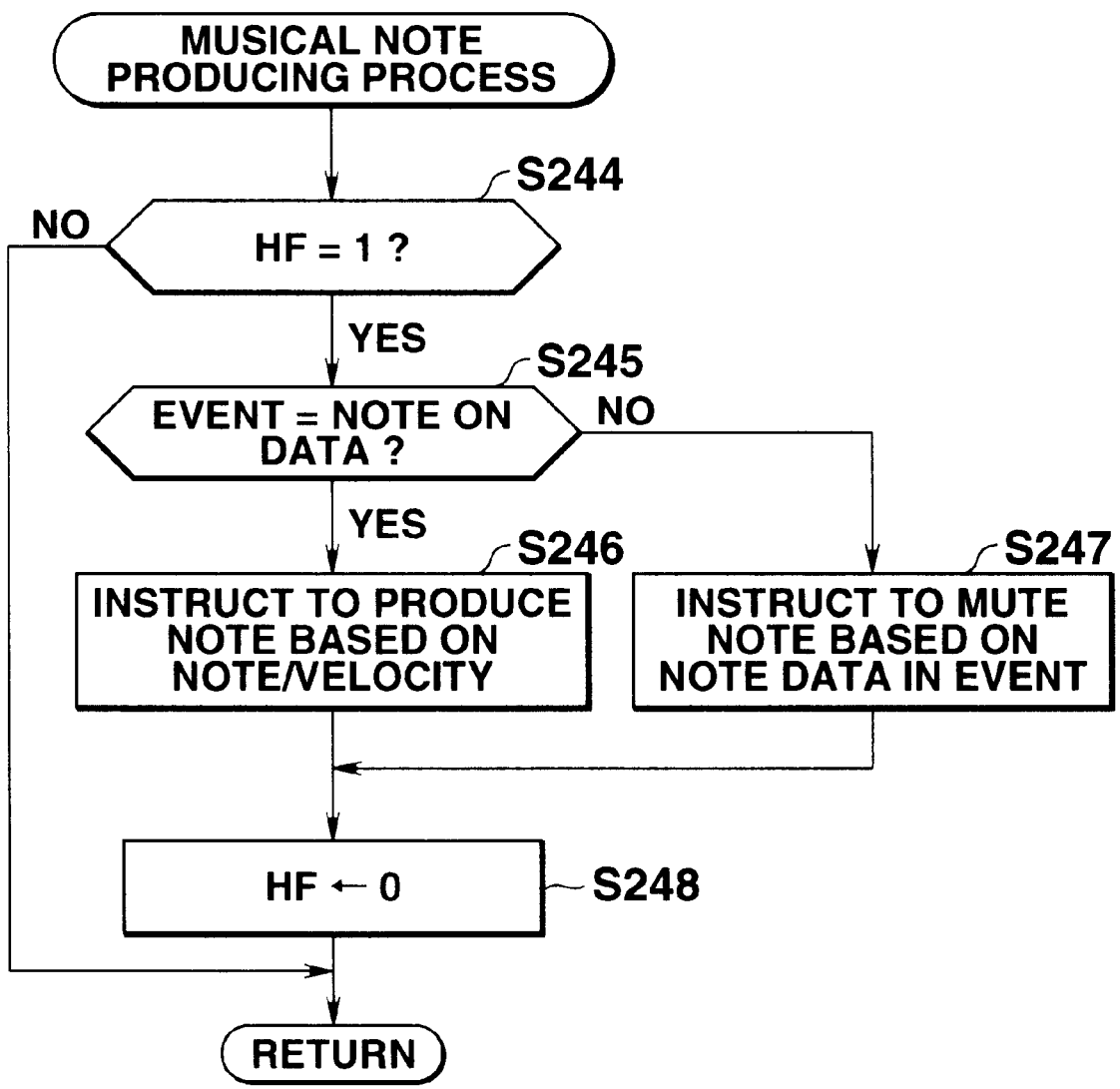
FIG. 22 is a flow chart of a musical note producing process of FIG. 13.

FIG. 22 is a flow chart of the note producing process in step S205 of the FIG. 15 main flow. In this process, the CPU 1 determines whether the musical note producing flag HF is at 1 (step S244). If not, the CPU then returns its control to the FIG. 15 main flow. If the HF is at 1, the CPU determines whether the data in the EVENT is note-on data (step S245). If so, the CPU instructs the sound source to produce a musical note based on the musical note data in the EVENT and the velocity data in the VELOCITY (step S246). If the data in the EVENT is note-off data, the CPU instructs the sound source to mute the musical note for the musical note data in the EVENT (step S247). After steps S246 or S247, the CPU resets the HF at 0 (step S248), and then returns its control to the FIG. 15 main flow.

Figure 23:
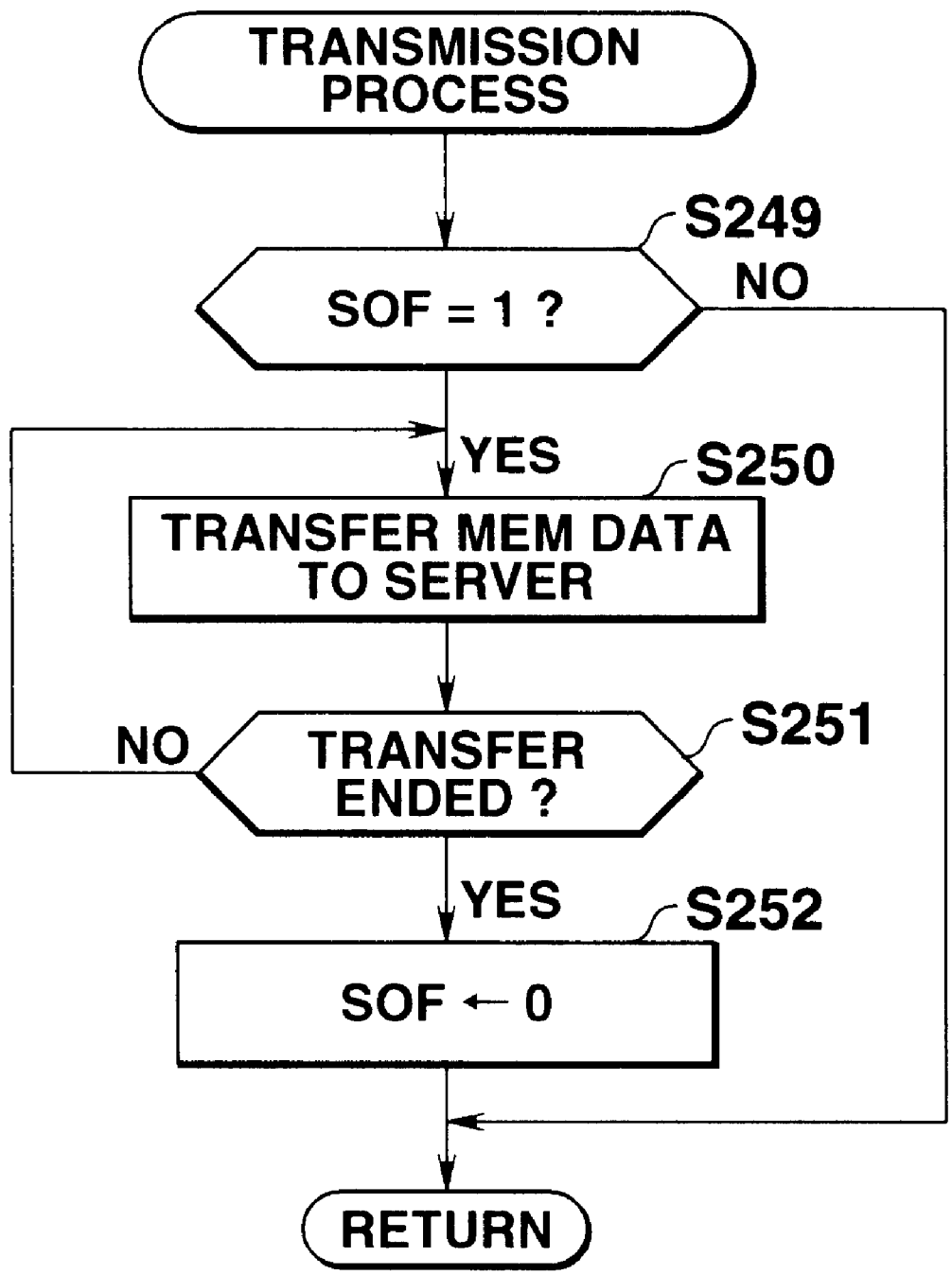
FIG. 23 is a flow chart of a transmission process of FIG. 13.

FIG. 23 is a flow chart of the transmitting process in step S206 of the FIG. 15 main flow. In this process, the CPU determines whether the transmission flag SOF is at 1 (step S249). If not, the CPU returns its control to the FIG. 15 main flow. If the SOF is at 1, the CPU transfers the data in the MEM to a server on the network (step S250). The CPU then determines whether the data transfer has ended (step S251). If not, the CPU continues to transfer the data in the MEM (RAM) in step S250. When the data transfer ends, the CPU resets the SOF at 0 (step S252), and then returns its control to the FIG. 15 main flow.

Figure 24:
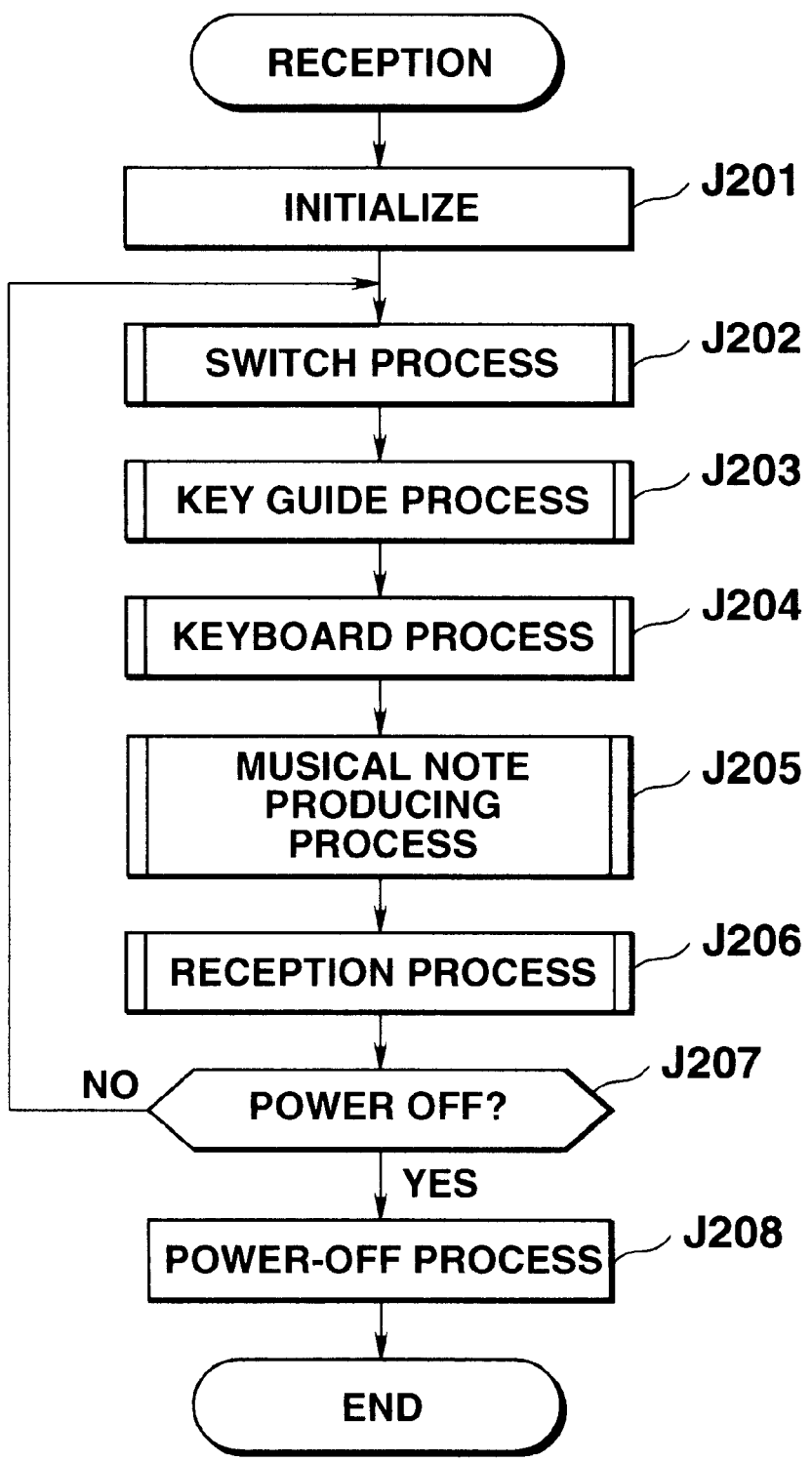
FIG. 24 is a main flow chart of reception of a reception end of the second embodiment.

FIG. 24 is a flow chart of reception of the reception end of the second embodiment. After the predetermines initialization (step J201), the CPU performs a switch process (step J202), a key guide process (step J203), a keyboard-process (step J204), a musical note producing process (step J205), and a reception process (step J206). The CPU then determines whether a power-off operation has been performed manually (step J207). If not, the CPU performs the processing in steps J202–J206. If so in step J207, the CPU performs a power-off process (step J208) and then terminates the FIG. 15 process.

Figure 25:
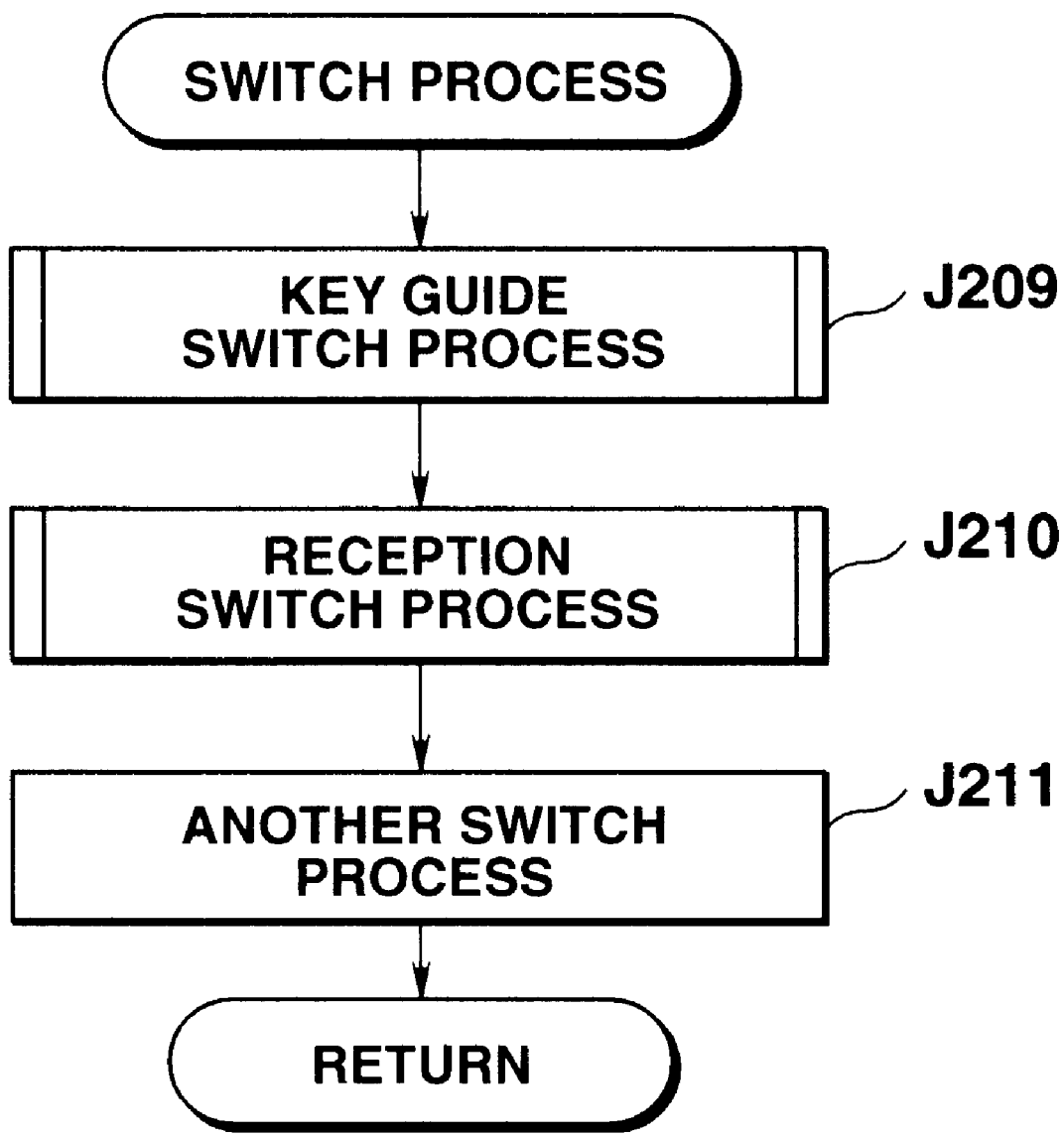
FIG. 25 is a flow chart of a switch process of FIG. 24.

FIG. 25 is a flow chart of the switch process in step J202 of the FIG. 24 main flow. In this process, the CPU performs a key guide switch process (step J209), a reception switch process (step J210), and another switch process (step J211) and then returns to its control to the main flow of FIG. 24.

Figure 26:
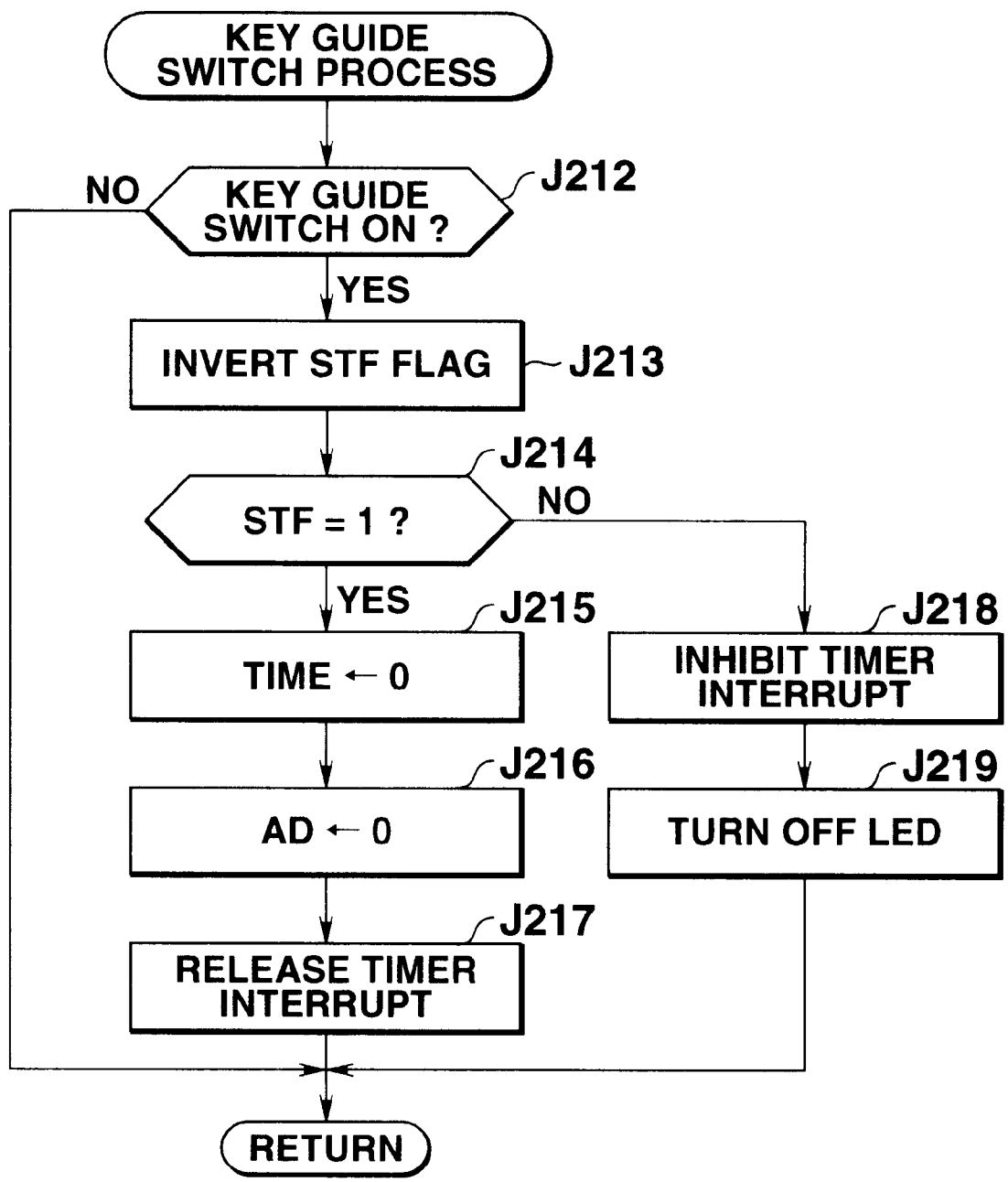
FIG. 26 is a flow chart of a key guide switch process of FIG. 25.

FIG. 26 is a flow chart of the key guide switch process in step J209 of the FIG. 25 switch process. In this process, the CPU determines whether the key guide switch has been turned on (step J212). If not, the CPU returns its control to the FIG. 25 flow. If the switch has been turned on, the CPU inverts a start flag STF (step J213). The CPU then determines whether the STF is at 1 (step S214). If so, the CPU resets the time register TIME at 0 (step J215), sets address register AD at 0 (step J216) and releases the timer interrupt (step J217). If the STF is at 0 in step J214, the CPU inhibits or masks the timer interrupt (step J218) and then turns off all the LEDS (step J219).

Figure 27:
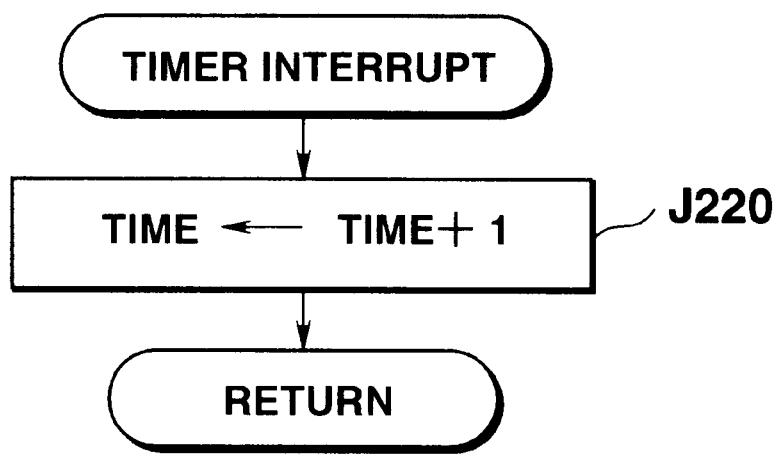
FIG. 27 is a flow chart of a timer interrupt process of FIG. 25.

After step J217 or J219, the CPU returns its control to the FIG. 25 flow. When the CPU releases the timer interrupt, the CPU then increments the value of the TIME each time a predetermined time elapses (step J220), as shown in FIG. 27, and then returns its control to the FIG. 25 flow.

Figure 28:
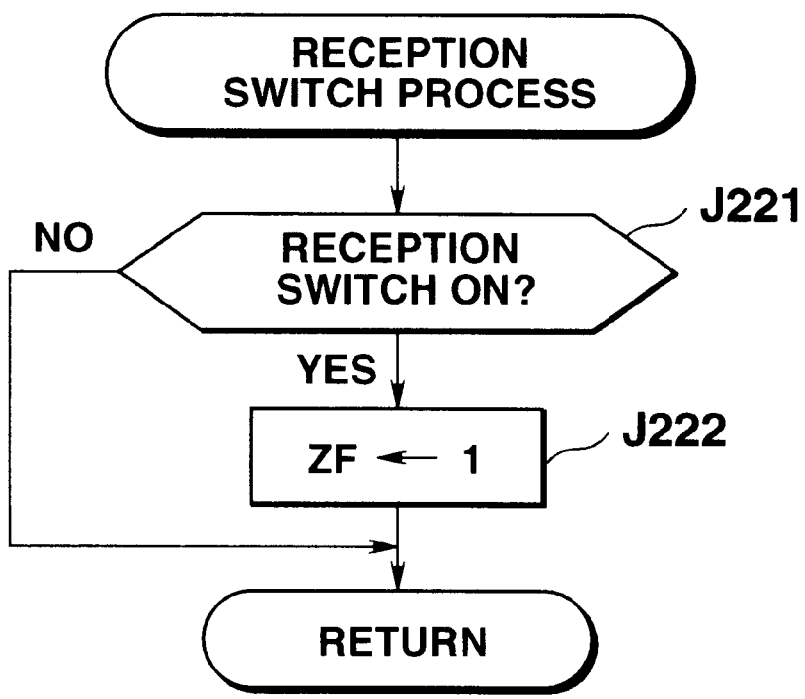
FIG. 28 is a flow chart of a reception process of FIG. 25.

FIG. 28 is a flow chart of the reception switch process in step J210 of the FIG. 25 switch process. In this process, the CPU determines whether the reception switch has been turned on (step J221). If not, the CPU returns its control to the FIG. 25 flow. If the reception switch has been turned on, the CPU sets a reception flag ZF at 1 (step S222), and then returns its control to the FIG. 25 flow.

Figure 29:
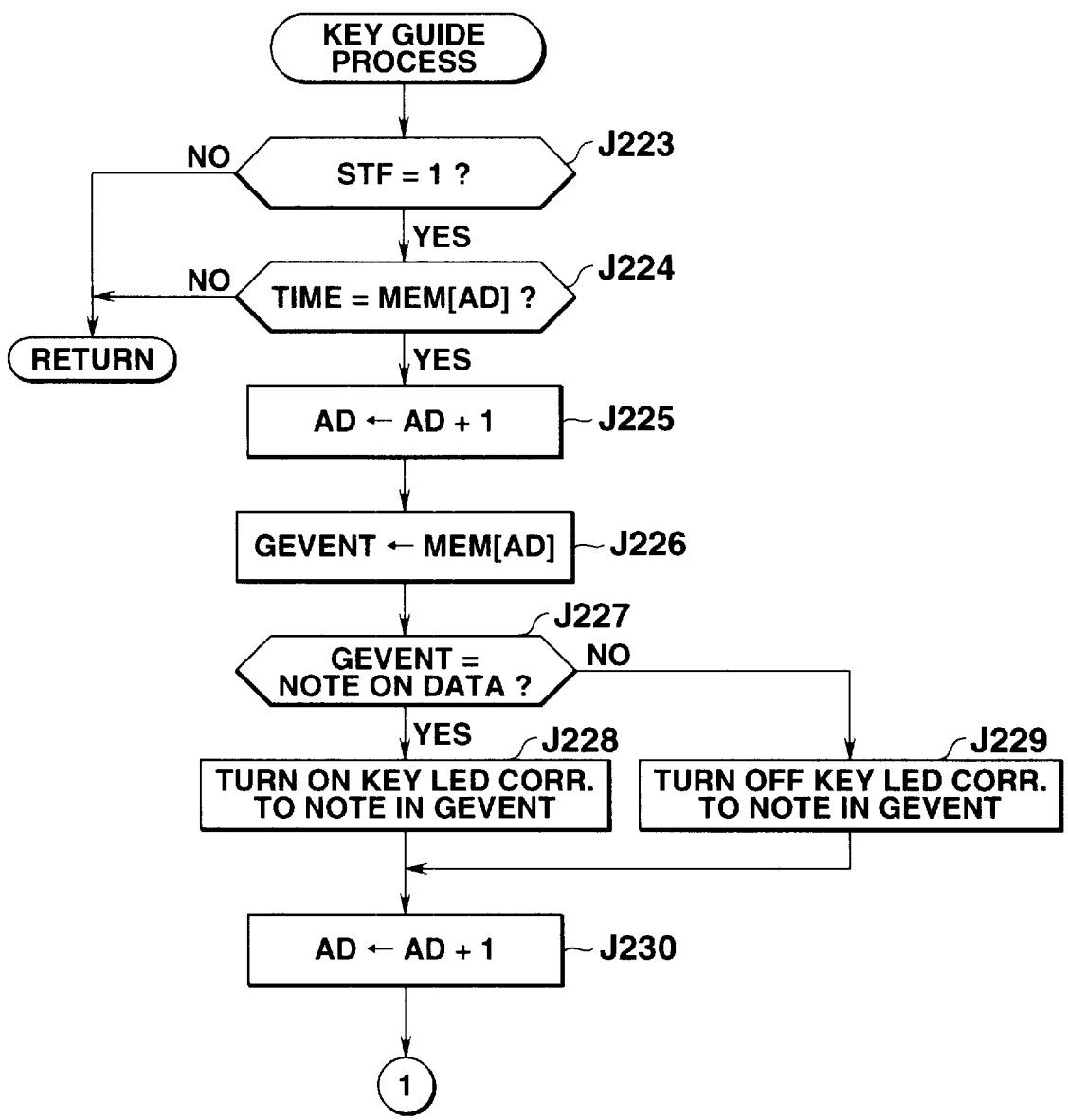
FIG. 29 is a flow chart of a key guide process of FIG. 24.
Figure 30:
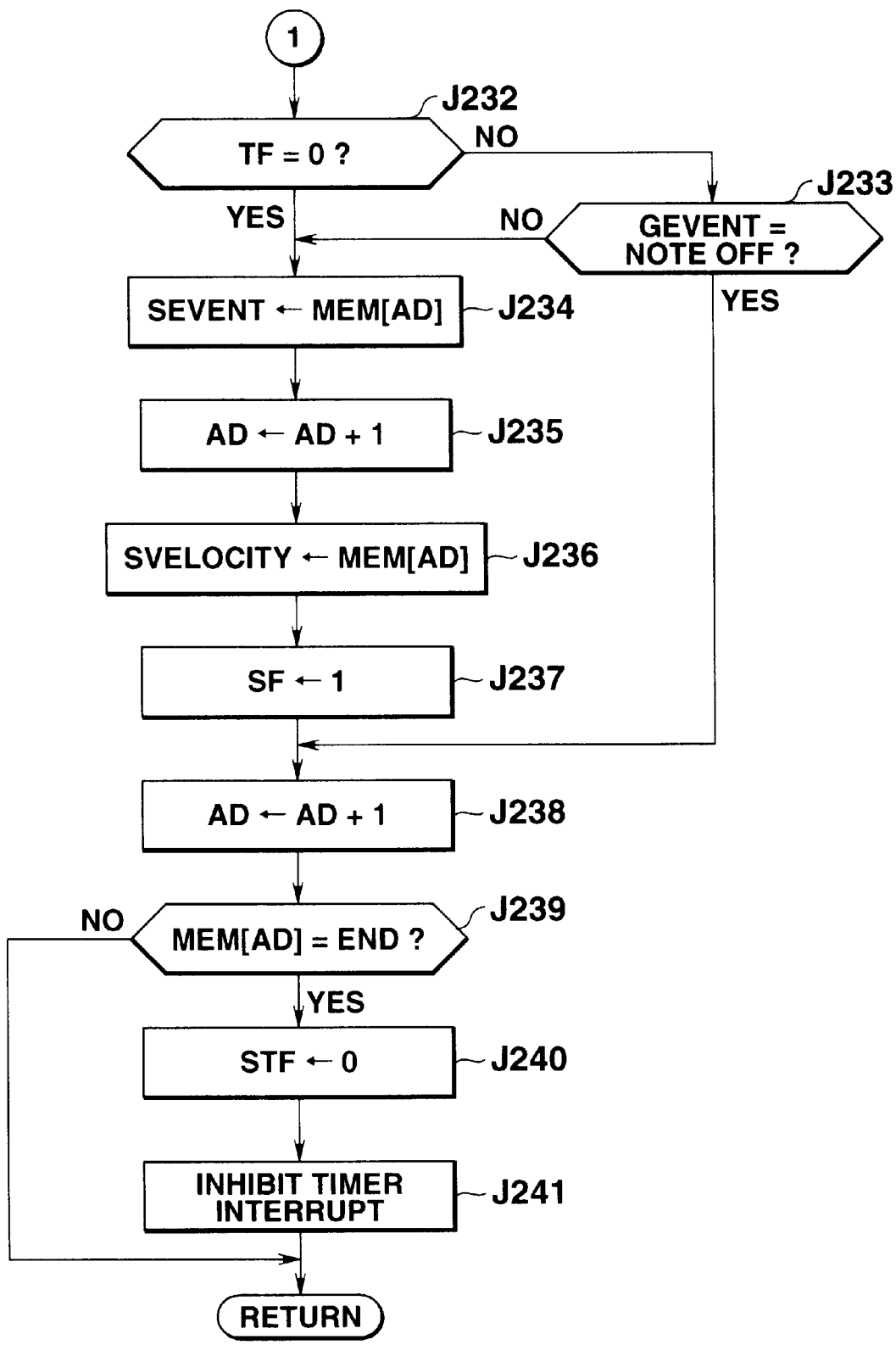
FIG. 30 is a flow chart of a portion of the key guide process continuing from FIG. 29.

FIGS. 29 and 30 are a flow chart of the key guide process in step J203 of the FIG. 24 main flow. In this process, the CPU determines whether the start flag STF is at 1 (step J223). If so, the CPU determines whether the data in the TIME has reached the time data at the memory location MEM [AD] (step J224). If the STF is at 0 in step J223, or if the data in the TIME has not reached that at the memory location MEM [AD], the CPU returns its control to the FIG. 24 main flow.

If the STF is at 1 and the data in the TIME has reached that at the MEM [AD], the CPU increments the AD (step J225). The CPU then stores in the register GEVENT the data at the location MEM [AD] of the RAM specified by an the GEVENT is note-on data (step J227). If so, the CPU then turns on an LED for a key corresponding to the musical note data in the GEVENT (step J228). If the data in the GEVENT is note-off data, the CPU then turns off an LED for a key corresponding to the musical note data in the GEVNET (step J229). After turning on/off the LED, the CPU increments the AD (step J230).

The CPU then determines whether the timing flag TF is at 0 in FIG. 30 (step J232). If the TF is at 1, the CPU then determines whether the data in the GEVENT is note-off data (step J233). If the TF is 0 or if the data in the GEVENT is note-on data, the CPU then stores in the register SEVENT the data at the location MEM [AD] of the RAM specified by an address in AD (step J234). The CPU then increments the AD (step J235) and stores the data at the appropriate location MEM [AD] in the register SVELOCITY (step J236), and then sets the musical note production flag SF at 1 (step J237).

After setting the SF or if the data in the GEVENT is note-off data in step J233, the CPU increments the AD (step J238), determines whether the data at the location MEM [AD] is END data (step J239). If not, the CPU returns its control to the FIG. 24 main flow. If so in step J239, the CPU then resets the STF at 0 (step J240), inhibits the timer interrupt (step J241) and then returns its control to the FIG. 24 main flow.

The keyboard process in step J204 of the main flow is the same as the FIG. 11 flow in the first embodiment, and further description thereof will be omitted. The musical note producing process in step J205 of the main flow is the same as the FIG. 12 flow of the first embodiment, and further description thereof will also be omitted.

Figure 31:
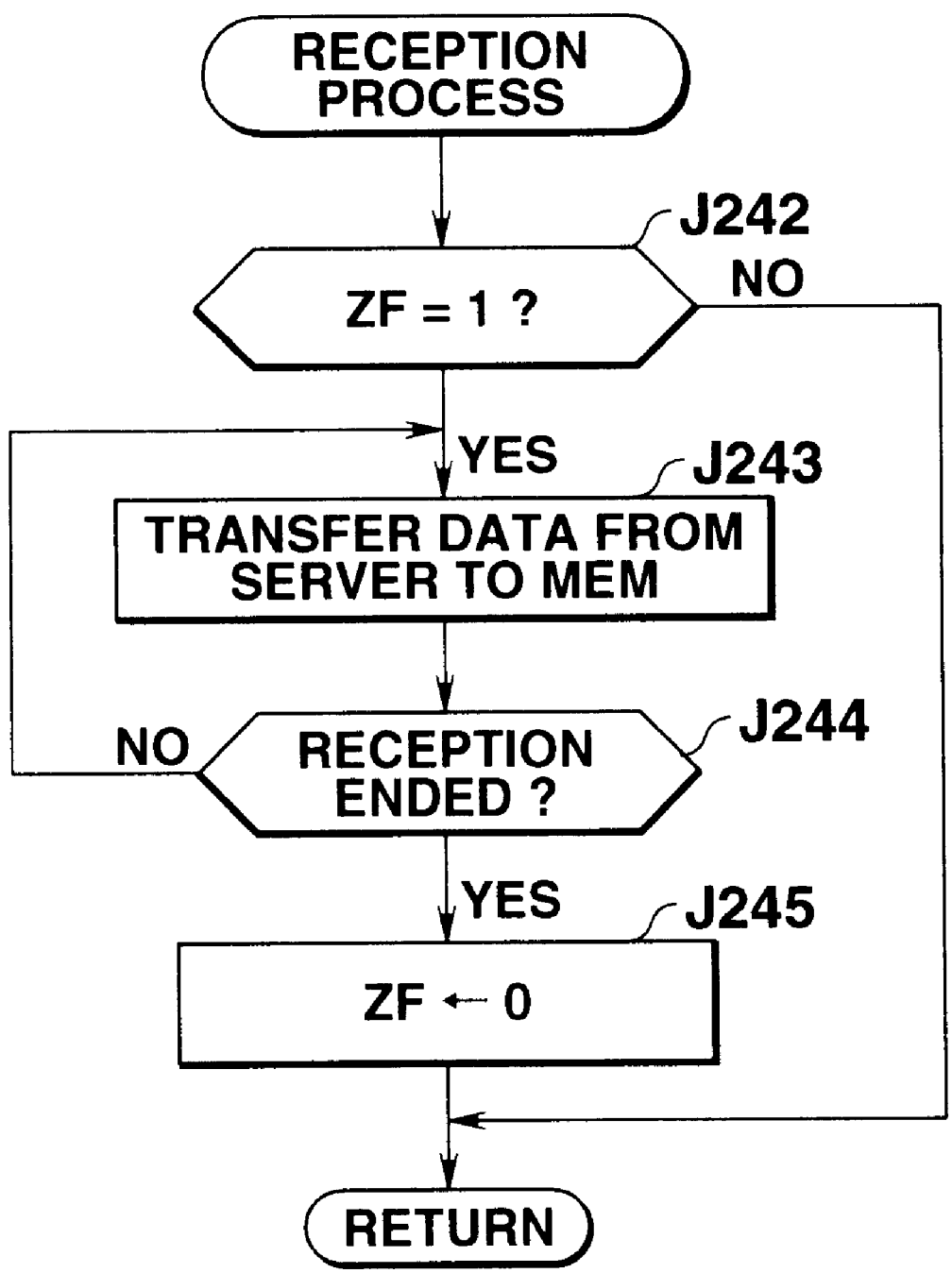
FIG. 31 is a flow chart of a reception process of FIG. 24.

FIG. 31 is a flow chart of the reception process in step J206 of the main flow. In this process, the CPU 1 determines whether the reception flag ZF is at 1 (step J242). If the reception flag ZF is at 0, the CPU then returns its control to the FIG. 24 main flow. If the ZF is at 1, the CPU then transfers to the RAM the data received from the server on the network (step J243). The CPU then determines whether the data reception from the server has ended (step J244). If not, the CPU then continues the data transfer in step J243. If the reception has ended, the CPU then resets the ZF at 0, and then returns its control to the FIG. 24 main flow.

A modification of the process performed by the reception end in the second embodiment will be described next with reference to a main flow chart of FIG. 32. After the predetermined initialization (step J246), the CPU 1 performs a switch process (step J247), a keyboard process (step J248), a training data reading process (step J249), a musical note producing process (step J250), and a reception process (step J251). The CPU then determines whether a power-off operation has been performed manually (step S252). If not, the CPU performs processing in steps S247–S251. If so in step S252, the CPU performs a power-off process (step S253) and then terminates the FIG. 32 process.

Figure 32:
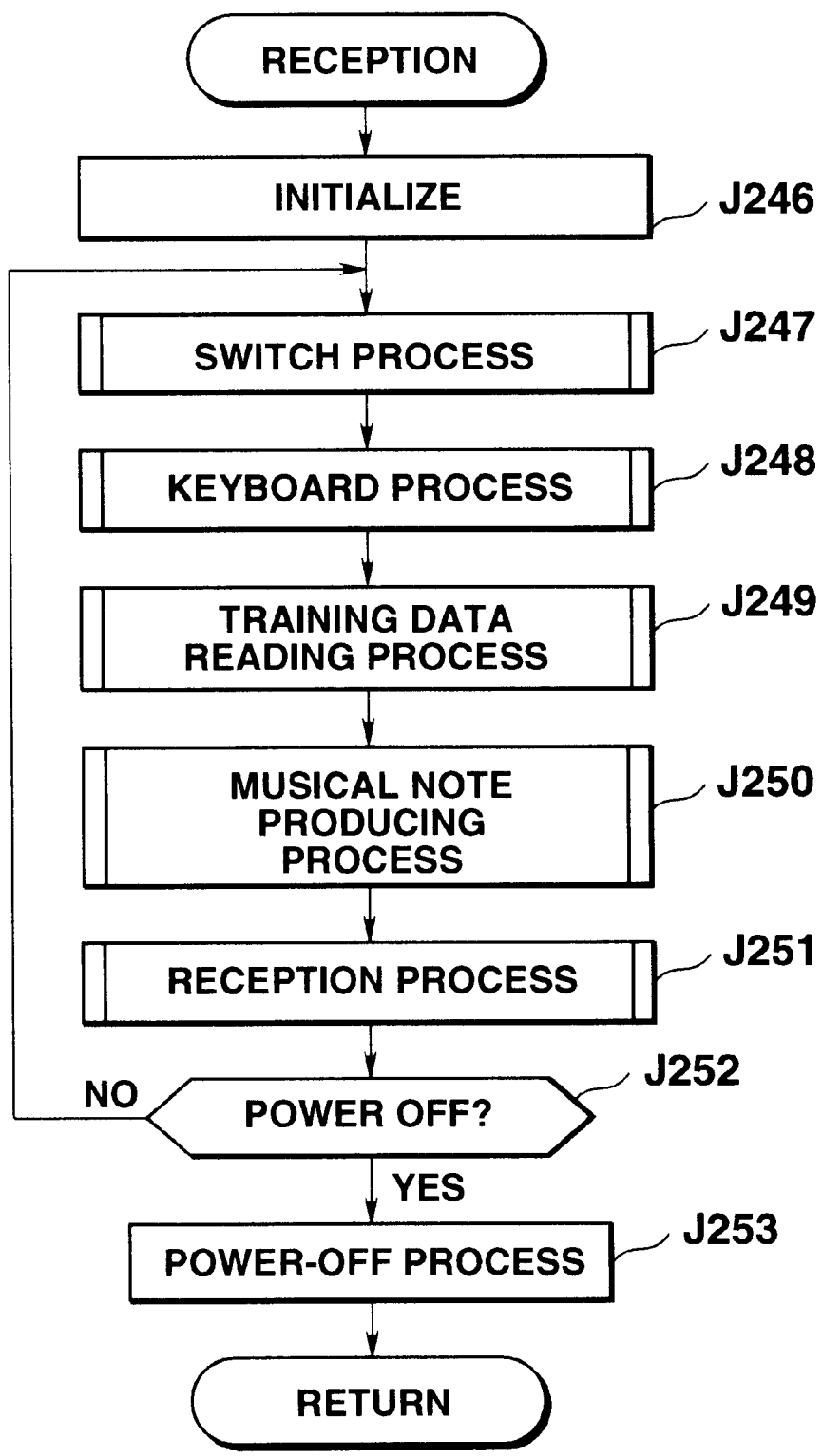
FIG. 32 is a main flow chart of reception of a reception end of a modification of the second embodiment.
Figure 33:
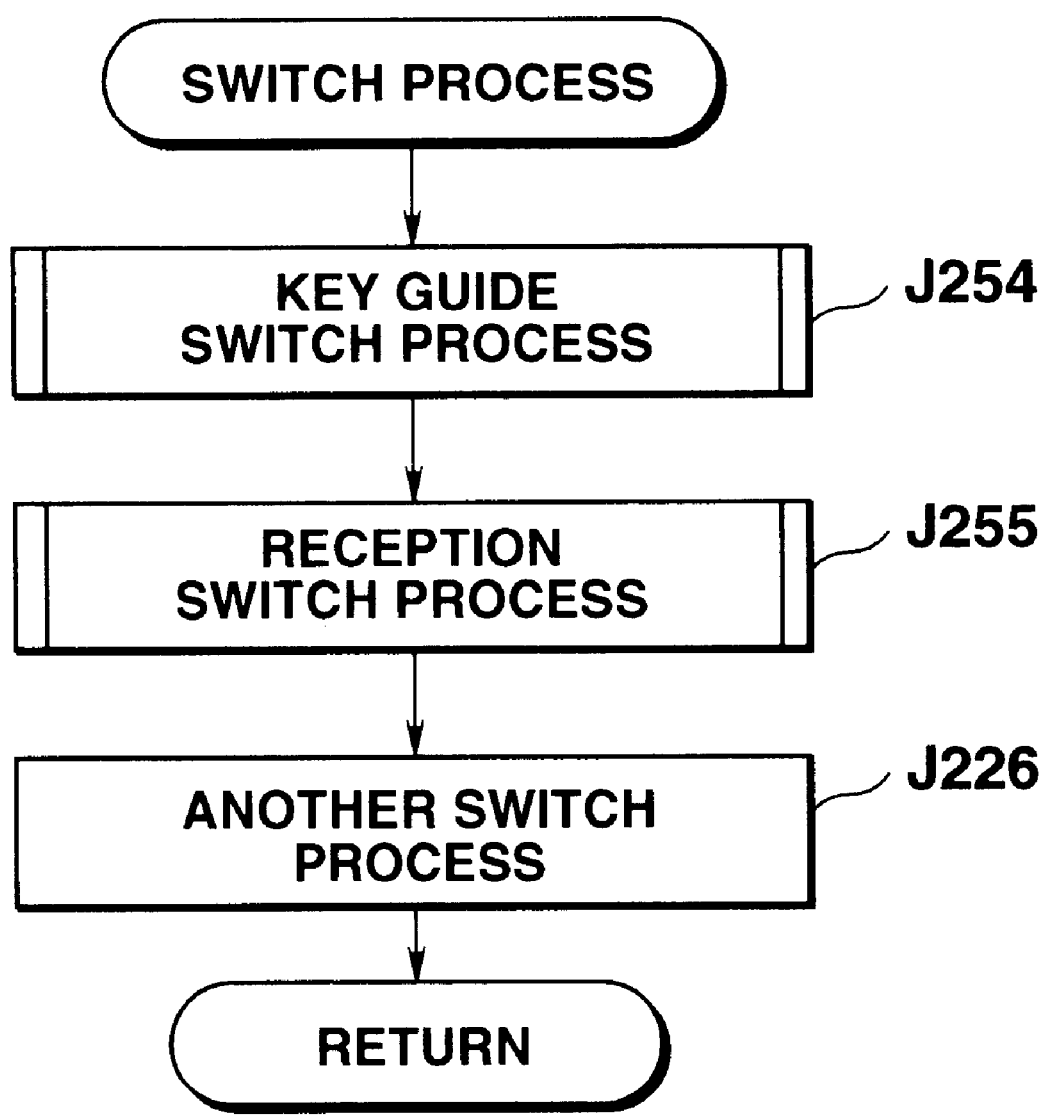
FIG. 33 is a flow chart of a switch process of FIG. 32.

FIG. 33 is a flow chart of the switch process at the FIG. 32 main flow. In this process, the CPU performs a key guide switch process (step 254), a reception switch process (step J255), and another switch process (step J256), and then returns its control to the FIG. 32 main flow.

Figure 34:
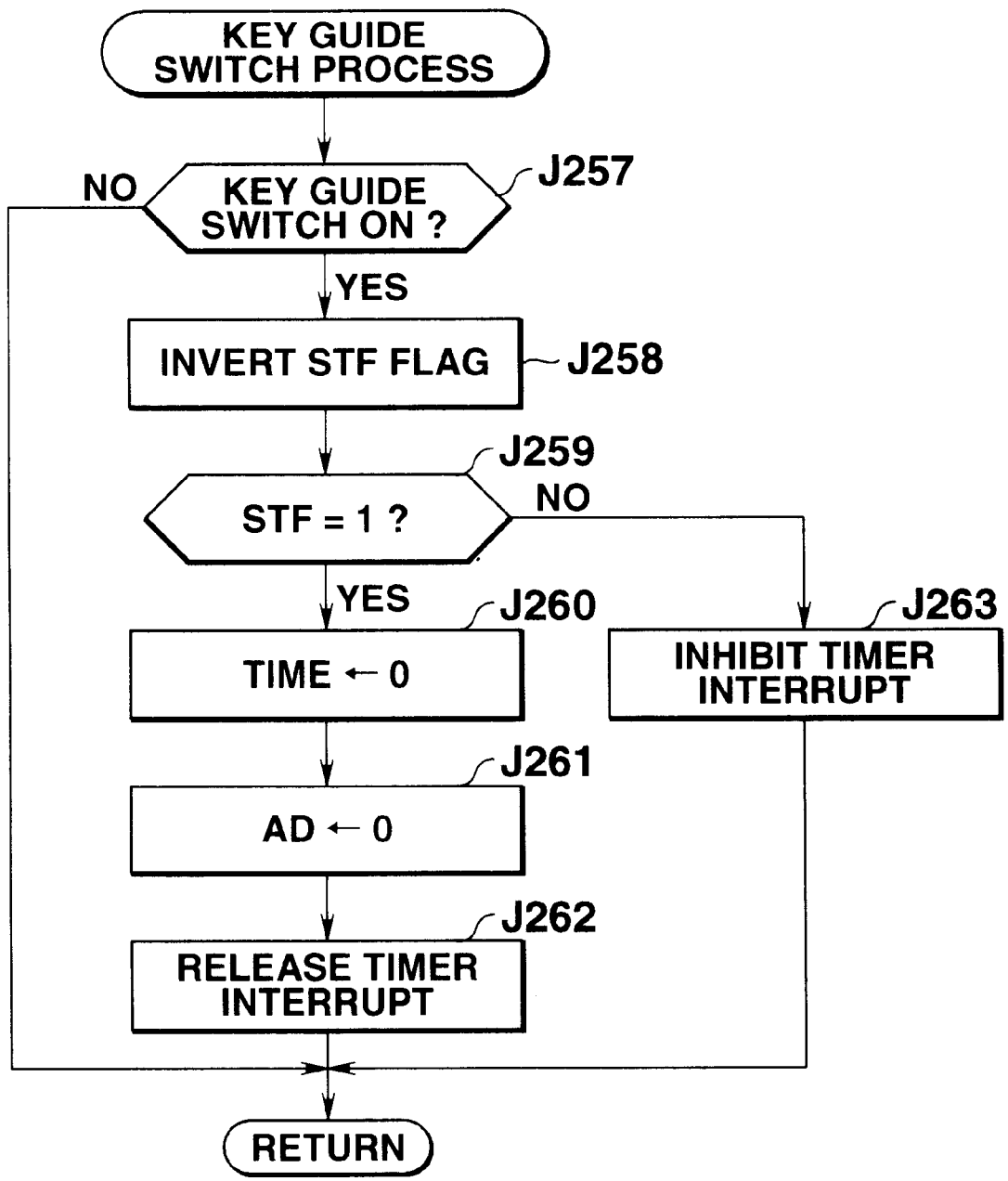
FIG. 34 is a flow chart of a key guide switch process of FIG. 33.

FIG. 34 shows the key guide switch process in step J254 of the FIG. 33 switch process. In this process, the CPU 1 determines whether the key guide switch has been turned on (step J257). If not, the CPU returns its control to the switch process of FIG. 33. If the key guide switch has been turned on, the CPU then inverts the start flag STF (step J258) and then determines whether the STF is at 1 (step J259). If so, the CPU resets the time register TIME at 0 (step J260), sets the address register AD at 0 (step J261), and then releases the timer interrupt (step J262). If the STF is 0 in step J259, the CPU inhibits timer interrupt (step J263).

After releasing the timer interrupt in step J262, or the CPU inhibits the timer interrupt in step J263, the CPU returns its control to the FIG. 33 switch process. When the CPU releases the timer interrupt, the CPU increments the value in the TIME each time a predetermined time elapses, as shown in FIG. 27 in the second embodiment, and returns its control to the FIG. 33 switch process.

The reception switch process in step J255 in the FIG. 33 switch process is the same as the FIG. 28 flow of the second embodiment and further description thereof will be omitted. In the FIG. 32 main flow, the keyboard process in step J248 is the same as the flow of FIG. 11 of the first embodiment, and further description thereof will be omitted.

Figure 35:
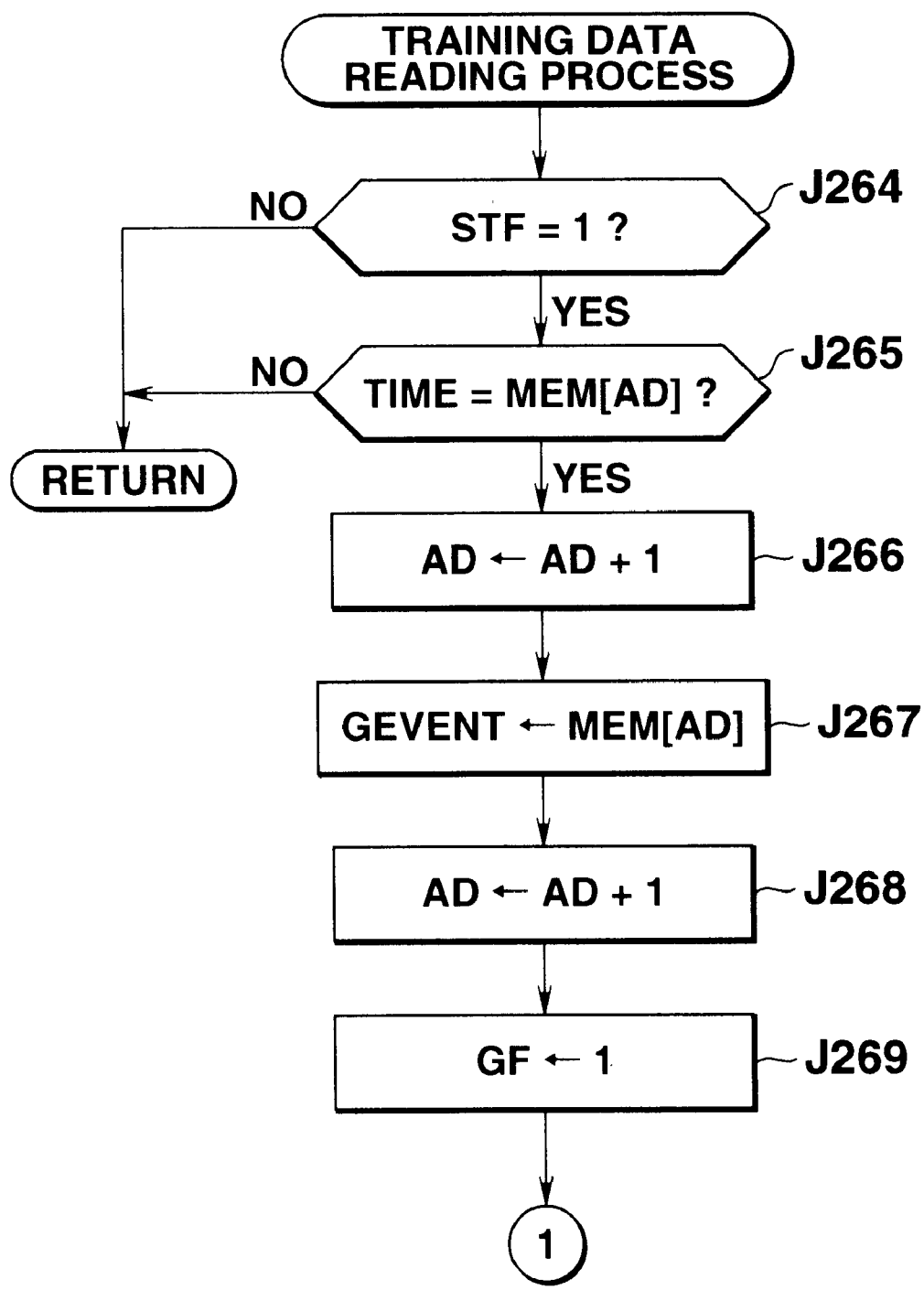
FIG. 35 is a flow chart of the training data reading process of FIG. 32.
Figure 36:
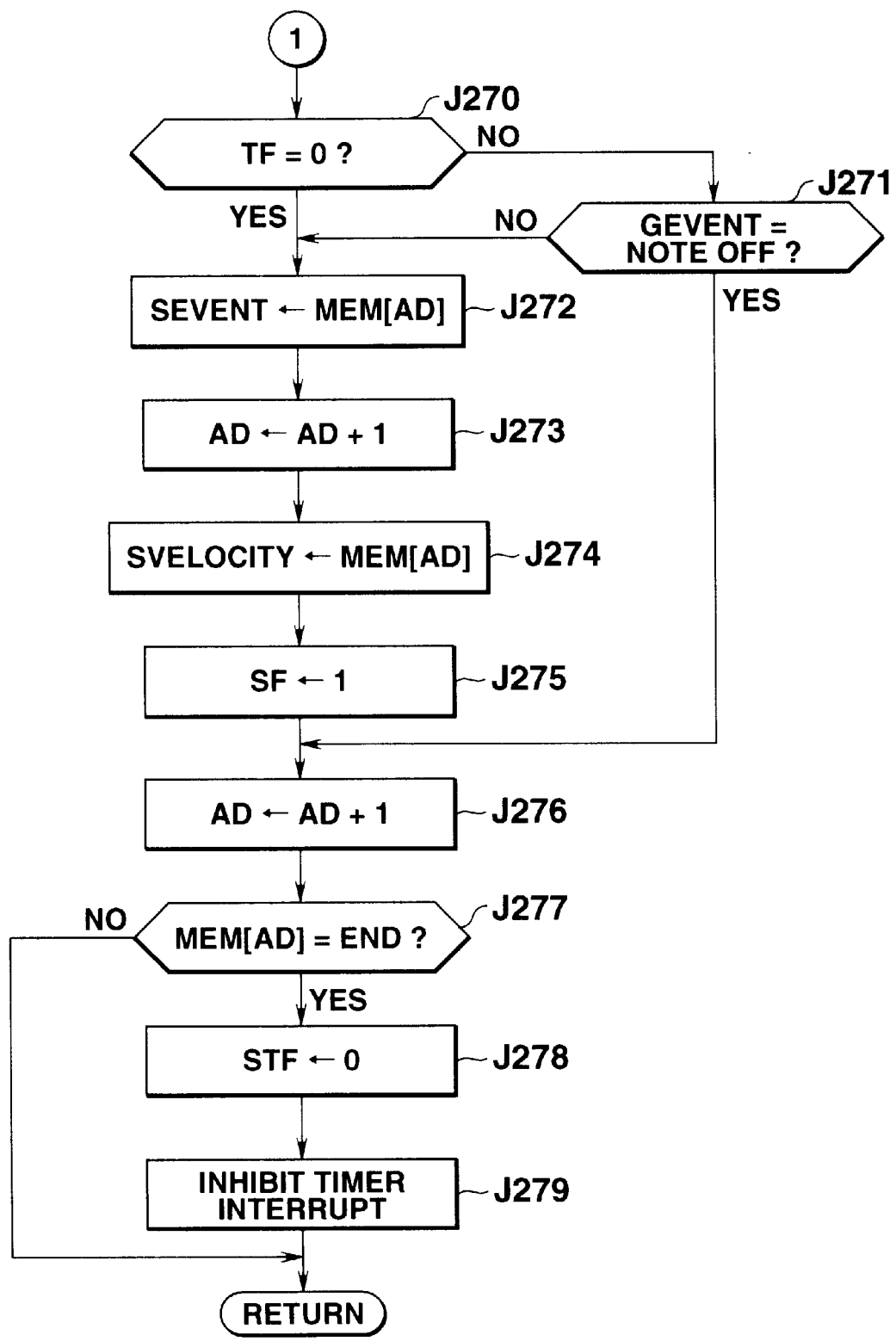
FIG. 36 is a flow chart of a portion of the training data reading process continuing from FIG. 35.

FIGS. 35 and 36 are a flow chart of the training data reading process in step J249 in the FIG. 32 main flow. In FIG. 35, the CPU determines whether the STF is at 1 (step J264). If so, the CPU determines whether the data in the TIME has reached the time data at the location MEM [AD] (step J265). If the STF is at 0, or if the data in the TIME has not reached the time data at the location MEM [AD], the CPU returns its control to the FIG. 32 main flow.

When the STF is at 1 in step J264 and the CPU determines in step J265 that the data in the TIME has reached the time data at the location MEM [AD], the CPU 1 increments the AD (step J266). The CPU then stores in the register GEVENT the data at the location MEM [AD] of the RAM specified by an address in the AD (step J267). The CPU then increments the AD (step J268) and sets the guide flag GF at 1 (step J269).

Then, the CPU 1 determines whether the TF is at 0 in FIG. 36 (step J270). If the TF is at 1, the CPU determines whether the data in the GEVENT is note-off data (step J271). If the TF is at 0, or if the data in the GEVENT is note-on data, the CPU then stores in the register SEVENT the data at the location MEM [AD] of the RAM specified by an address in the AD (step J272). Then, the CPU 1 increments the AD (step J273), stores data at the location MEM [AD] in the register SVELOCITY (step J274), and then sets the musical note producing flag SF at 1 (step J275).

Then, or if the data in the GEVENT is note-off data in step J271, the CPU 1 increments the AD (step J276), and then determines whether the data at the location MEM [AD] is END data (step J277). If not, the CPU returns its control to the FIG. 32 main flow. If the data at the location MEM [AD] is END data, the CPU resets the STF at 0 (step J278), inhibits the timer interrupt (step J279), and then returns its control to the FIG. 32 main flow.

The musical note producing process in step J250 of the main flow is the same as the flow of FIG. 14 in the modification of the first embodiment, and further description thereof will be omitted. The reception process in step J251 of the main flow is the same as the flow of FIG. 31 in the second embodiment, and further description thereof will be omitted.

While in the first and second embodiments the electronic keyboard instrument is taken as an example and the operation means whose playing operation is to be taught is a keyboard, the present invention is applicable to electronic drum sets, electronic wind and stringed instruments. In these cases, the operation means are a pad of the drum, a piston of the electronic wind instrument or a string of the stringed instrument.

While in the first and second embodiments the electronic keyboard instrument is taken and illustrated as an example of the performance training apparatus, the present invention may be applicable to sequencers/personal computers. While in the above embodiment the musical note control data includes keyboard input data, it may be automatic performance data or general reproduced musical data.

A third embodiment will be described next in which a pedal display picture which displays a pedal image is provided on the operation display panel 6 of FIG. 2 so as to guide a pedal operation. Although not shown, three pedals; that is, a damper pedal, a sostenute pedal and a soft pedal, are displayed on the pedal display picture. An image corresponding to a pedal to be operated is lighted up. When the damper pedal is operated, and even when the performer then detaches his or her fingers from the keyboard in performance, the resulting musical note is extended. When the sostenute pedal is operated, only a musical note produced from a key depressed when the pedal is operated is extended long even if the performer detaches his or her fingers from the keyboard. When the soft pedal is operated, the volume slightly decreases to soften vibrations of the musical note.

A main flow of operation of the transmission end in the third embodiment is the same as that of FIG. 15 of the second embodiment. Thus, only portions of the process performed in the third embodiment different from the process performed in the second embodiment will be described. In the process performed by the transmission end of the third embodiment, a mode switch process included in the switch process and a training data producing process included in the transmitting process are different from those of the process performed in the second embodiment.

Figure 37:
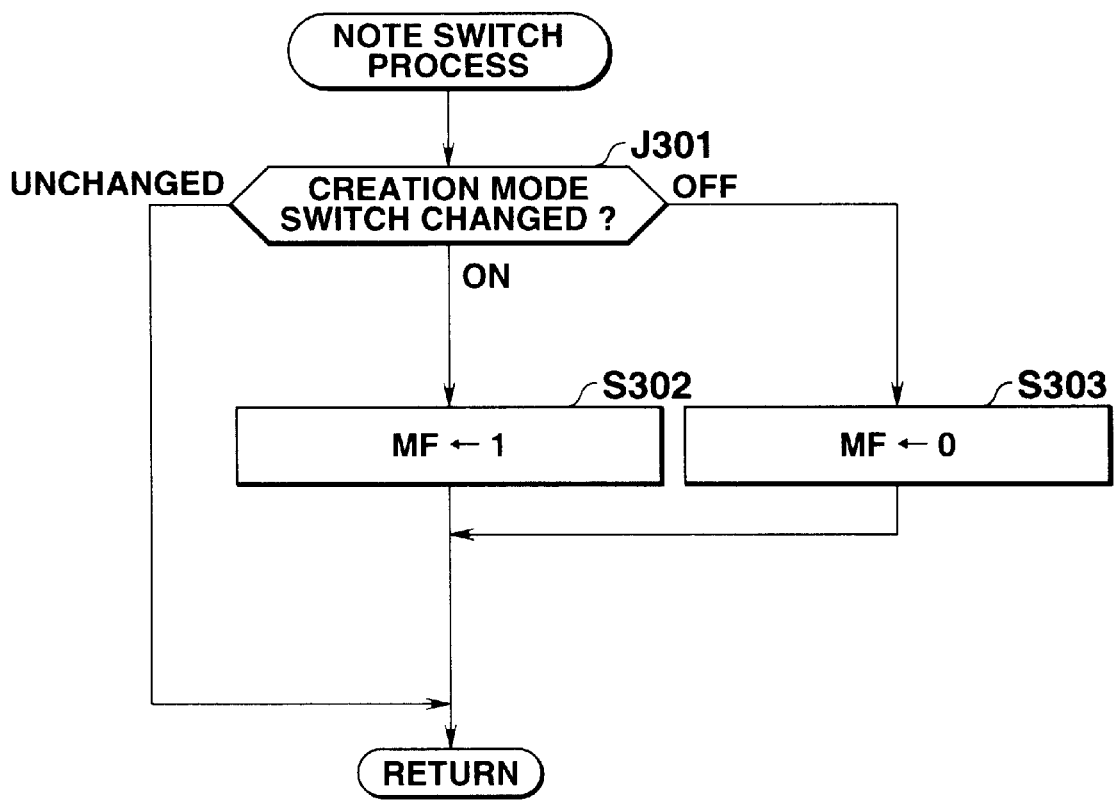
FIG. 37 is a flow chart of a mode switch process of a transmission end of a third embodiment.

FIG. 37 shows the mode switch process included in the switch process, in which the CPU 1 determines whether a production mode switch has changed (step S301). If not, the CPU returns its control to the main flow. If the switch changes from off to on, the CPU 1 sets the mode flag MF at 1 (step S302). If the switch changes from on to off, the CPU resets the MF at 0 (step S303). Then, the CPU returns its control to the main flow.

Figure 38:
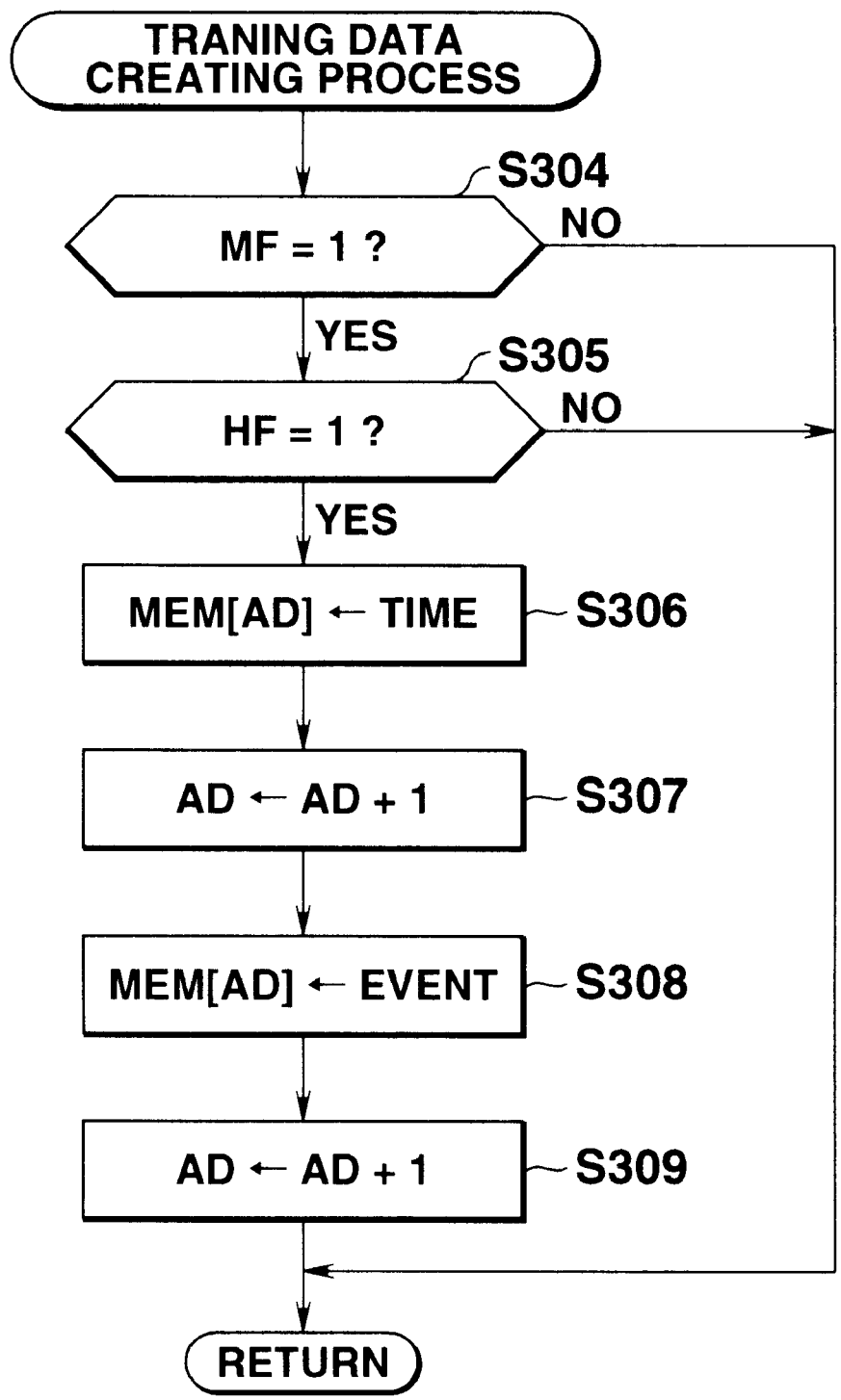
FIG. 38 is a flow chart of a training data creating process of the transmission end of the third embodiment.

FIG. 38 is a flow chart of the training data producing process included in the transmission process. In this process, the CPU determines whether the MF is at 1 (step S304). If so, the CPU determines whether the HF is at 1 (step S305). If the MF or HF is 0, the CPU returns its control to the main flow.

If both the MF and HF are at 1, the CPU then stores data in the time register TIME at a location MEM [AD] of the RAM indicated by an address in the AD (step S306). The CPU then increments the AD (step S307), stores the data in the register EVENT at the appropriate location MEM [AD] (step S308), increments the AD (step S309), and then returns its control to the main flow.

Figure 39:
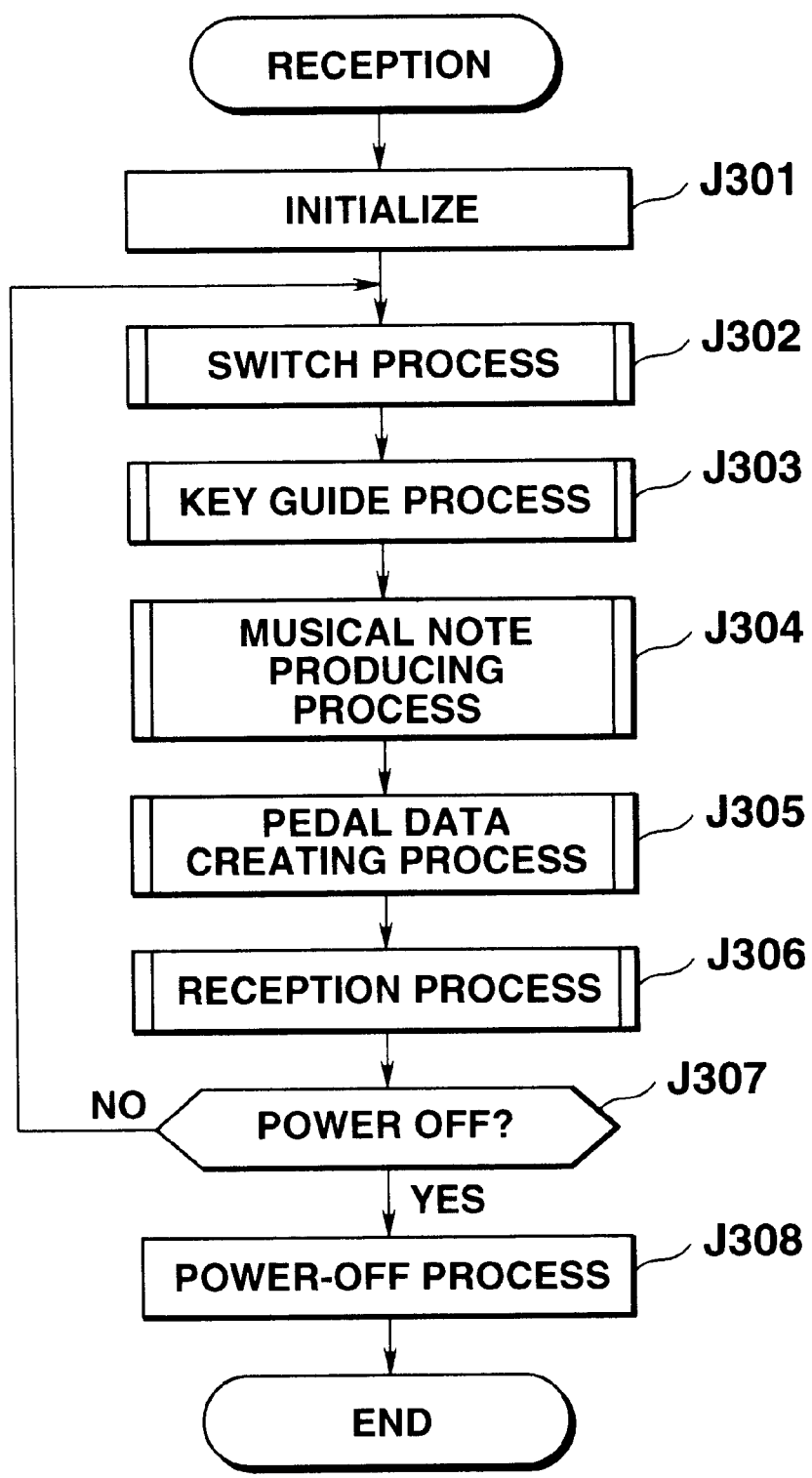
FIG. 39 is a flow chart of operation of a reception end of the third embodiment.

FIG. 39 is a flow chart of the main operation of the reception end in the third embodiment. After the predetermined initialization (step J301), the CPU performs a switch process (step J302), a key guide process (step J303), a musical note producing process (step J304), a pedal data producing process (step J305), and a reception process (step J306). The CPU then determines whether a power-off process operation has been performed manually (step J307). If not, the CPU performs the processing in steps J302–J306. If so in step J307, the CPU performs a power-off process (step J308), and then terminates the FIG. 39 process.

Figure 40:
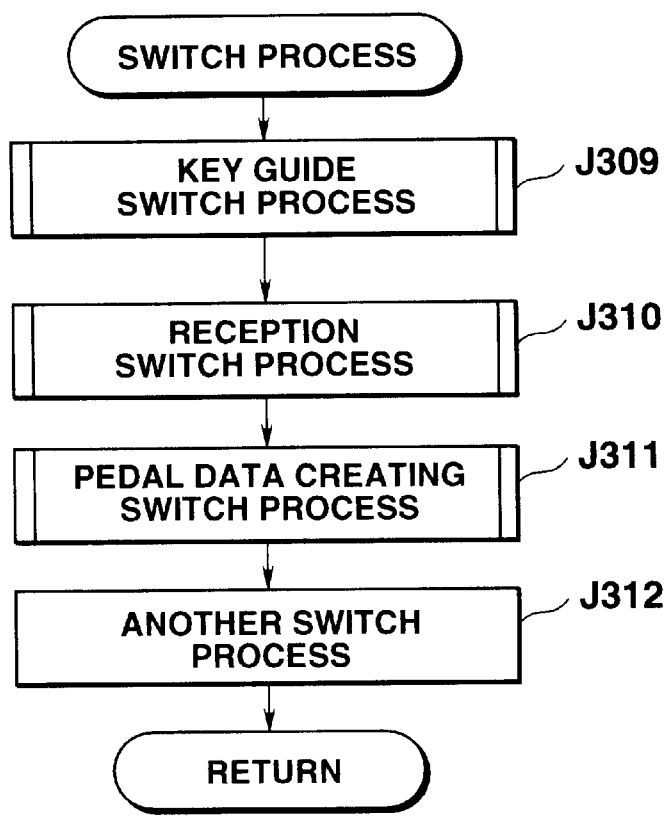
FIG. 40 is a flow chart of a switch process of FIG. 39.

FIG. 40 is a flow chart of the switch process in step J302 of the main flow of FIG. 39. In this process, the CPU performs a key guide switch process (step J309), a reception switch process (step J310), a pedal data producing switch process (step J311), and another switch process (step J312), and then returns its control to the FIG. 39 main flow.

The key guide switch process in step J309 of the switch process of FIG. 40 is the same as the process of FIG. 26 in the second embodiment and further description thereof will be omitted. Also, the reception switch process in step J310 of FIG. 40 is the same as the process of FIG. 28 in the second embodiment and further description thereof will be omitted.

Figure 41:
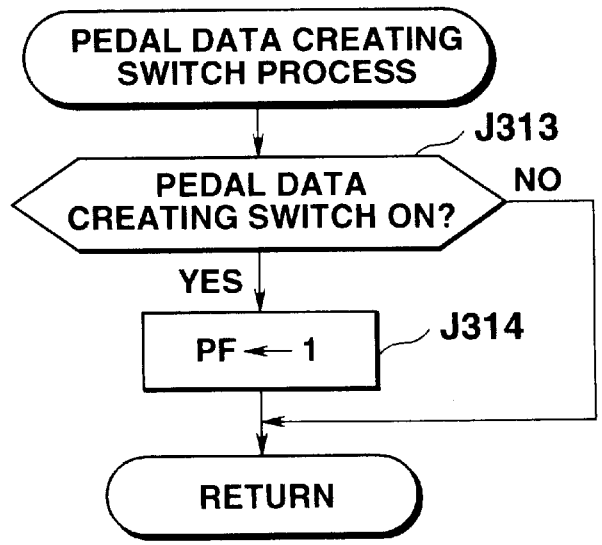
FIG. 41 is a flow chart of a pedal data switch process of FIG. 40.

FIG. 41 is a flow chart of the pedal data producing switch process in step J311 of FIG. 40. In this process, the CPU determines whether the pedal data producing switch is turned on (step J313). If not, the CPU returns its control to the switch process of FIG. 40. If so in step J313, the CPU sets the pedal flag PF at 1 (step J314) and then returns its control to the FIG. 40 switch process.

Figure 42:
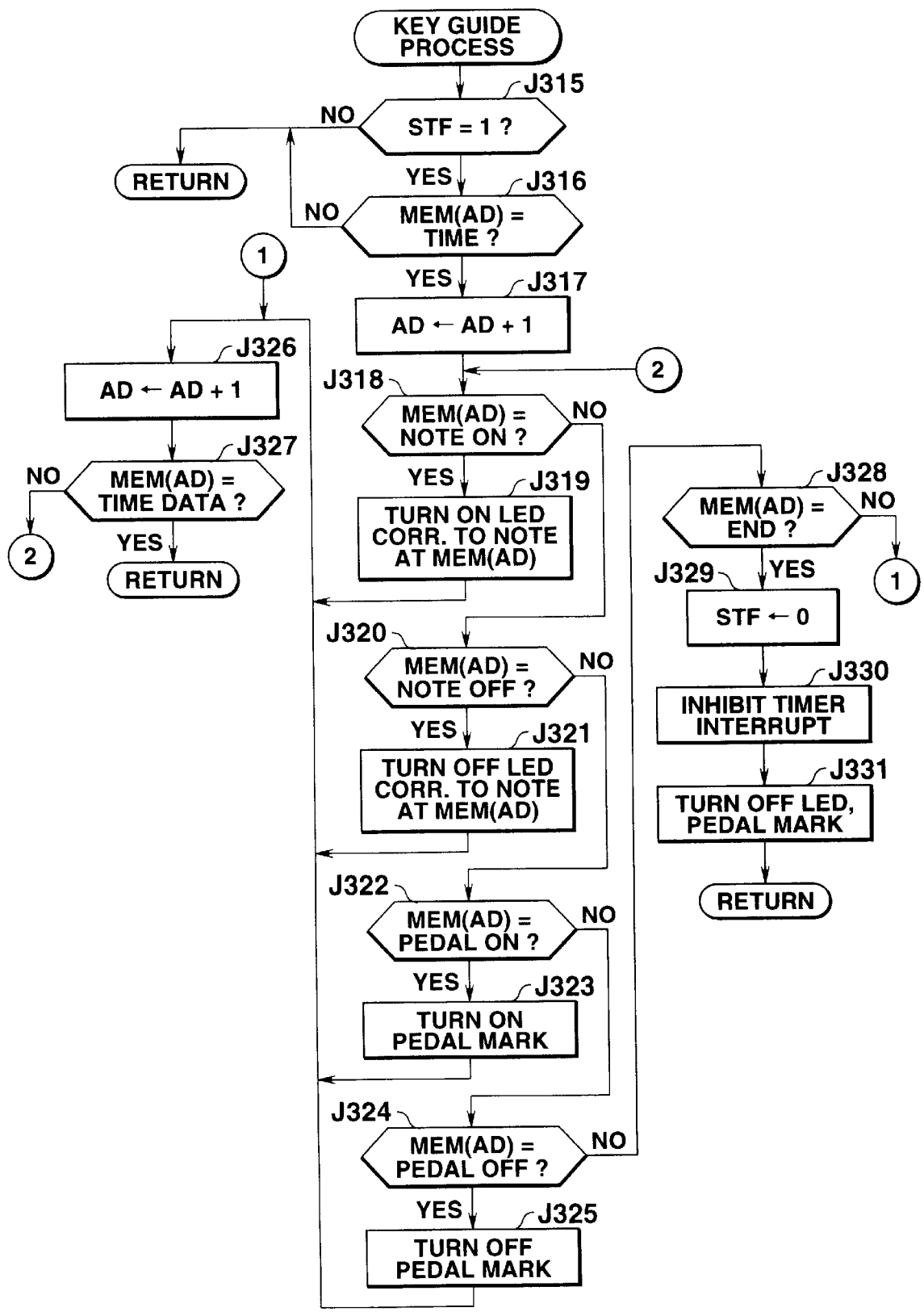
FIG. 42 is a flow chart of a key guide process of FIG. 39.

FIG. 42 is a flow chart of the key guide process in step J302 of the FIG. 39 main flow. In this process, the CPU determines whether the start flag STF is at 1 (step J315). If so, the CPU determines whether the data in the time register TIME has reached the time data at the location MEM [AD] of the RAM specified by an address in the AD (step J316). If the STF is at 0, or the data in the TIME has not reached the time data at the location MEM [AD], the CPU then returns its control to the FIG. 39 main flow.

When the STF is at 1 and the data in the TIME has reached the time data at the location MEM [AD], the CPU increments the AD (step J317). The CPU then determines whether the data at the location MEM [AD] is note-on data (step J318). If so, the CPU then turns on an LED for a key corresponding to the musical note data at the MEM [AD] (step J319). If the data at the MEM [AD] is not note-on data, the CPU determines whether the data at the MEM [AD] is note-off data (step J320). If so, the CPU turns off an LED for a key corresponding to the musical note data at the MEM [AD] (step J321).

If the data at the MEM [AD] data is neither note-on data nor note-off data, the CPU determines whether the data at the MEM [AD] is pedal-on data (step J322). If so, the CPU turns on a corresponding pedal mark (step J323). If the data at the MEM [AD] is not any of the note-on, note-off and pedal-on data, the CPU then determines whether the data at the MEM [AD] is the pedal-off data (step J324). If so, the CPU turns off a corresponding pedal mark (step J325).

After turning on/off the ELD or pedal mark, the CPU increments the AD (step J326). The CPU then determines whether the data at the MEM [AD] is time data (step J327).

If not, the CPU shifts its control to step J318 to determine whether the data at the MEM [AD] is time data. If so, the CPU returns its control to the FIG. 39 main flow.

If the data at the MEM [AD] is neither musical note data nor pedal data in the FIG. 42 flow, the CPU determines whether the data at the MEM [AD] is END data (step J328). If it is END data, the CPU resets the start flag STF at 0 (step J329), inhibits the time interrupt (step J330), turns off the lighting LED and pedal mark (step J331), and then returns its control to the FIG. 39 main flow. If the data at the MEM [AD] is not END data in step J328, the CPU shifts its control to step J326 to increment the AD, and determines data at the MEM [AD] in step J327.

The musical note producing process in step J304 of the FIG. 39 main flow is the same as the FIG. 22 flow in the second embodiment and further description thereof will be omitted.

Figure 43:
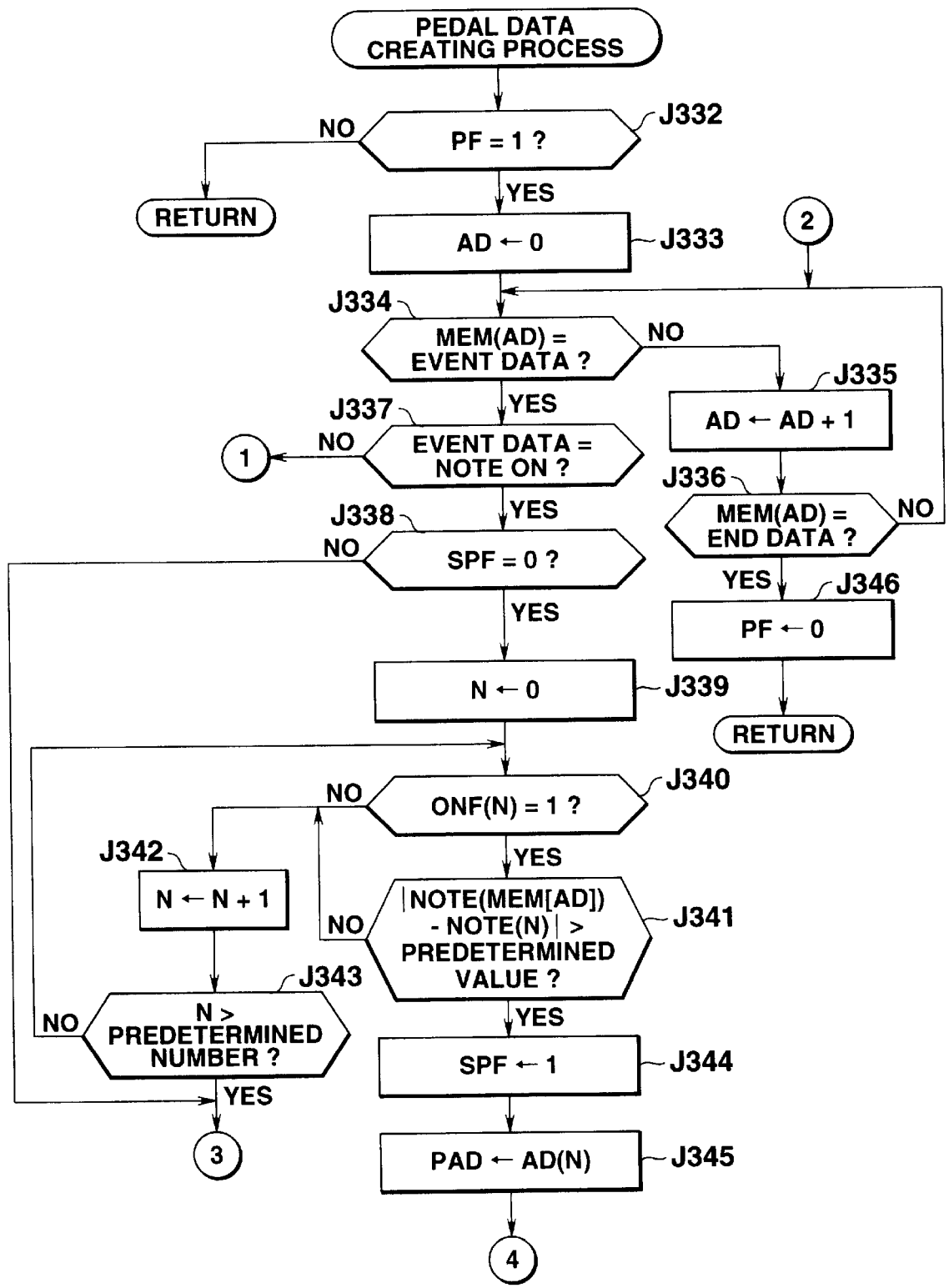
FIG. 43 is a flow chart of a pedal data switch process of FIG. 39.

FIGS. 43–46 are a flow chart of the pedal data producing process in step J305 of the FIG. 39 main flow. In FIG. 43, the CPU determines whether the pedal flag PF is at 1 (step J332). If the PF is at 0, the CPU returns its control to the FIG. 39 main flow. If the PF is at 1, the CPU sets the AD at 0 (step J333). Then, the CPU determines whether the data at the location MEM [AD] is event data (step J334).

If the data at the MEM [AD] is not event data, the CPU increments the AD (step J335). The CPU then determines whether the data at the MEM [AD] is END data (step J336). If not, the CPU shifts its control to step J334, and determines whether the data at the MEM [AD] of the RAM specified by the incremented address in the AD is event data.

If so, the CPU determines whether the event data is note-on data (step J337). If so, the CPU determines whether the sostenute pedal flag SPF is at 0 (step J338). If so, the CPU sets at 0 a pointer N which indicates the number of a key for the preceding note-on data (step J339) and increments the N while determining whether the value of an on flag ONF (N) for the preceding musical note event data is at 1, which implies musical note production (step J340). If so, the CPU then determines whether the absolute value of the musical note data at the MEM [AD] minus the musical note data in the pointer N is larger than a predetermined value, that is, whether a key interval (or the number of keys) between a key corresponding to the last note-on data and a key corresponding to the preceding note-on data is larger than a predetermined value (step J341).

If the ONF (N) is at 0 (musical note muting) in step J340, or if the absolute value of the difference in musical note data key is smaller than the predetermined value in step J341, the CPU increments the N (step J342). The CPU then determines whether the N has exceeded the predetermined number (step J343). If not, the CPU returns its control to step J340 to determine the value of the ONF (N).

If the absolute value of the difference in musical note data key is larger than the predetermined value in step J341, the CPU sets the SPF at 1 (step J344). That is, if the interval (the number of keys) between the key corresponding to the last note-on data and the key corresponding to the preceding note-on data is larger than the predetermined value, the CPU sets a flag to turn on a mark indicative of the sostenute pedal.

The CPU then stores an address in the AD (N) in an address register PAD (step J345). In the FIG. 44 flow chart, the CPU decrements the respective data at PAD+1 and subsequent addresses by two addresses, that is, empties two locations after the PAD of the preceding note-on event data (step J347), and then stores at a location MEM [AD+1] (first empty area) the same time data as the preceding note-on time data TIME (N) (step J348). Then, the CPU stores pedal-on event data at a location MEM [AD+2] (second empty area) (step J349).

Figure 44:
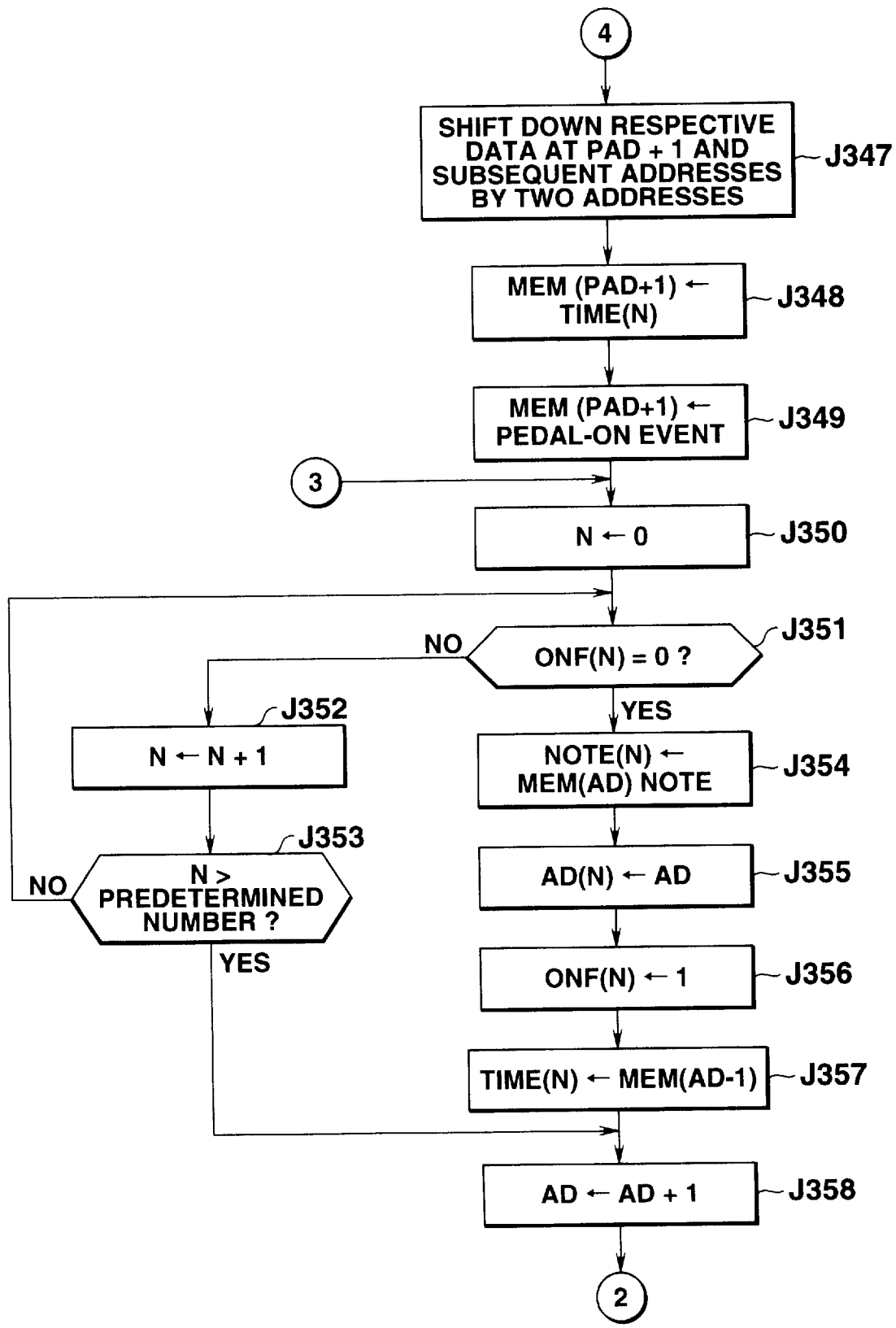
FIG. 44 is a flow chart of a portion of the pedal data switch process continuing from FIG. 43.

Then, or when the SPF is at 1 in step J338 of FIG. 43, or if N has exceeded the predetermined number in step J343 of FIG. 43, the CPU sets N at 0, increments N while determining the value of the on-flag in step J350 of FIG. 44, that is, whether the ONF (N) is at 0 (step J351). If the ONF (N) is at 1, the CPU increments N (step J352), and determines whether N has exceeded the predetermined number (step J353). If not, the CPU shifts its control to step J351, where it determines the value of ONF (N).

If the ONF (N) is at 1, the CPU stores the musical note data at the location MEM [AD] of the RAM specified by the address in a register NOTE (N) which is, in turn, specified by the N (step J354). Then, the CPU changes the address of the AD (N) to an address in the AD, that is, updates the address of the note-on event data specified at present with the address of the note-on event data specified by the pointer N (step J355). The CPU then sets at 1 the ONF (N) corresponding to the note-on data at the updated address (step J356). The CPU then stores in the TIME (N) the time data at a MEM [AD−1] (step J357).

Then, or if N has exceeded the predetermined number in step J353, the CPU increments the AD (step J358), shifts its control to step J334 of FIG. 43 to determine whether data at the next memory location MEM [AD] is event data. If so, the CPU determines in step J337 whether the event data is note-on data.

Figure 45:
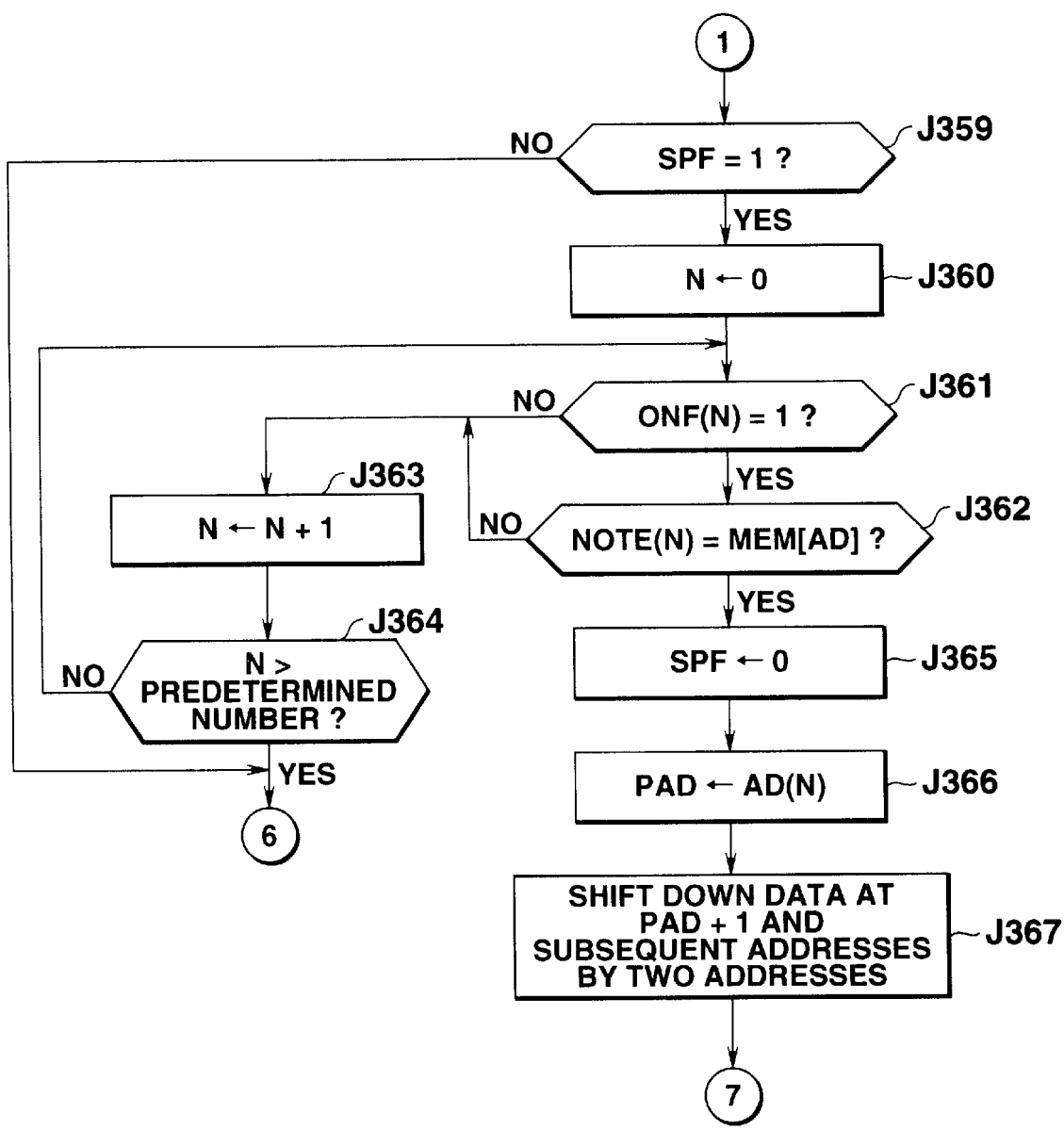
FIG. 45 is a flow chart of a portion of the pedal data switch process continuing from FIG. 43.

If the event data at MEM [AD] is note-off data, the CPU determines whether the SPF is at 1 in step J359 of the flow chart of FIG. 45. If so, the CPU sets at 0 the pointer N indicative of the preceding note-on data key number (step J360) and increments N while determining the value of the on flag ONF (N) of the preceding musical note event data or whether the ONF (N) is at 1 which implies musical note production (step J361). If so, the CPU then determines whether the musical note data at the MEM [AD] is the same as the musical note data pointed out by the pointer N (step J362).

If the ONF (N) is at 0 (musical note muting) in step J361 or musical note data at the MEM [AD] is not the same as that pointed out by the pointer N in step J362, the CPU increments N (step J363), and determines whether the N has exceeded the predetermined number (step J364). If not, the CPU shifts its control to step J361 to determine the value of the ONE (N).

If the musical note data at MEM [AD] is the same as the musical note data pointed out by the pointer N in step J362, the CPU resets SPF at 0 (step J365). The CPU then stores address data in the AD (N) in the address register PAD for the pedal data (step J366), and shifts down the respective data at PAD+1 and subsequent addresses by two addresses (step J367). In the FIG. 46 flow, the CPU then stores at a location MEM [AD+1] the same time data as the preceding note-on time data TIME (N) at the MEM [AD] (first empty location) (step J368). The CPU then stores pedal-off event data at a location MEM [AD+2] (second empty location) (step J369).

Figure 46:
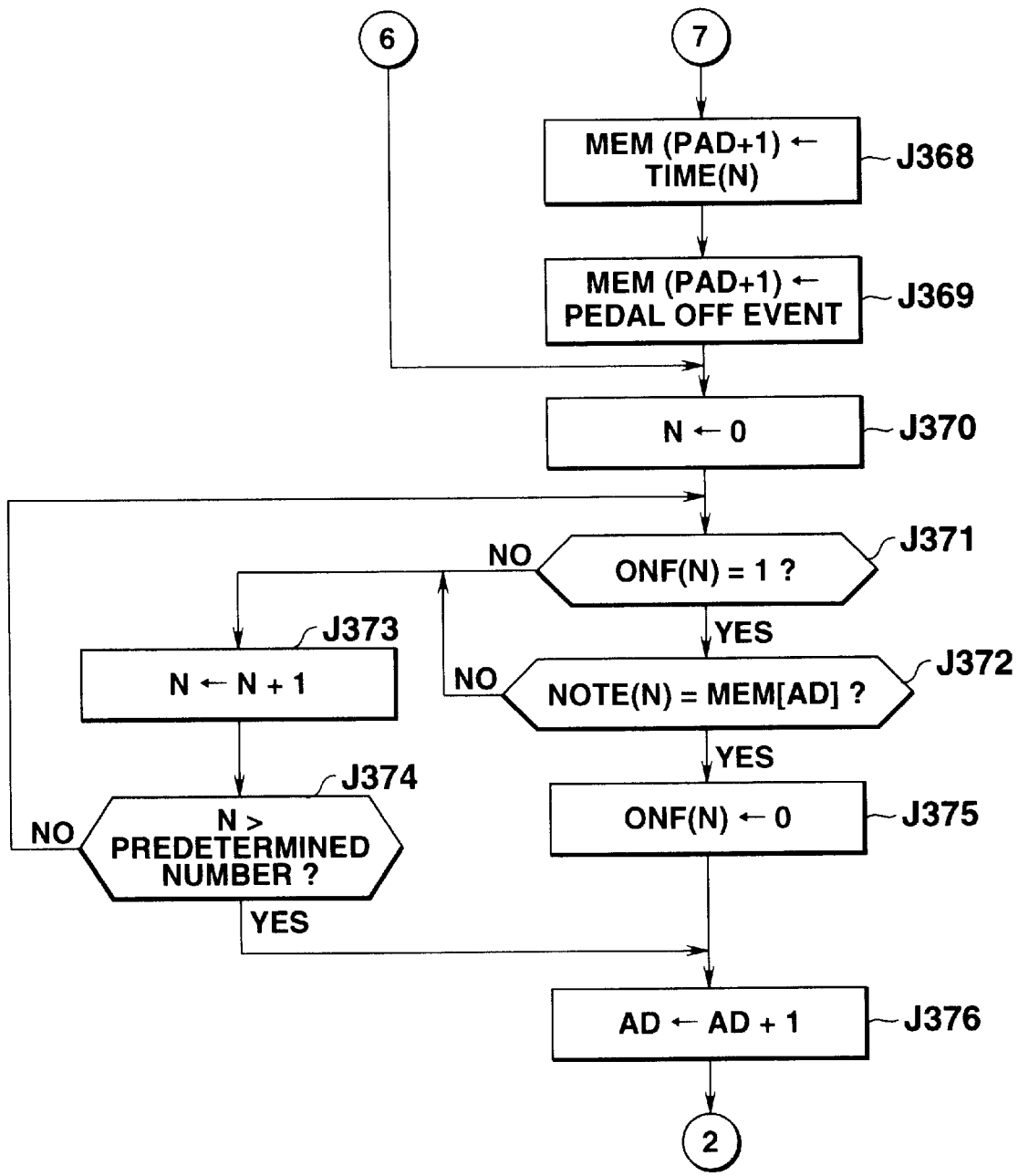
FIG. 46 is a flow chart of a portion of the pedal data switch process continuing from FIG. 45.

Then, or if the SPF is at 0 in step J359 of FIG. 45, or if N has exceeded the predetermined number in step J364 of FIG. 45, the CPU sets N at 0, and then increments the N while determining the value of the on flag in step J370 of FIG. 46, that is, whether the ONF (N) is at 1 (step J371). If so, the CPU then determines whether the musical note data at NOTE (N) is the same as that at MEM [AD] (step J372).

If the ONF (N) is at 0 or the musical note data at NOTE (N) is different from that at MEM [AD], the CPU then increments N (step J373). The CPU then determines whether N has exceeded the predetermined number (step J374). If not, the CPU then shifts its control to step J371 to determine the value of the ONF (N).

If the ONF (N) is at 1 in step J371 and the musical note data at NOTE (N) is the same as that at MEM [AD] in step J372, the CPU then resets the ONF (N) at 0 (step J375). Then, or if N has exceeded the predetermined number in step J374, the CPU increments AD (step J376). The CPU then shifts its control to step J334 of FIG. 43 where it determines whether the data at the next memory location MEM [AD] is event data.

As described above, according to the third embodiment, the performance training apparatus includes data receiving means for receiving note control data about the keyboard performance, data determining means for determining whether the keyboard performance based on the note control data received by the data receiving means involves a special key depressing operation, data producing means, responsive to the data determining means determining that the keyboard performance involves a special key depressing operation, for producing note control data involving the pedal operation to supplement the special key depressing operation, and display control means for displaying on a predetermined display means the pedal operation produced by the data producing means.

In this case, the special key depressing operation includes depression of more than a predetermined number of keys between any particular depressed key and the next depressed key, and the pedal operation involves continuation of a musical note produced at the position of the particular depressed key.

The data receiving means receives the data at any time from a server on the network.

Figure 47:
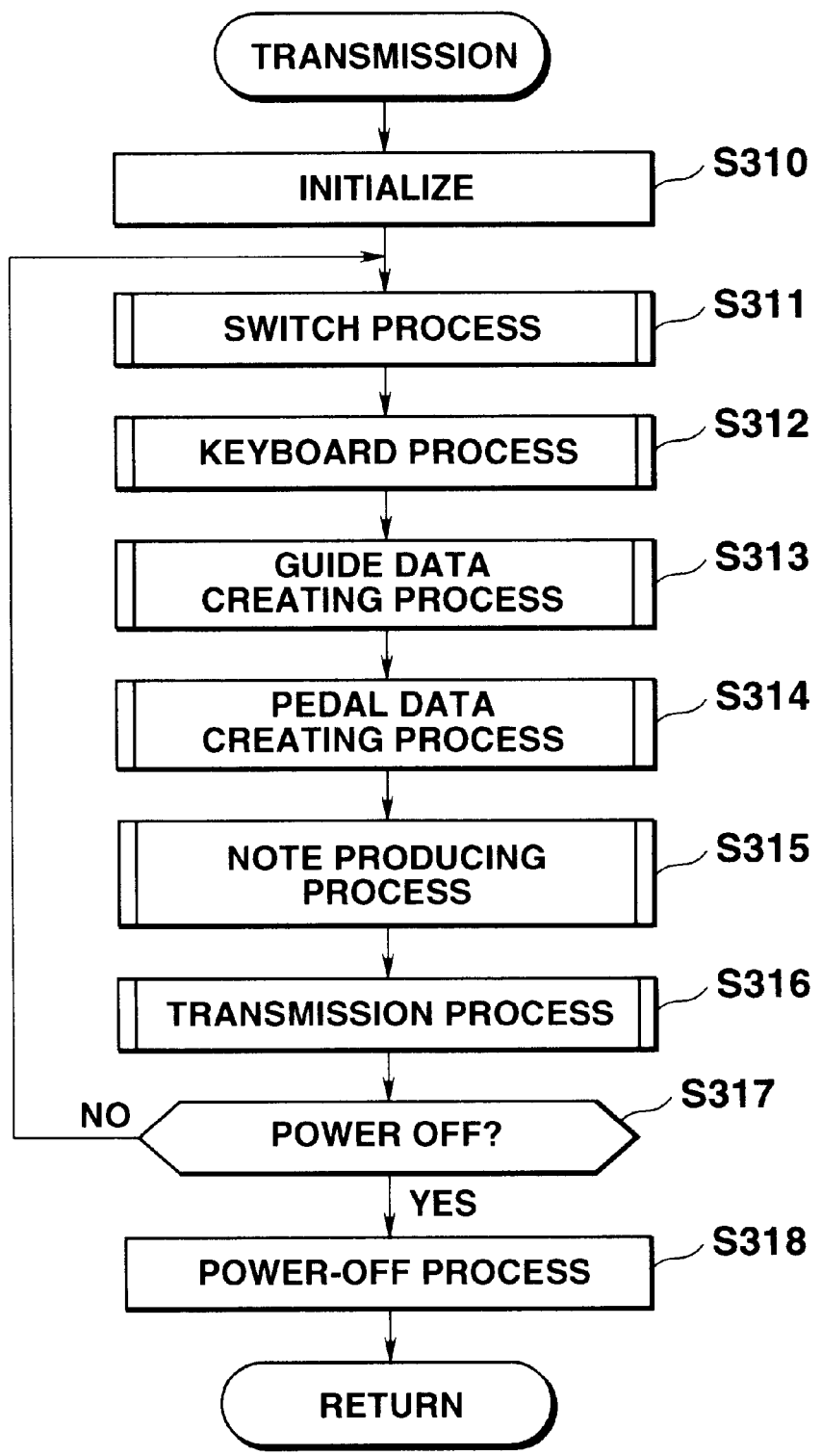
FIG. 47 is a flow chart of operation of a transmission end of a modification of the third embodiment.

A modification of the third embodiment will be described next in which a pedal data producing process is performed at the transmission end. FIG. 47 is a main flow chart of a transmission process performed by the transmission end in this modification. After the predetermined initialization (step S310), the CPU performs a switch process (step S311), a keyboard process (step S312), a training data producing process (step S313), a pedal data producing process (step S314), a musical note producing process (step S315), and a transmitting process (step S316). The CPU then determines whether a power-off operation has been manually performed (step S317). If not, the CPU performs the processing in steps S311–S316. If so in step S317, the CPU performs a power-off process (step S318) and then terminates the FIG. 47 process.

Figure 48:
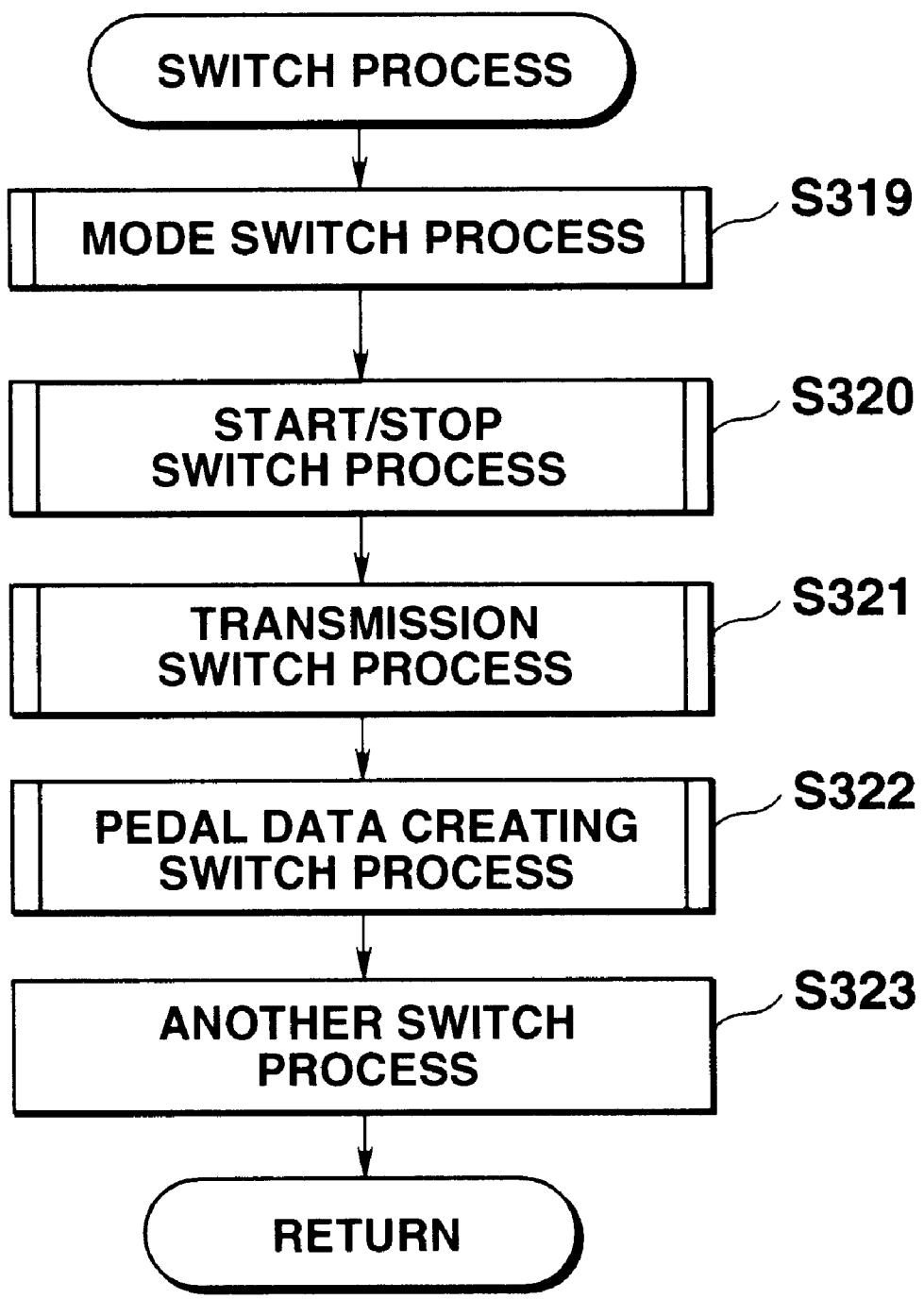
FIG. 48 is a flow chart of a switch process of FIG. 47.

FIG. 48 is a flow chart of the switch process in step S310 of the FIG. 47 main flow. In this process, the CPU performs a mode switch process (step S318), a start/stop switch process (step S319), a transmission switch process (step S320), a pedal data producing switch process (step S321), and another switch process (step S322), and then returns its control to the main flow.

The keyboard process in step J312 of the FIG. 47 main flow is the same as the flow of FIG. 11 in the first embodiment. The training data producing process in step J313 is the same as the flow of FIG. 22 in the second embodiment. The pedal data producing process in step J314 is the same as the flow of FIGS. 43–46 in the third embodiment. The sound producing process in step J315 is the same as the flow of FIG. 23 in the second embodiment. The transmitting process in step J316 is the same as the flow of FIG. 21 in the second embodiment. Thus, further description of those processes will be omitted.

The mode switch process in step J319 of the FIG. 48 switch process is the same as that of FIG. 17 in the second embodiment. The start/stop switch process in step J320 is the same as the flow of FIG. 19 in the second embodiment. The transmission switch process in step J321 is the same as the flow FIG. 20 in the second embodiment. The pedal data creating switch process in step J322 is the same as the flow of FIG. 41 in the third embodiment. Thus, further descriptions of those processes will be omitted.

The flow charts of processes performed by the reception end in the modification of the third embodiment are the same as the flow charts of FIGS. 24–31 in the second embodiment, and further description thereof will be omitted.

What is claimed is:

1. A performance training data receiver comprising:
   receiving means for receiving musical note data sent by an external device;
   data detecting means for detecting training musical note data from among the musical note data received by said musical note data receiving means; and
   training instructing means for instructing a trainee to practice a musical performance by audibly specifying a key to be depressed based on pitch data contained in the training musical note data.

2. A performance training data receiver comprising:
   receiving means for receiving musical note data sent by an external device;
   data detecting means for detecting training musical note data from among the musical note data received by said musical note data receiving means; and
   training instructing means for instructing a trainee to practice a musical performance by displaying an instruction to urge the trainee to perform a pedal operation based on control data contained in the training musical note data.

3. A recording medium storing a performance training data program for causing a computer to:
   receive musical note data sent by an external device;
   detect training musical note data from among the received musical note data: and
   instruct a trainee to practice a musical performance by audibly specifying a key to be depressed based on pitch data contained in the training musical note data.

4. A recording medium storing a performance training data program for causing a computer to:
   receive musical note data sent by an external device;
   detect training musical note data from among the received musical note data; and
   instruct a trainee to practice a musical performance by displaying an instruction to urge the trainee to perform a pedal operation based on control data contained in the training musical note data.

5. A performance training data transmitter comprising:
   musical note producing means for producing musical note data;
   data converting means for converting the musical note data into training musical note data by reducing velocity data contained in the musical note data; and
   transmitting means for transmitting the training musical note data.

6. A performance training data transmitter comprising:
   musical note producing means for producing musical note data;
   data converting means for converting the musical note data into training musical note data by shifting pitch data contained in the musical note data; and
   transmitting means for transmitting the training musical note data.

7. A performance training data transmitter comprising:
   musical note producing means for producing musical note data;
   data converting means for converting the musical note data into training musical note data having a predetermined pitch unrelated to pitch data contained in the musical note data and a timbre different from a timbre of the musical note data; and
   transmitting means for transmitting the training musical note data.

8. A performance training data transmitter comprising:
   musical note data producing means for producing musical note data;
   data determining means for determining whether a keyboard performance based on the musical note data involves a special key depression;
   control data producing means, responsive to said data determining means determining that the keyboard performance involves the special key depression, for producing control data which instructs a trainee to perform a pedal operation for supplementing the special key depression, and for adding the control data to the musical note data;
   data converting means for converting the musical note data to which the control data has been added into training musical note data; and
   transmitting means for transmitting the training musical note data.

9. The performance training data transmitter according to claim 8, wherein the special key depression is performed such that there are more than a predetermined number of keys between any particular depressed key and a next depressed key, and wherein the pedal operation is performed to continue musical note production by the particular depressed key.

10. A recording medium storing a performance training data transmitting program for causing a computer to:
    produce musical note data;
    convert the musical note data into training musical note data by reducing velocity data contained in the musical data; and
    transmit the training musical note data.

11. A recording medium storing a performance training data transmitting program for causing a computer to:
    produce musical note data;
    convert the musical note data into training musical note data by shifting pitch data contained in the musical data; and
    transmit the training musical note data.

12. A recording medium storing a performance training data transmitting program for causing a computer to:
    produce musical note data;
    convert the musical note data into training musical note data having a predetermined pitch unrelated to pitch data contained in the musical note data and a timbre different from a timbre of the musical note data; and transmit the training musical note data.

13. A recording medium storing a performance training data transmitting program for causing a computer to:

produce musical note data;

determine whether a keyboard performance based on the produced musical note data involves a special key depression;

produce control data which instructs a trainee to perform a pedal operation for supplementing the special key depression when it is determined that the keyboard performance involves the special key depression, and add the control data to the musical note data;

convert the musical note data to which the control data has been added into training musical note data; and transmit the training musical note data.

* * * * *